United States Patent

Kubota et al.

[11] Patent Number: 5,949,562
[45] Date of Patent: Sep. 7, 1999

[54] TRANSMISSION WAVELENGTH CONTROL METHOD PERMITTING EFFICIENT WAVELENGTH MULTIPLEXING, OPTICAL COMMUNICATION METHOD, OPTICAL TRANSMITTER, OPTICAL TRANSMITTER-RECEIVER APPARATUS, AND OPTICAL COMMUNICATION SYSTEM

[75] Inventors: Oichi Kubota, Atsugi; Masao Majima, Isehara, both of Japan

[73] Assignee: Canon Kabushiki Kaisha, Tokyo, Japan

[21] Appl. No.: 08/856,286

[22] Filed: May 14, 1997

Related U.S. Application Data

[63] Continuation-in-part of application No. 08/564,475, Nov. 12, 1995, abandoned.

[30] Foreign Application Priority Data

Nov. 30, 1994 [JP] Japan .................................. 6-296660
May 29, 1996 [JP] Japan .................................. 8-134930
May 29, 1996 [JP] Japan .................................. 8-134931

[51] Int. Cl.$^6$ .................................................. H04J 14/02
[52] U.S. Cl. .......................... 359/124; 359/161; 359/187
[58] Field of Search .......................... 359/114, 124–125, 359/120–121, 132–133, 161, 152, 173, 187

[56] References Cited

U.S. PATENT DOCUMENTS

| | | | |
|---|---|---|---|
| 4,592,023 | 5/1986 | Beranger et al. | 365/189 |
| 4,592,043 | 5/1986 | Williams | 370/3 |
| 4,800,555 | 1/1989 | Foschini | 370/3 |
| 5,202,782 | 4/1993 | Nakamura et al. | 359/152 |
| 5,239,400 | 8/1993 | Liu | 359/125 |
| 5,301,052 | 4/1994 | Audouin et al. | 359/124 |
| 5,473,719 | 12/1995 | Stone | 359/124 |

FOREIGN PATENT DOCUMENTS

| | | |
|---|---|---|
| 0 381 102 | 8/1990 | European Pat. Off. . |
| 0 499 255 | 8/1992 | European Pat. Off. . |
| 3-214830 | 9/1991 | Japan . |
| 4-123542 | 4/1992 | Japan . |

OTHER PUBLICATIONS

H. Asakura et al., "Optical Devices for Densely Spaced Wavelength Division Multiplexing Transmission Systems", National Technical Report, vol. 39, No. 4, pp. 43–48 (Aug. 1993).

F. Heismann et al., "Narrow–Linewidth, Electro–Optically Tunable InGaAsP–Ti:LiNbO$_3$ Extended Cavity Laser," Appl. Phys. Lett. 51 (3), pp. 164–166 (Jul. 1987).

(List continued on next page.)

Primary Examiner—Kinfe-Michael Negash
Attorney, Agent, or Firm—Fitzpatrick, Cella, Harper & Scinto

[57] ABSTRACT

A wavelength control method controls a wavelength of output light from an optical transmitter used in an optical communication system for performing wavelength-multiplexing. The method includes steps of causing light-output means of the optical transmitter to output light and guiding the output light of the light-output means and light used in the optical communication system to a wavelength tunable filter. The method also includes sweeping a selective wavelength of the wavelength tunable filter, and detecting, based on the sweeping, if a wavelength spacing between a wavelength of the output light, which is output from the light-output means, and a wavelength of the light used in the optical communication system, which is adjacent to the wavelength of the output light on a wavelength axis on either a longer wavelength side or a shorter wavelength side, is wider or narrower than a predetermined wavelength spacing. The method also includes performing control in which the wavelength of the output light is caused to approach the adjacent wavelength when the wavelength spacing is detected to be wider than the predetermined wavelength in said detecting step and the wavelength of the output light is caused to be away from the adjacent wavelength when the wavelength spacing is detected to be narrower than the predetermined wavelength.

56 Claims, 22 Drawing Sheets

OTHER PUBLICATIONS

S. Sakano et al., "Tunable DFB Laser with a Striped Thin–FIlm Heater," Technology Report of Japan Electronics Information Communication Academy, OQE 91–105, pp. 13–18.

T. Kameda et al., "Heaters on Passive Region Employed (HOPE) DBR–LD," disclosed in Autumnal Conference of Japan Electronics Information Communications Academy, Lecture No. C–149, 4–171 (1992).

Y. Kotaki et al., "1.55μ m Wavelength Tunable FBH–DBR Laser", *Electronics Letters*, vol. 23, No. 7, pp. 325–327 (Mar. 1987).

J. Stone et al., "Pigtailed High–Finesse Tunable Fibre Fabry–Perot Interferometers with Large, Medium and Smal Free Spectral Ranges", *Electronics Letters*, vol. 23, No. 7, pp. 781–783 (Jul. 1987).

F. Heismann et al., "Narrow–linewidth, electro–optically tunable InGaAsP–Ti:LiNbO$_3$ extended cavity laser", *Applied Physics Letters*, vol. 51, No. 3, pp. 164–166 (Jul. 1987).

H. Asakura et al., "Optical Devices for Densely Spaced Wavelength Division Multiplexing Transmission Systems", *National Technical Report*, vol. 39, No. 4, pp. 395–400 (Aug. 1993).

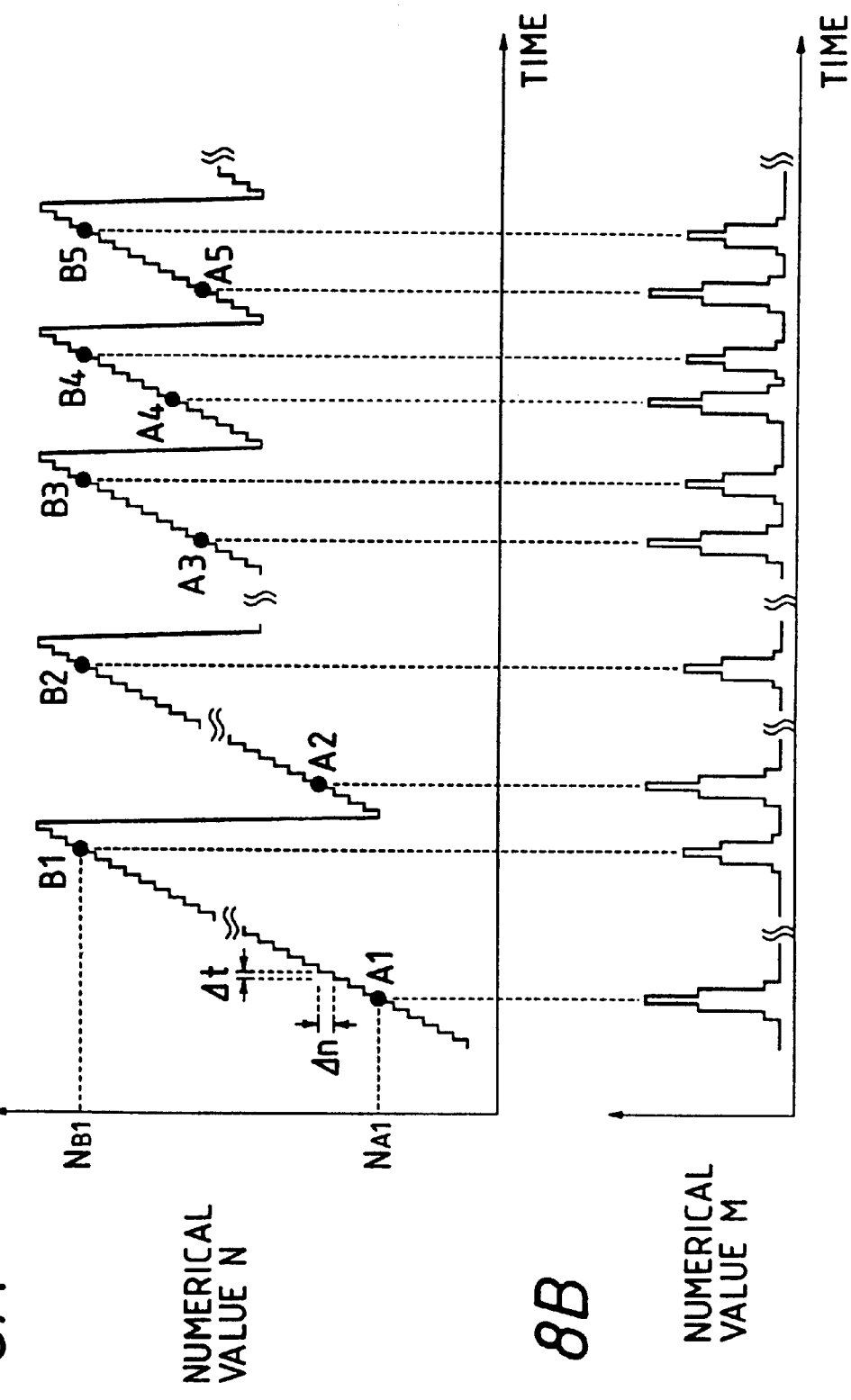

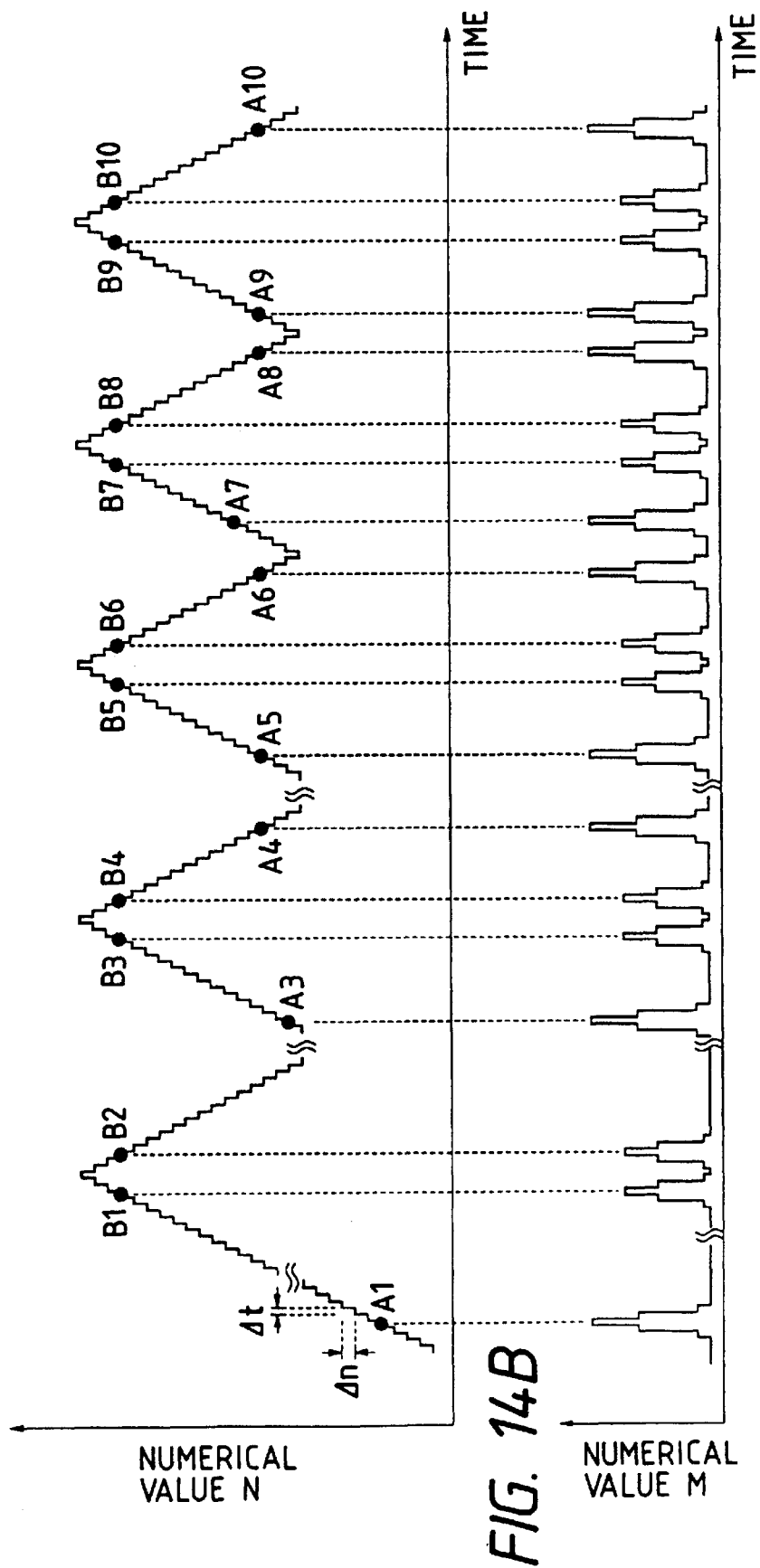

FIG. 22

| DETECTION CKT | NOT DETECT | DETECT |
|---|---|---|
| ① | SWEEP | STOP SWEEP |
| ② | OFF | ON |
| ③ | ON | OFF |
| ④ | OFF | ON |
| ⑤ | SW A SIDE | SW B SIDE |
| ⑥ | SW A SIDE | SW B SIDE |

TRANSMISSION WAVELENGTH CONTROL METHOD PERMITTING EFFICIENT WAVELENGTH MULTIPLEXING, OPTICAL COMMUNICATION METHOD, OPTICAL TRANSMITTER, OPTICAL TRANSMITTER-RECEIVER APPARATUS, AND OPTICAL COMMUNICATION SYSTEM

This application is a continuation-in-part of application Ser. No. 08/564,475, filed Nov. 12, 1995 abandoned.

BACKGROUND OF THE INVENTION

1. Field of the Invention

The present invention relates to an optical communication system, and more particularly to an optical communication system for transmitting optical signals of a plurality of different wavelengths by wavelength-multiplexing.

2. Description of the Related Art

A wavelength-multiplexing optical communication method is arranged to transmit optical signals of different wavelengths through a single transmission line, thereby improving a utilization factor of the transmission line. A system for the method usually includes a plurality of stations for transmitting the optical signals of different wavelengths. The system also includes light superimposing means for guiding these optical signals into the single transmission line, as well as a single transmission line, and wavelength separating means for separating only a signal of a necessary wavelength from a wavelength-multiplexed signal. The system also includes a plurality of stations receiving the multiplexed signal.

The system of this type mainly uses a semiconductor laser as a light source provided in each station and an optical fiber as the transmission line. The system also uses an optical multiplexing element composed of a half mirror, and light waveguides as the light superimposing means. The system also includes an optical wavelength filter as the wavelength separating means.

The semiconductor laser as a light source, however, has such a drawback that the wavelength of emitted light therefrom easily changes depending upon factors including temperature, etc. Thus, it has the following problems. First, spacing between the wavelengths must be increased to avoid interference. This makes it difficult to raise multiplicity. Second, introduction of wavelength reference and precise temperature control is necessary for precise wavelength control, which makes the system complicated.

In order to solve these problems, communication methods have been proposed. For example, one method is described in Japanese Laid-Open Patent Application No. 3-214830.

FIG. 5 is a schematic drawing to show a system for achieving the wavelength-multiplexing optical communication method of the conventional example. In the drawing, reference numeral 301 designates an optical star coupler, 302-1 to 302-n designate optical fibers serving as optical transmission lines, and 303-1 and 303-n designate terminal stations for optical communication.

FIG. 1 is a schematic drawing of an optical transmitter-receiver portion in each terminal station 303-1 to 303-n as shown in FIG. 5. In FIG. 1, reference numeral 2102 denotes a wavelength-variable light source, such as a semiconductor laser, capable of changing an oscillation wavelength by control from the outside. Reference numeral 2103 denotes an optical dividing/power multiplexing element for dividing signal light from the wavelength-variable light source 2102 into beams guided to the transmission line and to an optical dividing element 2107. Optical dividing/power multiplexing element 2103 also transmits the wavelength-multiplexed light from the transmission line to the optical dividing element 2107. As discussed, reference numeral 2107 denotes the optical dividing element for distributing the light from the optical dividing/power multiplexing element to wavelength-variable filters 2106-1 to 2106-3. Reference numeral 2104 denotes a circuit for extracting necessary information from photodetectors 2105-2 and 2105-3. Reference numeral 2101 denotes a control circuit for sending or receiving data to or from terminal equipment and for controlling the wavelength-variable light source 2102 and wavelength-variable filters 2106-1 to 2106-3 to avoid interference with another station. Reference numerals 2106-1 to 2106-3 denote the wavelength-variable filters whose wavelength regions of transmitted light can be changed by external control. Reference numerals 2105-1 to 2105-3 denote the photodetectors in FIG. 1.

FIG. 2 is a drawing to show a relative relation among passing wavelengths of the wavelength-variable filters 2106-1 to 2106-3 as shown in FIG. 1. In the drawing, 2201 to 2203 indicate wavelength transmitting or passing characteristics of the respective wavelength-variable filters 2106-1 to 2106-3.

These wavelength-variable filters are arranged in such a manner that when external control changes the passing wavelengths, the three passing characteristics simultaneously change by the same wavelength and in the same direction while maintaining the relative relation among the passing characteristics.

Next, the operation of the conventional example having the above arrangement will be explained. For simplicity, let us use an example where communication is made using light of wavelength $\lambda 1$ from the terminal station 303-1 to the terminal station 303-2 in FIG. 5 and light of wavelength $\lambda 2$ from the terminal station 303-3 to the terminal station 303-n.

Let us suppose herein that the wavelength $\lambda 1$ and wavelength $\lambda 2$ are proximal to each other but apart more than the wavelength width necessary for communication from each other, thus not causing interference.

In the optical transmitter-receiver in the terminal station 303-1 shown in FIG. 5, the optical dividing/power multiplexing element 2103 sends part of the signal light of wavelength $\lambda 1$ from the wavelength-variable light source 2102 out to the transmission line to be transmitted to the terminal station 303-2. The rest is transmitted to the optical dividing element 2107 to be divided into three beams, which reach the wavelength-variable filters #1 (2106-1), #2 (2106-2), #3 (2106-3). The wavelength-variable filter #1 (2106-1) is controlled by a control signal from the control circuit 2101 so that the center of the passing wavelength thereof may be coincident with the wavelength $\lambda 1$. Thus, the photodetector #1 (2105-1) supplies a large output. The photodetectors #2 (2105-2), #3 (2105-3) supply outputs associated with response amplitudes to the wavelength $\lambda 1$, of the wavelength-variable filters #2 (2105-2), and #3 (2105-3).

In the optical transmitter-receiver in the terminal station 303-2 on the other hand, light of the wavelengths $\lambda 1$, $\lambda 2$ coming through the transmission line passes the optical dividing/power multiplexing element 2103 and the optical dividing element 2107 to reach the wavelength-variable filters #1 (2106-1), #2 (2106-2), #3 (2106-3). Since the wavelength-variable filter #1 (2106-1) is controlled so that the center of the passing wavelength thereof may match with the wavelength $\lambda 1$, the light of wavelength $\lambda 2$ is interrupted here, and only the light of wavelength λ1 is converted into an electric signal by the photodetector #1 (2106-1). Then the electric signal is transmitted through the control circuit 2101 to the terminal equipment.

As described above, the semiconductor laser is used as the wavelength-variable light source 2102, and the oscillation wavelength thereof easily changes depending upon the temperature.

The operation in the case where the wavelength changes so that the signal of wavelength λ2 sent from the terminal station 303-3 approaches the wavelength λ1 is explained next.

When the light of wavelength λ2 comes into the passing band of the wavelength-variable filter #2 (2106-2), the output from the photodetector #2 (2105-2) increases. In contrast with it, the output from the photodetector #3 (2105-3) shows no change. Thus, an adjacent channel approach detection circuit 2104 can detect approach of light of a wavelength shorter than the wavelength λ1 by checking the outputs from the two photodetectors. The adjacent channel approach detection circuit 2104 transfers the detected information to the control circuit 2101.

In accordance with the detected information, the control circuit 2101 uses a control signal of passing wavelength to effect such control as to continuously move the wavelength of the wavelength-variable light source 2102 to longer wavelengths than λ1, and thereby to avoid interference of the signal with the wavelength λ2 approaching. At the same time, the control circuit 2101 performs such control that the wavelength λ1 may become coincident with the passing center wavelength of the wavelength-variable filter #1 (2106-1), using control signals of passing wavelengths of the wavelength-variable filters #1 (2106-1), #2 (2106-2), #3 (2106-3).

In response to the terminal station 303-1 moving the wavelength λ1 to avoid interference, the terminal station 303-2 receiving the signal of wavelength λ1 experiences a decrease in the output signal from the photodetector thereof #1 (2105-1). Then, using a control signal of a passing wavelength, the control circuit 2101 in the terminal station 303-2 controls the center of the passing wavelength of the wavelength-variable filter #1 (2106-1) to always maximize the output signal from the photodetector #1 (2105-1). This operation permits the terminal station 303-1 to prevent interference when the output wavelength from the terminal station 303-3 changes to approach the output wavelength of the terminal station 303-1. At the same time, the terminal station 303-2 can continuously receive the signal from the terminal station 303-1 without being tuned out.

The above function is also effective where the wavelength λ2 approaches the wavelength λ1 from the longer wavelength region, where only λ1 changes while λ2 is fixed, and where both λ1, λ2 change. In each of these cases, communication can continuously be maintained to avoid interference.

In the method discussed above, the signals from the respective stations are scattered on the wavelength axis to ensure they will not interfere with each other. This method, however, provides no positive device to increase the wavelength multiplicity to improve the utilization factor of the usable wavelength region.

Further, the arrangement using the wavelength filters required three wavelength-variable band-pass filters upon transmission.

Further, U.S. Pat. No. 4,592,043 discloses performing frequency scanning using a resonator to find an adjacent channel and servo-controlling a transmission frequency such that this frequency is higher than the adjacent lower channel by a predetermined channel spacing.

Further, U.S. Pat. No. 4,800,555 discloses dither-controlling a transmission wavelength to detect errors due to interference with wavelengths on longer and shorter wavelength sides of the transmission wavelength, comparing these errors with each other, and re-arranging the transmission wavelength using this comparison result as a feedback signal to reduce the errors. However, such technology is not directed to a technology for arranging wavelengths with a predetermined spacing.

In addition, EPA No. 381,102 discloses arranging channels with a predetermined frequency spacing. The technology disclosed in EPA 381,102, however, is for detecting the channel using heterodyne detection. Hence, it is impossible for this technology to determine if a wavelength adjacent to a given wavelength is on a longer wavelength side or a shorter wavelength side. U.S. Pat. No. 5,301,052 also discloses similar technology.

SUMMARY OF THE INVENTION

An object of the present invention is to realize wavelength control without use of a reference wavelength or precise wavelength stabilizing control. Another object is to improve the wavelength multiplicity. Another object is to limit the number of filters necessary for wavelength control and to avoid using a large-scale detection unit as used in heterodyne detection or homodyne detection. The present invention provides the following transmission wavelength control method to achieve the objects.

According to an embodiment of the present invention, a wavelength control method for controlling a wavelength of output light from an optical transmitter is used in an optical communication system for performing wavelength-multiplexing. The method includes the steps of causing light-output means of the optical transmitter to output light, and guiding the output light of the light-output means and light used in the optical communication system to a wavelength tunable filter. The method also includes sweeping a selective wavelength of the wavelength tunable filter. Based on the sweeping, the method involves detecting if a wavelength spacing between a wavelength of the output light, which is output from the light-output means, and a wavelength of the light used in the optical communication system, which is adjacent to the wavelength of the output light on a wavelength axis on one of a longer wavelength side and a shorter wavelength side, is wider or narrower than a predetermined wavelength spacing. When the wavelength spacing is detected to be wider than the predetermined wavelength in the detecting step, the wavelength of the output light is controlled to approach the adjacent wavelength. When the wavelength spacing is detected to be narrower than the predetermined wavelength, the wavelength of the output light is controlled to be away from the adjacent wavelength.

In a steady state, the wavelength spacing may be controlled at a predetermined wavelength spacing, and in one sweeping step of the wavelength tunable filter, both the output light and the adjacent light thereto may be detected.

When approaching a steady state, wavelength spacing is controlled at a predetermined wavelength, and in one sweep step of the wavelength tunable filter, both the output light and the adjacent light thereto are detected. When approaching a steady state, wavelength spacing is controlled at a predetermined wavelength, and in one sweep step of the wavelength tunable filter, either the output light or the adjacent light thereto is detected.

In one embodiment, when at least one of the output light and the adjacent light thereto is detected using the wavelength tunable filter, either a sweep step of gradually increasing the selective wavelength of the wavelength tunable filter or a sweep step of gradually decreasing the selective wavelength is repeated. In another embodiment, when at least one of the output light and the adjacent light thereto is detected using the wavelength tunable filter, sweep steps of gradually increasing and gradually decreasing the selective wavelength of the wavelength-tunable filter are alternately repeated.

Also in the present invention, in the light outputting step, a light output start region is set at an end portion on an opposite side to either the longer wavelength side or the shorter wavelength side in a wavelength region in which the light-output means can output the light. The light is output from the light-output means with its wavelength being in the light output start region when the light begins to be output from the light-output means. The output of the light is interrupted when the wavelength spacing between the wavelength of the output light and the wavelength of the adjacent light thereto becomes a predetermined wavelength spacing in the light output start region.

The wavelength control method of the present invention may also include a step of confirming that there is no other light within a region of the predetermined wavelength spacing at an end portion on the opposite side to either the longer wavelength side or the shorter wavelength side in a wavelength region in which the light-output means can output the light. This confirming step is performed before outputting the light from the light-output means.

In the wavelength method of the present invention, the light-output means includes an optical amplifier portion and an optical wavelength selecting portion for causing light at a predetermined wavelength out of the light emitted from the optical amplifier portion to re-enter the optical amplifier portion. In the method of the present invention, the control of a wavelength of the output light is performed by controlling a positional relationship between at least a part of the optical wavelength selecting portion and the optical amplifier portion.

The light-output means used in the method of the present invention may include temperature control means so that control of the wavelength of the output light is performed by controlling the temperature of the temperature control means.

According to another embodiment of the present invention, a communication method is performed in an optical communication system for performing wavelength-multiplexing, in which a wavelength control method is performed in an optical transmitter in the optical communication system. The wavelength control method of this embodiment includes features as described above for the wavelength control method.

In another embodiment, a wavelength control method of the present invention controls a wavelength of output light from an optical transmitter used in an optical communication system for performing wavelength-multiplexing.

The method includes causing light-output means of the optical transmitter to output light, and setting selective wavelengths of two wavelength tunable filters, which are spaced by a predetermined wavelength spacing. The two filters are set such that one of the two wavelength tunable filters selects one of the output light from the light-output means and light used in the optical communication system, whose wavelength is adjacent to a wavelength of the output light on a wavelength axis on either a longer wavelength side or a shorter wavelength side. The method further involves performing either control of the wavelength of the output light or control of both the wavelength of the output light and the selective wavelengths of the two wavelength tunable filters such that the two wavelength tunable filters respectively select the output light and the adjacent light thereto. The method also includes a step of maintaining a state in which the two wavelength tunable filters respectively select the output light and the adjacent light thereto.

In another embodiment of the invention, a communication method performed in an optical communication system is provided for performing wavelength-mutiplexing. In the communication method, a wavelength control method is performed in an optical transmitter and includes steps as described for the wavelength control method immediately above.

According to another aspect of the present invention, an optical communication system for performing wavelength-multiplexing is provided. The system includes light-output means, a wavelength tunable filter, guiding means, filter controlling means, and output-light controlling means. The light-output means can change a wavelength of its output light, and the filter can change its selective wavelength. The guiding means guides the output light of the light-output means and the light used in the optical communication system to the filter. The filter controlling means controls the selective wavelength of the filter. The output-light controlling means controls the wavelength of the output light of the light-output means. The output-light controlling means controls the wavelength of the output light based on detecting, by sweeping the selective wavelength of the filter by the filter controlling means, whether a wavelength spacing between the wavelength of the output light and the wavelength of the light used in the optical communication system adjacent to the wavelength of the output light on a wavelength axis on either a longer wavelength side or a shorter wavelength side is either wider or narrower than a predetermined wavelength spacing. Based on the detected result, the controlling means causes the wavelength of the output light to approach the adjacent wavelength when the wavelength spacing is detected to be wider than the predetermined wavelength. Likewise, the wavelength of the output light is caused to be away from the adjacent wavelength when the wavelength spacing is detected to be narrower than the predetermined wavelength.

According to another aspect of the present invention, an optical transmitter used in an optical communication system for performing wavelength-multiplexing is provided. The transmitter includes the light-output means, the wavelength tunable filter, the guiding means, the filter controlling means, and the output-light controlling means as described above for the optical communication system.

According to another aspect of the present invention, an optical communication system for performing wavelength-multiplexing includes light-output means, two wavelength tunable filters, guiding means, filter controlling means and output-light controlling means. The two wavelength tunable filters are capable of setting a mutual relationship between selective wavelength of the two filters so that the two filters can select light of two wavelengths spaced by a predetermined wavelength spacing. The filters are also capable of changing the selective wavelengths with the mutual relationship being maintained. The guiding means in this system guides at least the output light of the light-output means to one of the two wavelength tunable filters and guides at least light used in the optical communication system to the other of the two wavelength tunable filters. The filter controlling means controls the selective wavelengths of the two wavelength tunable filters, and the output-light controlling means controls the wavelength of the output light of the light-output means. The filter controlling means establishes a state in which one of the two filters selects either the output light from the light-output means or the light used in the optical communication system, whose wavelength is adjacent to the wavelength of the output light on a wavelength axis on either the longer or shorter wavelength side. Either the output-light controlling means or a combination of the output light-controlling means and the filter controlling means performs either control of the wavelength of the output light or control of both the wavelength of the output light and the selective wavelengths of the two wavelength tunable filters. In this way, the two wavelength tunable filters respectively select the output light and the adjacent light thereto.

According to another aspect of the present invention, an optical transmitter used in an optical communication system for performing wavelength-multiplexing is provided. The transmitter includes features as described for the optical communication system immediately above.

BRIEF DESCRIPTION OF THE DRAWINGS

FIGS. 8A and 8B are drawings to illustrate the operation of control circuit 101 in Embodiment 1;

FIGS. 14A and 14B are drawings to illustrate control of the transmission wavelength of each station in Embodiment 4;

FIG. 22 is a drawing to illustrate the operation of ON/OFF control circuit 1408 in the control circuit 1301 in the fifth embodiment of the present invention;

DETAILED DESCRIPTION OF THE PREFERRED EMBODIMENTS (Embodiment 1)

The first embodiment of the present invention will be explained with reference to the drawings.

Figure 3:
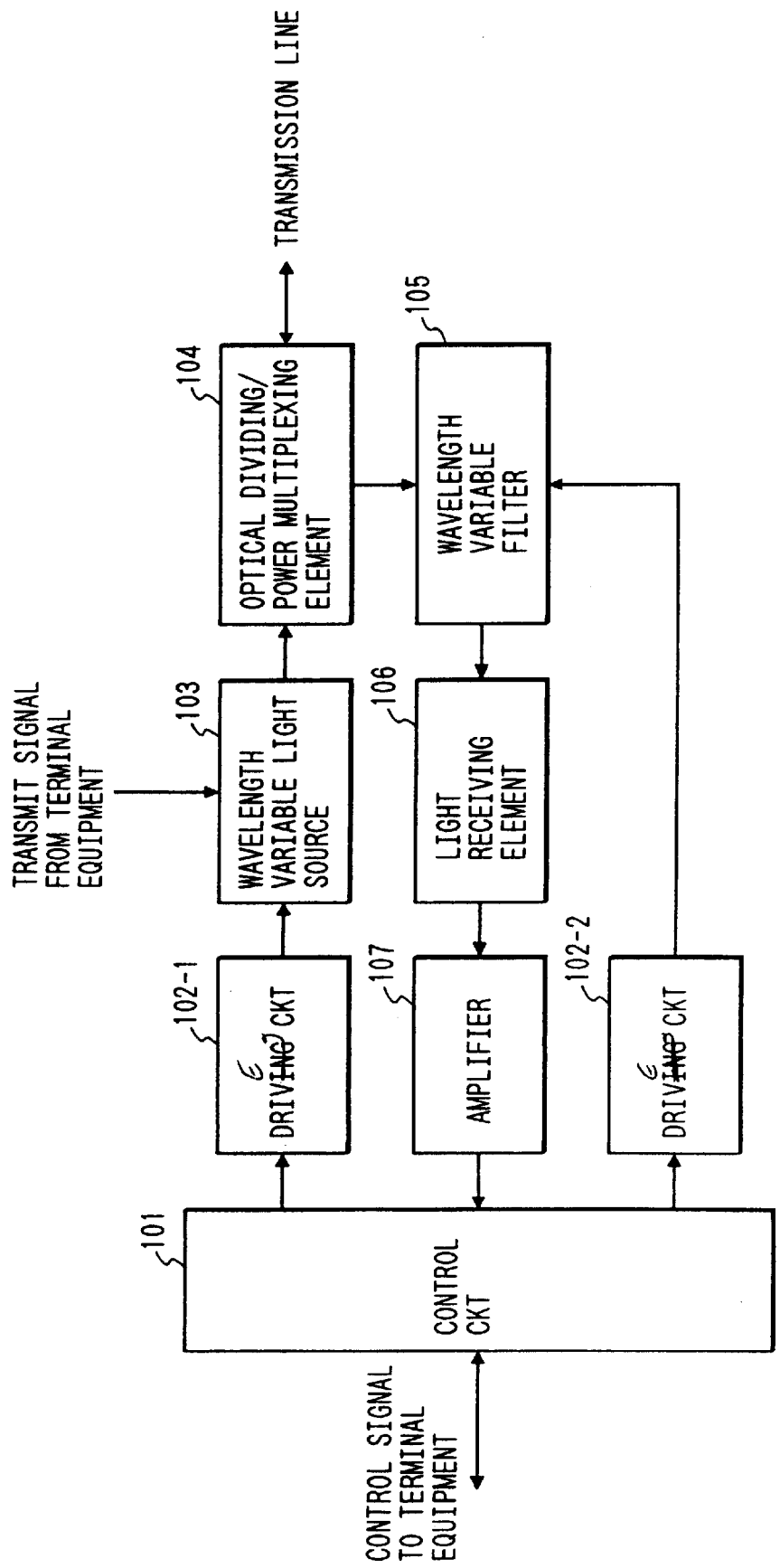
FIG. 3 is a structural drawing of an optical transmitter in Embodiment 1.

FIG. 3 is a structural drawing of a wavelength control system in the transmitter of the present invention.

Reference numeral 101 designates a control circuit, which controls an output wavelength of a wavelength-variable light source 103 and a passing wavelength of a wavelength-variable band-pass filter (hereinafter referred to as a wavelength-variable filter) 105. Numeral 102-1 denotes a drive circuit, which drives the wavelength-variable light source 103, based on a signal from the control circuit 101. This light source is arranged so that the wavelength of output light therefrom can be changed by control from the outside, for example like a semiconductor laser. Further, for example the intensity of the output light can be modulated according to a transmission signal from the outside. Numeral 104 is an optical dividing/power multiplexing element, which outputs the output light from the wavelength-variable light source 103 into a transmission line and which outputs received light through the transmission line to the wavelength-variable filter 105. Numeral 105 is the wavelength-variable filter, which is a filter that can change the wavelength region of transmitted light by external control, for example such as a fiber Fabry-Perot filter. Numeral 106 represents a light receiving element, which receives the light emitted from the wavelength-variable light source 103 and then transmitted by the wavelength-variable filter 105. Numeral 107 denotes an amplifier, which amplifies a signal from the light receiving element 106 to output the amplified signal to the control circuit 101. Numeral 102-2 stands for a drive circuit, which drives the wavelength-variable filter 105, based on a signal from the control circuit 101.

In the above configuration, the optical dividing/power multiplexing element 104 is constructed, for example, of a half mirror or a beam splitter.

Further, the wavelength-variable light source 103 can be realized for example by a semiconductor laser of the DBR type. This is a semiconductor laser having a structure that can continuously change the oscillation wavelength by injecting carriers into a region of DBR (distributed Bragg reflector) to change the Bragg wavelength thereof. A specific example of the wavelength-variable light source 103 is the one as described in K. KOTANI, M. MATSUDA, M. YANO, H. ISIKAWA, and H. IMAI, Electronics Letters, Vol. 23, No. 7, p325–p327 (1987).

In the present invention the wavelength-variable light source 103 is composed of a wavelength adjusting section for changing the wavelength of the output light thereof and an output light modulating section for modulating the output light. In the case of the wavelength-variable DBR semiconductor laser, the DBR portion corresponds to the wavelength adjusting section and the active region to the output light modulating section. In the present embodiment the drive circuit 102-1 is connected to the wavelength adjusting section. The output light modulating section receives a transmission signal from the transmitter of its own station (the self station) to modulate the intensity of the output light.

A specific example of the wavelength-variable filter 105 is an FFP (fiber Fabry-Perot) type filter. This filter is constructed in such a manner that two optical fibers are opposed at the end faces thereof to each other to form an FP (Fabry-Perot) resonator and a distance between the end faces (that is, the resonator length) can be finely adjusted by a piezoelectric device. By changing the resonator length, the passing wavelength of the filter can be changed. A specific example of this wavelength-variable filter is the one constructed as described in J. STONE and L. W. STULTS, Electronics Letters, Vol. 23, No. 15, pp. 781–83, 1987.

As input voltages into the drive circuits 102-1 and 102-2 increase, the wavelength of the wavelength-variable light source 103 and the passing wavelength of the wavelength-variable filter 105 each change to longer wavelengths in this example.

Figure 1:
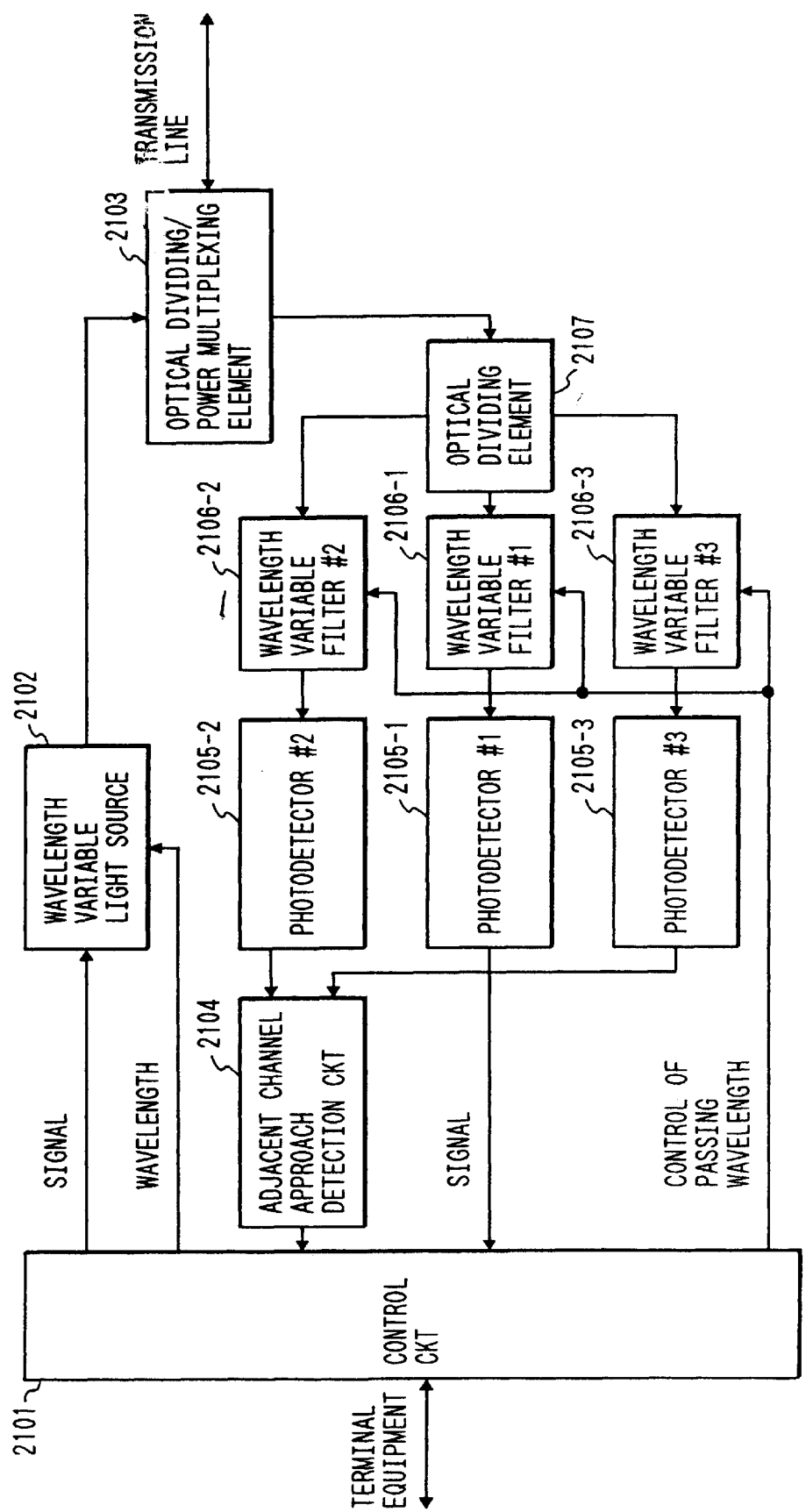
FIG. 1 is a structural drawing of an optical transmitter-receiver in a terminal station in the conventional example prior to the present invention.
Figure 2:
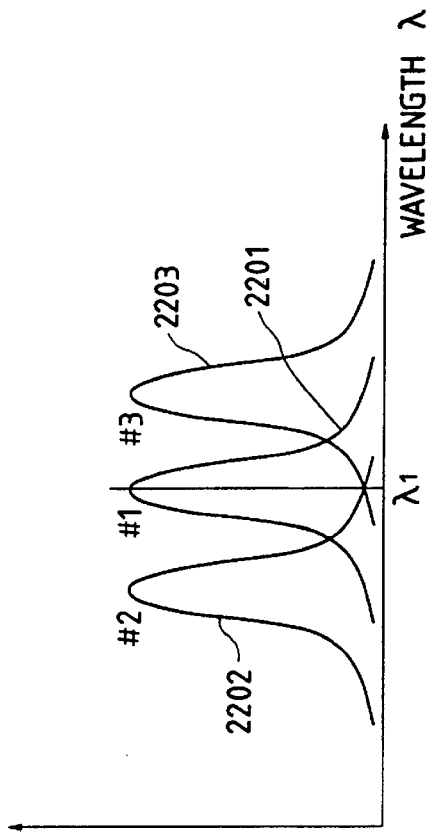
FIG. 2 is a drawing to show a relation among passing wavelengths of the wavelength-variable filters in the conventional example prior to the present invention.
Figure 4:
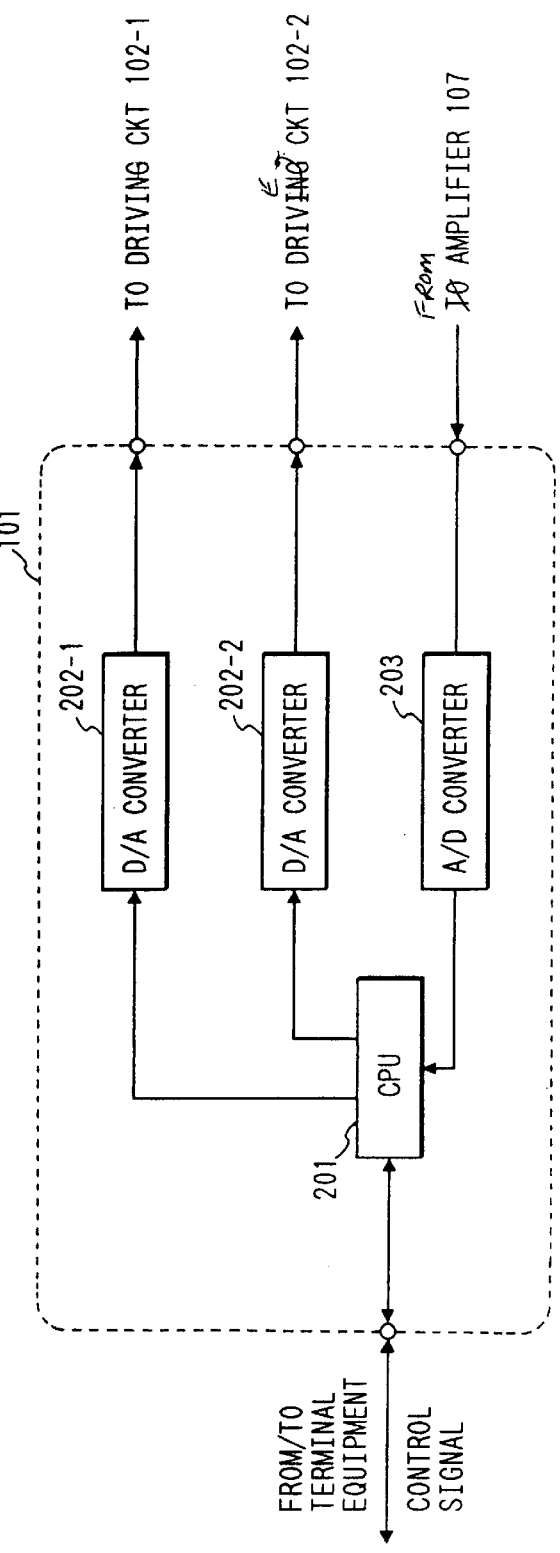
FIG. 4 is a structural drawing of control circuit 101 in the optical transmitter in Embodiment 1.

FIG. 4 is a drawing to show a setup of the control circuit 101 shown in FIG. 3.

Numeral 201 designates a CPU, which receives a control signal from the terminal equipment, receives data from an A/D converter 203, and sends data to D/A converters 201-1 and 202-2 after completion of necessary calculation. Numeral 202-1 represents a D/A converter, which outputs a control signal to determine the transmission wavelength of the wavelength-variable light source 103 to the drive circuit 102-1, based on the data from the CPU 201. Numeral 202-2 represents a D/A converter, which outputs a control signal to determine the passing wavelength of the wavelength-variable filter 105 to the drive circuit 102-2, based on the data from the CPU 201. Numeral 203 denotes an A/D converter, which converts a signal obtained from the amplifier 107 into numerical data and outputs it to the CPU 201.

Figure 5:
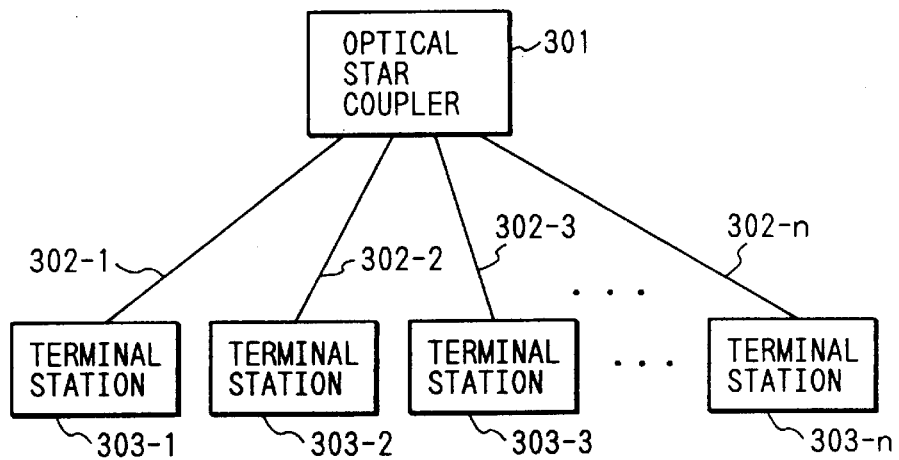
FIG. 5 is a schematic drawing of an optical communication system in Embodiment 1.

FIG. 5 is a schematic drawing to show a system for achieving the wavelength-multiplexing optical communication method of the present embodiment. In the drawings, numeral 301 is an optical star coupler, 302-1 to 302-n are optical fibers serving as optical transmission lines, and 303-1 to 303-n are terminal stations for optical communication.

Figure 6:
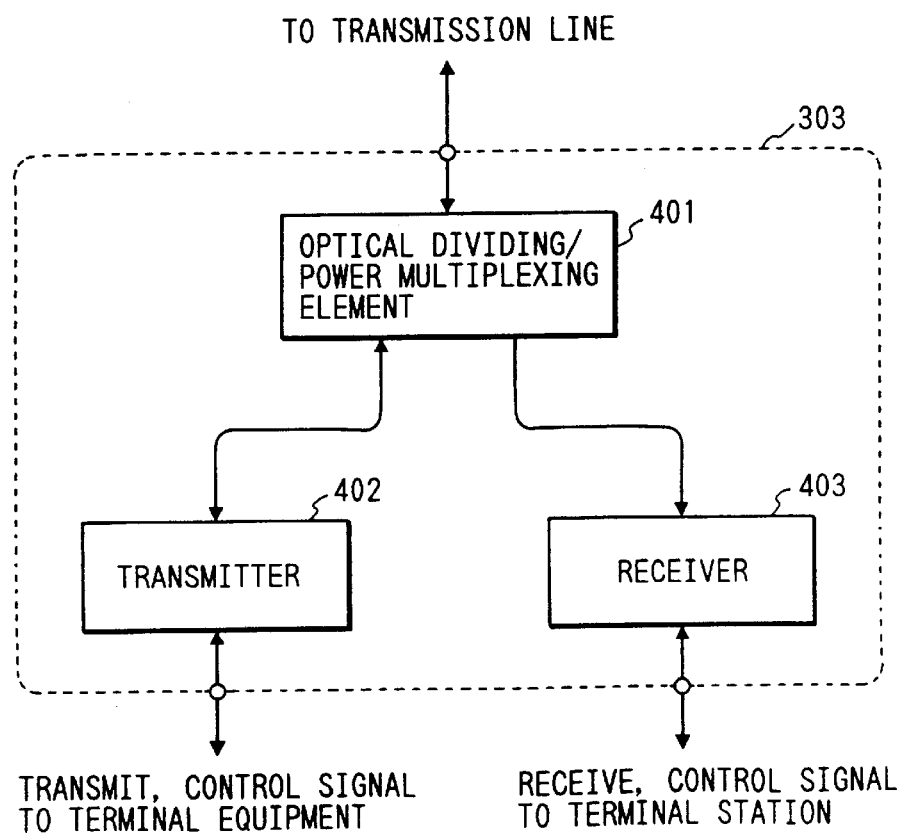
FIG. 6 is a schematic drawing of an optical transmitter-receiver portion in a terminal station in the optical communication system in Embodiment 1.

FIG. 6 is a schematic drawing of the optical transmitter-receiver portion of each terminal station 302-1 to 302-n shown in FIG. 5. In the drawing, numeral 401 stands for an optical dividing/power multiplexing element, 402 for a transmitter, and 403 for a receiver.

Figure 7A:
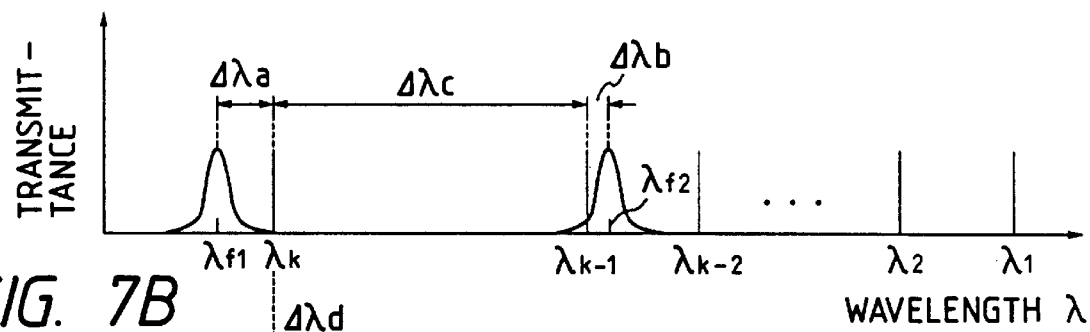
FIGS. 7A to 7D are drawings to illustrate control of the transmission wavelength of each station in Embodiments 1 and 2.
Figure 7B:
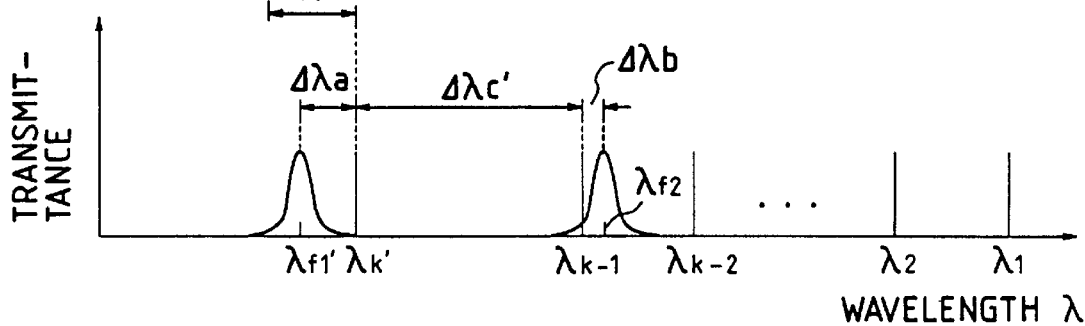
Figure 7C:
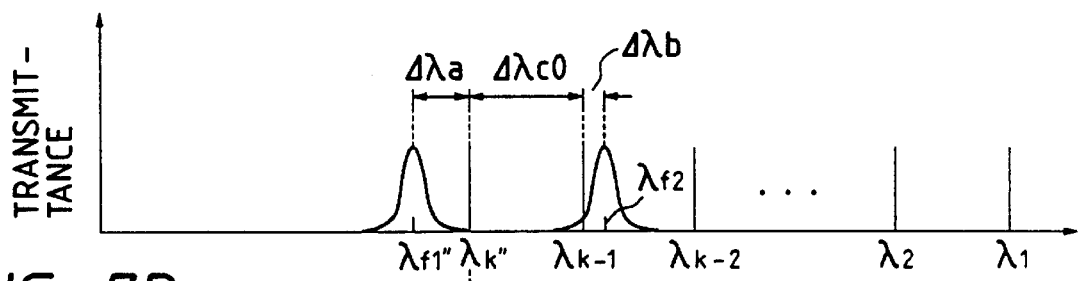
Figure 7D:
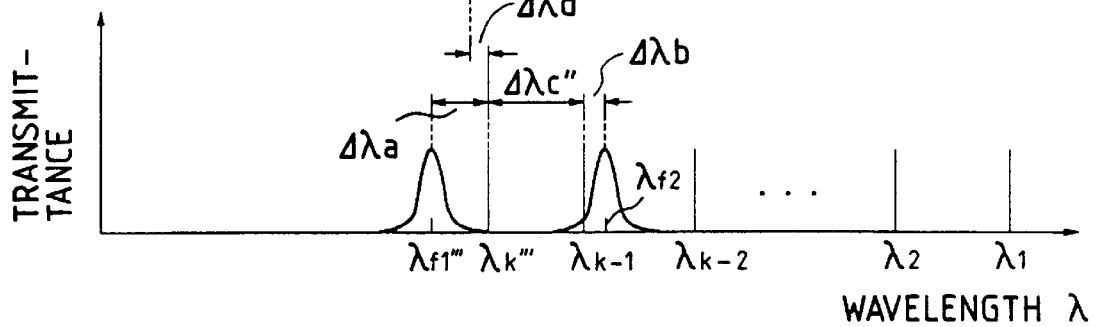

FIGS. 7A to 7D are drawings to show relations on the wavelength axis between communication wavelengths and the passing wavelength of the wavelength filter where there are a plurality of stations communicating by the present method. In the drawings, $\lambda 1$ to $\lambda k\text{-}1$ represent transmission wavelengths of other stations, $\lambda k$ a transmission wavelength of a self station, $\lambda f1$ a sweep start wavelength of the wavelength-variable filter 105 in the self station, $\lambda f2$ a sweep end wavelength thereof, $\Delta\lambda a$ and $\Delta\lambda b$ margins upon sweep of passing wavelength, $\Delta\lambda c$ a wavelength spacing between $\lambda k$ and $\lambda k\text{-}1$, $\Delta\lambda c0$, a predetermined value for the wavelength spacing $\Delta\lambda c$, and $\Delta\lambda d$ a moving amount of $\lambda k$. FIG. 7A and FIG. 7B show cases where $\Delta\lambda c$ is greater than the predetermined value $\Delta\lambda c0$, FIG. 7C a case where they are equal to each other, and FIG. 7D a case where $\Delta\lambda c$ is smaller than the predetermined value $\Delta\lambda c0$. Here, $\Delta\lambda c0$ as the predetermined spacing is a clearance necessary for avoiding interference between $\lambda k$ and $\lambda k\text{-}1$ and is a constant value. This predetermined spacing $\Delta\lambda c0$ is preferably set to be approximately equal to those in the other stations.

FIGS. 8A and 8B are drawings to illustrate the operation of the control circuit 101 in the present embodiment. FIG. 8A is a drawing to show a time change of numerical data N output from the CPU 201 to the D/A converter 202-2. In other words, it shows a time change of the passing wavelength of the wavelength-variable filter 105. In the drawing, A1 to A5 represent points where the transmission wavelength of the self station is detected and B1 to B5 points where the transmission wavelength of the other station is detected. FIG. 8B is a drawing to show a time change of numerical data M output from the A/D converter 203 to the CPU 201. The time scale of the abscissa corresponds to that of FIG. 8A.

Now explained is the operation upon transmission of the present embodiment having the above arrangement.

In the present embodiment, the transmitter 402 is connected through the optical dividing/power multiplexing element 401 to the transmission line. The setup of the wavelength control system enclosed in the transmitter 402 is shown in FIG. 3. In order to avoid interference and to effectively use the wavelengths, the control circuit 101 controls the wavelength (i.e., the transmission wavelength) of the output light from the wavelength-variable light source 103 and the passing wavelength of the wavelength-variable filter 105 in the following manner.

The control circuit 101 first sets the transmission wavelength $\lambda k$ and further sets the passing wavelength $\lambda f1$ of the wavelength-variable filter 105 on the shorter wavelength side than $\lambda k$. Then it sweeps the passing wavelength to the longer wavelength side, so that it then detects the transmission wavelength $\lambda k$ of the self station and the transmission wavelength $\lambda k\text{-}1$ of the other station adjacent thereto on the longer wavelength side. This operation yields the wavelength spacing $\Delta\lambda c$ between the two wavelengths. Further, the control circuit 101 controls the transmission wavelength of the self station so that $\Delta\lambda c$ may be equal to the predetermined value $\Delta\lambda c0$. After that, the control circuit repeats the operation of setting the sweep start wavelength, sweeping the passing wavelength to obtain $\Delta\lambda c$, and controlling the transmission wavelength $\lambda k$ of the self station. As a result, the wavelength spacing $\Delta\lambda c$ converges to $\Delta\lambda c0$. In the specification, a state in which the wavelength spacing is converged at the predetermined spacing $\Delta\lambda c0$ will be called a steady state, and a state before reaching it a non-steady state. It is, however, noted that the predetermined spacing cannot be precisely one value even in the steady state, but it has a permissible range.

FIGS. 7A to 7D show states of the control. The control circuit 101 starts the sweep from the wavelength $\lambda f1$ shifted by $\Delta\lambda a$ from $\lambda k$ on the shorter wavelength side and monitors the intensity of transmitted light as sweeping the passing wavelength of the filter to the longer wavelength side. A first peak is obtained at the transmission wavelength λk of the self station, and a second peak at the transmission wavelength λk-1 of the other station. The control circuit 101 finishes the sweep of the passing wavelength at the wavelength λf2 shifted by Δλb from λk-1 on the longer wavelength side. This sweep from λf1 to λf2 is one sweep step. Here, Δλa is a margin for surely detecting the transmission wavelength of the self station and Δλb similarly a margin for surely detecting the transmission wavelength of the other station.

The control circuit 101 controls the transmission wavelength λk of the self station so that Δλc may become equal to the predetermined value Δλc0, and again sets the sweep start wavelength λf1 in accordance therewith. Namely, if Δλc>Δλc0 (FIG. 7A) the control circuit increases λk and λf1 by Δλd (FIG. 7B); if Δλc=Δλc0 (FIG. 7C) the control circuit maintains the values of λk and λf1; if Δλc<Δλc0 (FIG. 7D) the control circuit decreases λk and λf1 by Δλd'. The control circuit 101 then starts next sweep from λf1 thus set, and repeats the control as described above, thereby effecting the control to bring the non-steady state to the steady state or to maintain the steady state.

If the values of Δλd and Δλd' are set to |Δλc−Δλc0|, Δλc can approach Δλc0 most quickly. However, if the above setting of Δλd and Δλd' is not suitable due to circumstances including the accuracy of passing wavelength or response speed of the wavelength-variable filter, a suitable arrangement is such that a proper fixed value Δλd0 is determined and the transmission wavelength λk of the self station is changed by Δλd0, if |Δλc−Δλc0|≧Δλd0, or Δλc−Δλc0, if |Δλc−Δλc0<Δλd0.

When the self station starts transmission, the transmission wavelength λk is set so as not to cause interference with transmission wavelengths under communication, which have already been sent to the transmission line. This can be realized for example by setting a transmission start region in a region on the shortest wavelength side in the wavelength range handled by itself.

Namely, transmission is started in the transmission start region, and if the steady state is achieved in the transmission start region the transmission is interrupted. The transmission start region may be properly set to a region including approximately the predetermined spacing as described above or including an error of the wavelength-variable filter if it cannot be ignored.

If the entire wavelength range is arranged as a transmissible region without setting a specific transmission start region, it is first checked whether transmission light of other stations is present or absent near the transmission start wavelength prior to transmission start, and then transmission is started only when a necessary wavelength region is secured. Specifically, supposing that all transmission start wavelengths of respective stations are over a wavelength λlimit and that errors of the wavelength-variable filters in the transmitters of respective stations (differences between actual wavelengths and transmission wavelengths expected for the transmitters) are below Δλerror, the wavelength-variable filter is swept upon transmission start at least from the shorter wavelength side than λlimit to λlimit+Δλerror+Δλc0, and, without detection of a transmission wavelength of any other station, transmission is started by judging that the wavelength range which will not cause interference upon transmission start can be secured.

There is another method not including such special means for avoiding interference upon transmission start. In this case, interference occurs if a transmission wavelength of one other station exists near the transmission start wavelength upon transmission start. Even with interference, because the transmission wavelength of the station which started transmission later is controlled so as to keep the predetermined spacing relative to the adjacent transmission wavelength in accordance with the above-described control, the transmission of the station having started the transmission later is quickly interrupted. In this case, if transmission data in the interfered communication is data which permits abnormal receiving of partial data (for example, data, such as dynamic picture data, which is valid and usable even if part of the data is lacking) the former transmission is continued without interruption; if the data does not permit abnormal receiving of partial data, a receiving station requests retransmission.

A transmission start method may be selected depending upon the wavelength region handled, the predetermined spacing Δλc0, data transmitted, etc. from the above methods upon transmission start.

It is also conceivable that sweep results in reaching the longest wavelength side of the wavelength range handled by the self station without detecting any transmission signal of another station. For example, such a case may occur when the self station starts communication while neither station is in communication in the present communication system. In this case, the control circuit 101 changes the transmission wavelength of the self station to the longest wavelength side and stops there. Specifically, it holds an output from the drive circuit 102-1 for driving the wavelength-variable light source 103 at the output corresponding to the longest wavelength side.

Next explained in detail using FIGS. 8A and 8B is the operation of the control circuit 101 in the present embodiment, performing the wavelength control as discussed above.

The control circuit 101 sets the transmission wavelength λk of the self station by outputting a suitable voltage to the drive circuit 102-1. The voltage corresponds to the numerical data output from the CPU 201 to the D/A converter 202-1. Further, the control circuit 101 always sweep the passing wavelength of the wavelength-variable filter 105 in order to obtain the wavelength spacing Δλc between the transmission wavelength λk of the self station and the transmission wavelength λk-1 of the other station. For that purpose, the CPU 201 sends the numerical data N to the D/A converter 202-2 and increases a value thereof by Δn every short period Δt. Here, a numerical value sent to the D/A converter 202-2 corresponds to the passing wavelength of the wavelength-variable filter 105, and Δn to the smallest change of the passage wavelength of the wavelength-variable filter 105. At the same time, the CPU 201 monitors the numerical value M output from the A/D converter 203. The numerical value M corresponds to the intensity of the light transmitted by the wavelength-variable filter 105.

As the CPU 201 increases the numerical data N sent to the D/A converter 202-2 (FIG. 8A), the numerical value M output from the A/D converter 203 comes to have a peak at a transmission wavelength of each station (FIG. 8B). The first peak (numerical value NA1) at point A1 corresponds to the transmission wavelength λk of the self station, and the second peak (numerical value NB1) at point B1 to the transmission wavelength λk-1 of the other station. Then the CPU 201 calculates $\Delta B = NB1 - NA1$, which is a quantity corresponding to the wavelength spacing $\Delta \lambda c$, and compares it with a preliminarily determined numerical value $\Delta N0$ corresponding to $\Delta \lambda c0$, thereby comparing $\Delta \lambda c$ with $\Delta \lambda c0$. The CPU 201 again sets the transmission wavelength $\lambda k$ of the self station and the sweep start wavelength $\lambda f1$, based on a result of the comparison.

If $\Delta N < \Delta N0$, the CPU 201 shifts the transmission wavelength $\lambda k$ of the self station and the sweep start wavelength $\lambda f1$ by $\Delta \lambda d$ to the longer wavelength side. Namely, the CPU increases the numerical data sent to the D/A converters 202-1, 202-2 by the value corresponding to $\Delta \lambda d = |\Delta \lambda c - \Delta \lambda c0|$ (from A1 to A2). After that, sweep of the passing wavelength is started.

If $\Delta N < \Delta \lambda 0$, the CPU 201 again performs sweep as keeping the same setting as upon the previous sweep (from A3 to A4).

If $\Delta N < \Delta N0$, the CPU 201 shifts the transmission wavelength $\lambda k$ of the self station and the sweep start wavelength $\lambda k1$ by $\Delta \lambda d' = |\Delta \lambda c' - \Delta \lambda c0|$ to the shorter wavelength side. Namely, the CPU decreases the numerical data sent to the D/A converters 202-1, 202-2 by the value corresponding to $\Delta \lambda d'$ (from A4 to A5). After that, sweep of the passing wavelength is started.

The wavelength control as described forms an array of transmission wavelengths from the respective stations with the head on the longer wavelength side on the wavelength axis in the transmission line. After a certain station ends transmission, a gap appears in the array of transmission wavelengths thus arranged. On that occasion, an array of transmission wavelengths located on the shorter wavelength side than the gap move to the longer wavelength side so as to bridge the gap, whereby the wavelength region can be effectively used.

Figure 9:
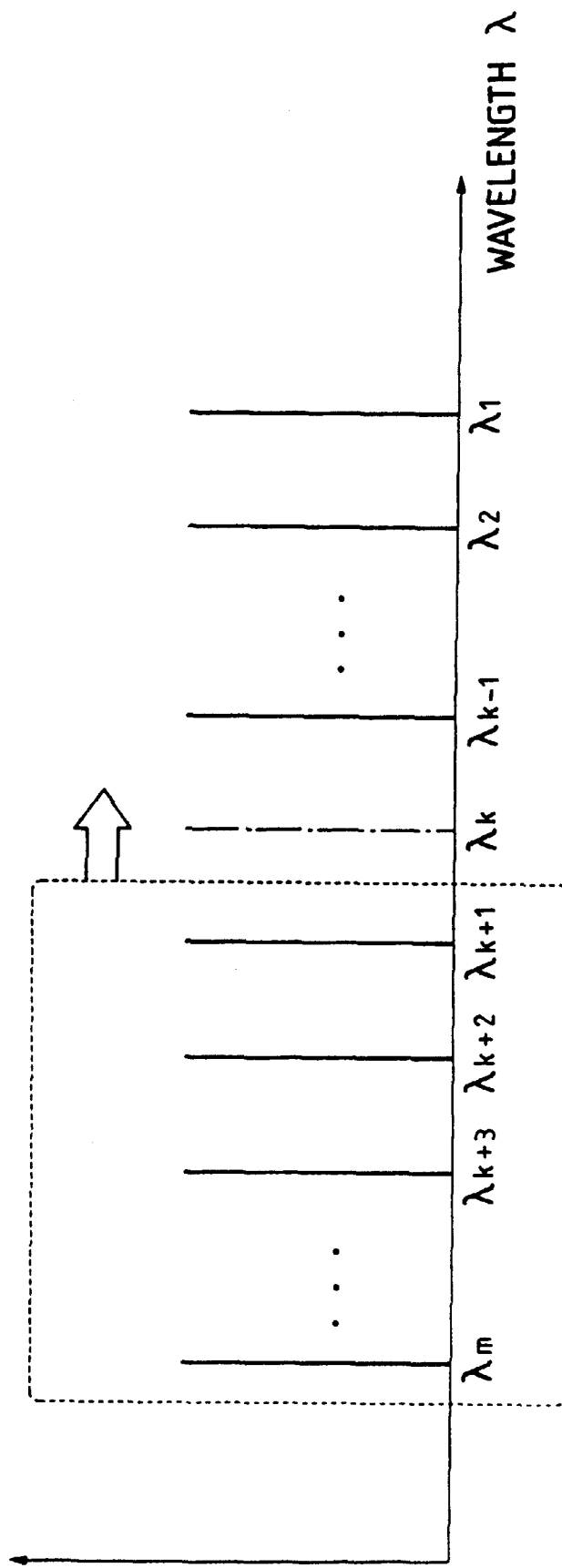
FIG. 9 is a drawing to illustrate control of the transmission wavelength of each station in the present invention.

For example, let us suppose that m terminal stations 303-1 to 303-m in FIG. 9 are transmitting signals, using the respective wavelengths of $\lambda 1$ to $\lambda m$. Now let us consider a case that the terminal station 303-k transmitting its signal with the wavelength $\lambda k$ stops transmission. Since the transmission wavelength $\lambda k$ is now absent in the transmission line, the terminal station 303-k+1 comes not to detect any transmission signal from the other stations. Accordingly, the control circuit 101 in the terminal station 303-k+1 changes the transmission wavelength $\lambda k+1$ of the self station to the longer wavelength side before it detects a transmission signal of another station. On the other hand, the terminal stations transmission their signals using the respective wavelengths on the shorter wavelength side than the terminal station 303-k+1 control their own transmission wavelengths so that each station may keep constant a wavelength difference between the transmission wavelength of the self station and the transmission wavelength of the other station one wavelength adjacent thereto on the longer wavelength side. Therefore, the transmission wavelengths of those terminal stations move to the longer wavelength side as following up the transmission wavelength of the terminal station 303-k+1, thereby finally filling the gap.

The operation upon receiving is next explained.

The light coming from the transmission line advances through the optical dividing/power multiplexing element 401 to reach the receiver 403. The receiver receives only a light signal of the transmission wavelength $\lambda k$ of a terminal station intended to receive and then converts it into an electric signal to output it to the terminal equipment.

The receiver 403 always checks whether there exists a signal newly sent to the transmission line or not. This will be called a receiving standby state. Any terminal station not transmitting or receiving a signal is in the receiving standby state. A terminal station in the receiving standby state sets the receiving wavelength thereof on the longer wavelength side than the transmission start wavelengths of the respective stations to wait for a transmission signal from one other station. If there is a signal newly sent, the terminal station in the standby state determines whether it is a signal directed to the self station. If the signal is directed to the self station, it receives the signal; if not, the terminal station continues checking the presence or absence of the signal.

While a certain receiver 403 is receiving, for example, the transmission wavelength $\lambda k$ from the terminal station 303-1 and when the terminal station 303-1 moves the transmission wavelength $\lambda k$ in order to avoid interference or in order to keep the wavelength spacing at the predetermined spacing, the receiver 403 also moves the receiving wavelength in accordance therewith. This can be realized for example by applying the control method for making the passing wavelength of the wavelength-variable filter coincident with the transmission wavelength in the transmitter, as described previously, to the wavelength-variable filter in the receiver.

Applying the optical receiving device 303 provided with the transmitter 402 and receiver 403 performing the above wavelength control to the optical communication system of FIG. 5, a transmitting station can continue transmission while avoiding interference and a receiving station can continue receiving without being out of tune. Since the transmission wavelengths of the respective stations are arranged at suitable intervals on the wavelength axis in the transmission line, the wavelength multiplicity can be increased. Further, it is not necessary to achieve precise stability of the transmission wavelength of each station.

(Embodiment 2)

The second embodiment of the present invention is next explained with reference to the drawings.

The present embodiment has the same configuration as the first embodiment, but is different in the method for controlling the wavelength-variable light source and the wavelength-variable filter in the transmitter. Specifically, return sweep is also utilized as one sweep step upon obtaining the wavelength spacing $\Delta \lambda c$ between the transmission wavelength of the self station and the transmission wavelength of the other station.

The schematic drawing of a system for achieving the wavelength-multiplexing optical communication method of the present embodiment is shown in FIG. 5, the schematic drawing of the optical transmitter-receiver portion in each station in FIG. 6, the setup of the transmitter in FIG. 3, and the setup of the control circuit in the transmitter in FIG. 4. Since the elements in the respective portions are the same as those in the first embodiment, description thereof is omitted herein.

Figures 10A, 10B:
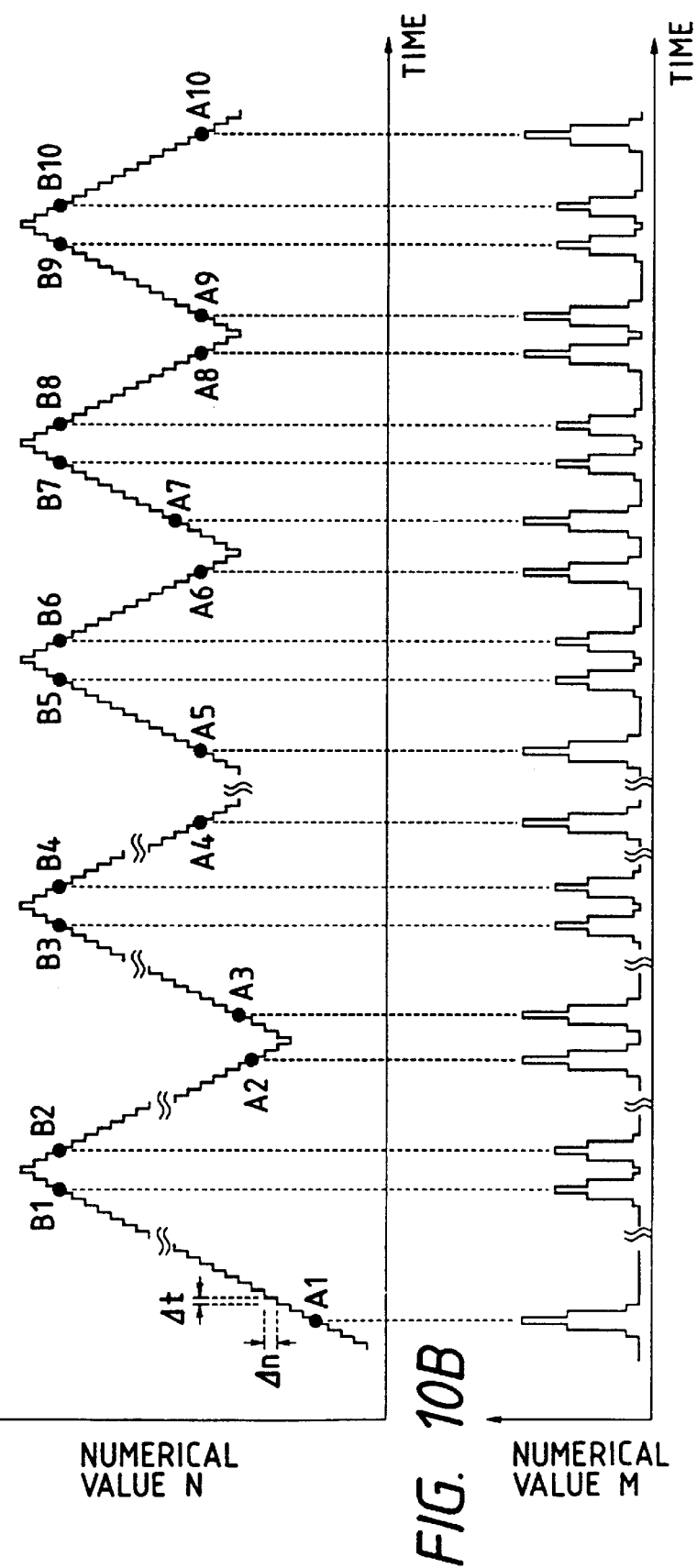
FIGS. 10A and 10B are drawings to illustrate the operation of control circuit 101 in Embodiment 2.

FIGS. 10A, 10B are drawings to illustrate the operation of the control circuit 101 in the present embodiment. FIG. 10A is a drawing to show a time change of the numerical data N output from the CPU 201 to the D/A converter 202-2. In other words, it shows a time change of the wavelength transmitted by the wavelength-variable filter 105. In the drawings, A1 to A10 are points where the transmission wavelength of the self station is detected, and B1 to B10 points where the transmission wavelength of the other station is detected. Further, FIG. 8B is a drawing to show a time change of the numerical data M output from the A/D converter 203 to the CPU 201. The time scale of the abscissa corresponds to that of FIG. 10A.

The operation of the present embodiment having the above arrangement is next explained focusing on the difference from the first embodiment.

In order to avoid interference and to effectively use the wavelengths upon transmission, the control circuit 101 controls the wavelength (or the transmission wavelength) of the output light and the passing wavelength of the wavelength-variable filter 105.

The control circuit 101 first sets the transmission wavelength $\lambda k$ of the self station and further sets the passing wavelength $\lambda f1$ of the wavelength-variable filter 105 on the shorter wavelength side than $\lambda k$. Next the control circuit sweeps the passing wavelength to the longer wavelength side to detect the transmission wavelength of the self station $\lambda k$ and the transmission wavelength $\lambda k$-1 of the other station adjacent thereto on the longer wavelength side. This yields the wavelength spacing $\Delta \lambda c = \lambda k$-1$-\lambda k$ between the two wavelengths. Then the control circuit 101 controls the transmission wavelength of the self station $\lambda k$ so that $\Delta \lambda c$ may become equal to the predetermined value $\Delta \lambda c0$. Namely, if $\Delta \lambda c > \Delta \lambda c0$ the control circuit increases $\lambda k$ by $\Delta \lambda d$; if $\Delta \lambda c = \Delta \lambda c0$ the control circuit maintains the value of $\lambda k$; if $\Delta \lambda c < \Delta \lambda c0$ the control circuit decreases $\lambda k$ by $\Delta \lambda d'$. Further, $\lambda f1$ is also updated in correspondence thereto.

Then the passing wavelength of the wavelength-variable filter 105 is swept back to the shorter wavelength side from $\lambda f2$ to $\lambda f1$ thus updated, thereby detecting $\lambda k$-1, $\lambda k$ in order and then obtaining the wavelength spacing $\Delta \lambda c$. The control circuit 101 again controls the transmission wavelength of the self station so that $\Delta \lambda c$ may become equal to $\Delta \lambda c0$. After that, the control circuit repeats the operation of obtaining the wavelength spacing $\Delta \lambda c$ as alternately changing the sweep direction of the passing wavelength every sweep step and controlling the transmission wavelength $\lambda k$ of the self station.

As a result, the wavelength spacing $\Delta \lambda c$ comes to converge to $\Delta \lambda c0$.

If the values of $\Delta \lambda d$ and $\Delta \lambda d'$ are set to $|\Delta \lambda c - \Delta \lambda c0|$, $\Delta \lambda c$ can approach $\Delta \lambda c0$ most quickly. If it is not suitable, a possible arrangement is such that a suitable fixed value $\Delta \lambda d0$ is selected and that the transmission wavelength of the self station $\lambda k$ is changed by $\Delta \lambda d0$, if $|\Delta \lambda c - \Delta \lambda c0| \geq \Delta \lambda d0$, or $\Delta \lambda c - \Delta \lambda c0$, if $|\Delta \lambda c - \Delta \lambda c0| < \Delta \lambda d0$.

These are the same as in the first embodiment.

Since the present embodiment also utilizes the return sweep upon obtaining the wavelength spacing $\Delta \lambda c$, the wavelength spacing $\Delta \lambda c$ can come to converge to $\Delta \lambda c0$ faster than in the first embodiment.

Next explained in detail using FIGS. 10A and 10B is the operation of the control circuit 101 in the present embodiment, performing the wavelength control as described above.

Similarly as in the first embodiment, the numerical data output from the CPU 201 to the D/A converter 202-1 corresponds to the transmission wavelength $\lambda k$ of the self station. Similarly, the numerical data N sent from the CPU 201 to the D/A converter 202-2 corresponds to the passing wavelength of the wavelength-variable filter 105, and sweep of the passing wavelength is effected by increasing or decreasing the value of the numerical data by $\Delta n$ every period $\Delta t$. Further, the numerical value M output from the A/D converter 203 corresponds to the intensity of the light transmitted by the wavelength-variable filter 105.

As the CPU 201 increases the numerical data N sent to the D/A converter 202-2 (FIG. 10A), the numerical value M output from the A/D converter 203 comes to have a peak at a transmission wavelength of each station (FIG. 10B). For example, suppose that a peak corresponding to the transmission wavelength $\lambda k$ of the self station appears at the numerical value NA1 and a peak corresponding to the transmission wavelength $\lambda k$-1 of the other station at the numerical value NB1. The CPU 201 calculates $\Delta N = \Delta NB1 - \Delta NA1$, which is a quantity corresponding to the wavelength spacing $\Delta \lambda c$, and compares it with $\Delta N0$, which is a quantity corresponding to $\Delta \lambda c0$.

If $\Delta N > \Delta N0$, the CPU 201 shifts the transmission wavelength of the self station $\lambda k$ by $\Delta \lambda d$ to the longer wavelength side. Namely, the CPU increases the numerical data sent to the D/A converter 202-1 by a value corresponding to $\Delta \lambda d$ (from A1 to A2 and from A2 to A3), and continues sweeping.

If $\Delta N = \Delta N0$, the CPU 201 maintains the same setting as upon the previous sweep (from A5 to A6, from A6 to A7, from A8 to A9, and from A9 to A10), and again executes sweeping.

If $\Delta N > \Delta N0$, the CPU 201 shifts the transmission wavelength of the self station $\lambda k$ by $\Delta \lambda d'$ to the shorter wavelength side. Namely, the CPU decreases the numerical data sent to the D/A converter 202-1 by a value corresponding to $\Delta \lambda d'$ (from A7 to A8), and continues sweeping.

The wavelength control as described above forms an array of transmission wavelengths from the respective stations with the head on the longer wavelength side in the order of starts of communication on the wavelength axis in the transmission line, similarly as in the first embodiment. Further, with end of transmission of a certain terminal station, a gap appearing in the array of transmission wavelengths is also automatically bridged in the same manner as in the first embodiment. The setting method of the transmission wavelength $\lambda k$ upon transmission start, the control method when the transmission wavelength of the self station reaches the longest wavelength side of the wavelength range handled by itself, and the operation upon receiving are based on those in the first embodiment.

Applying the optical receiving device 303 provided with the transmitter 402 and receiver 403 performing the above wavelength control to the optical communication system of FIG. 5, the transmitting station can continue transmitting signals as avoiding interference, and the receiving station can continue receiving signals without being out of tune. Since the transmission wavelengths of the respective stations are arranged at suitable intervals on the wavelength axis in the transmission line, the wavelength multiplicity can be increased. Further, precise stabilization is not necessary for the transmission wavelength of each station. Since the present embodiment also utilizes the return sweep as one sweep step, the wavelength spacing can be converged faster without quickly changing the passing wavelength of the wavelength-variable filter, as compared with Embodiment 1, and the margin for surely detecting the transmission wavelength of the self station can be set to 0 or to be very small.

(Embodiment 3)

The third embodiment of the present invention is next explained with reference to the drawings.

The present embodiment has the same configuration as the first embodiment, but is different from the first and second embodiments in the control method of the wavelength-variable light source and the wavelength-variable filter in the transmitter. Embodiments 1, 2 were arranged to detect the two wavelengths, i.e. the transmission wavelength of the self station and an adjacent transmission wavelength, in one sweep step even in the non-steady state, whereas Embodiments 3 and 4 to follow are arranged to detect only one wavelength in one sweep step before approach of the steady state.

Specifically, the present embodiment is so arranged that, in order to obtain the wavelength spacing $\Delta\lambda c$ between the transmission wavelength of the self station and the transmission wavelength of the other station, the passing wavelength of the wavelength-variable filter is repeatedly swept in a longer wavelength region in the proximity wavelength region to the transmission wavelength of the self station.

The schematic drawing of a system for achieving the wavelength-multiplexing optical communication system of the present embodiment is shown in FIG. 5, the schematic drawing of the optical transmitter-receiver portion of each station in FIG. 6, the setup of the transmitter in FIG. 3, and the setup of the control circuit in the transmitter in FIG. 4. Since the elements in the respective portions are the same as those in the first embodiment, the description thereof is omitted herein.

Figure 11A:
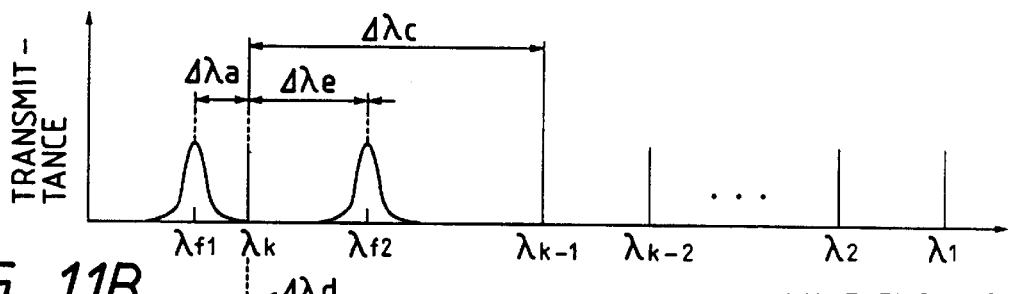
FIGS. 11A to 11D are drawings to illustrate control of transmission wavelength of each station in Embodiment 3.
Figure 11B:
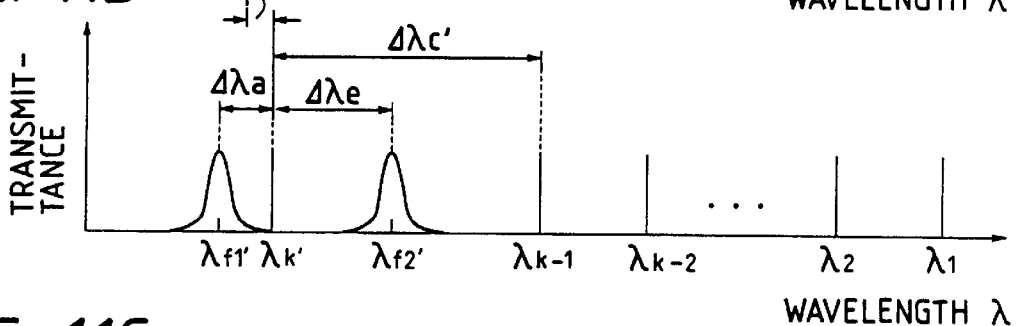
Figure 11C:
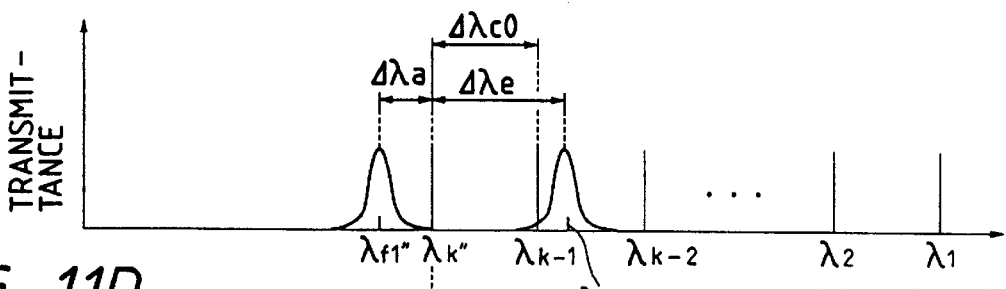
Figure 11D:
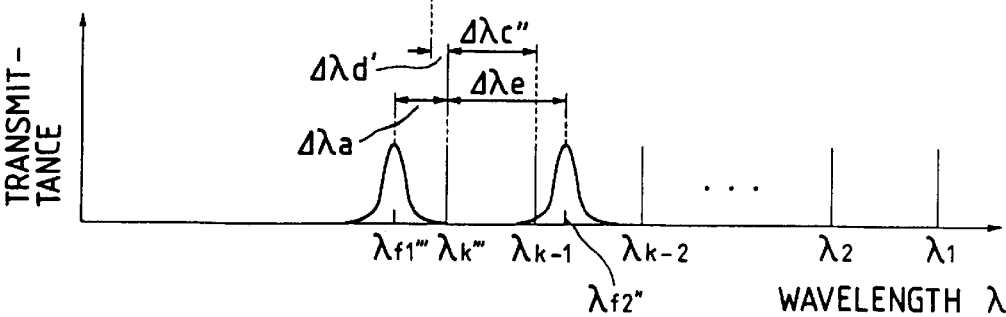

FIGS. 11A and 11D are drawings to show relations on the wavelength axis between the communicating wavelengths and the passing wavelength of the wavelength filter where a plurality of terminal stations are in communication by the present method. In the drawings, $\lambda1$ to $\lambda k-1$ represent the transmission wavelengths of other stations, $\lambda k$ the transmission wavelength of the self station, $\lambda f1$ the sweep start wavelength of the wavelength-variable filter 105 of the self station, $\lambda f2$ the sweep return wavelength thereof, and $\Delta\lambda a$ a margin for surely detecting the transmission wavelength of the self station. Further $\Delta\lambda e$ is the width of sweep for surely detecting the transmission wavelength of the other station without causing interference with the transmission wavelength of the self station. In the drawings, $\Delta\lambda c$ represents the wavelength spacing between $\lambda k$ and $\lambda k1$, and $\Delta\lambda d$, $\Delta\lambda d'$ moving amounts of $\lambda k$, $\lambda f1$ and $\lambda f2$. FIGS. 11a and 11B show cases where $\Delta\lambda c$ is greater than the predetermined value, FIG. 11C, a case where $\Delta\lambda c$ is equal to the predetermined value, and FIG. 11D, a case where $\Delta\lambda c$ is smaller than the predetermined value.

Figures 12A, 12B:
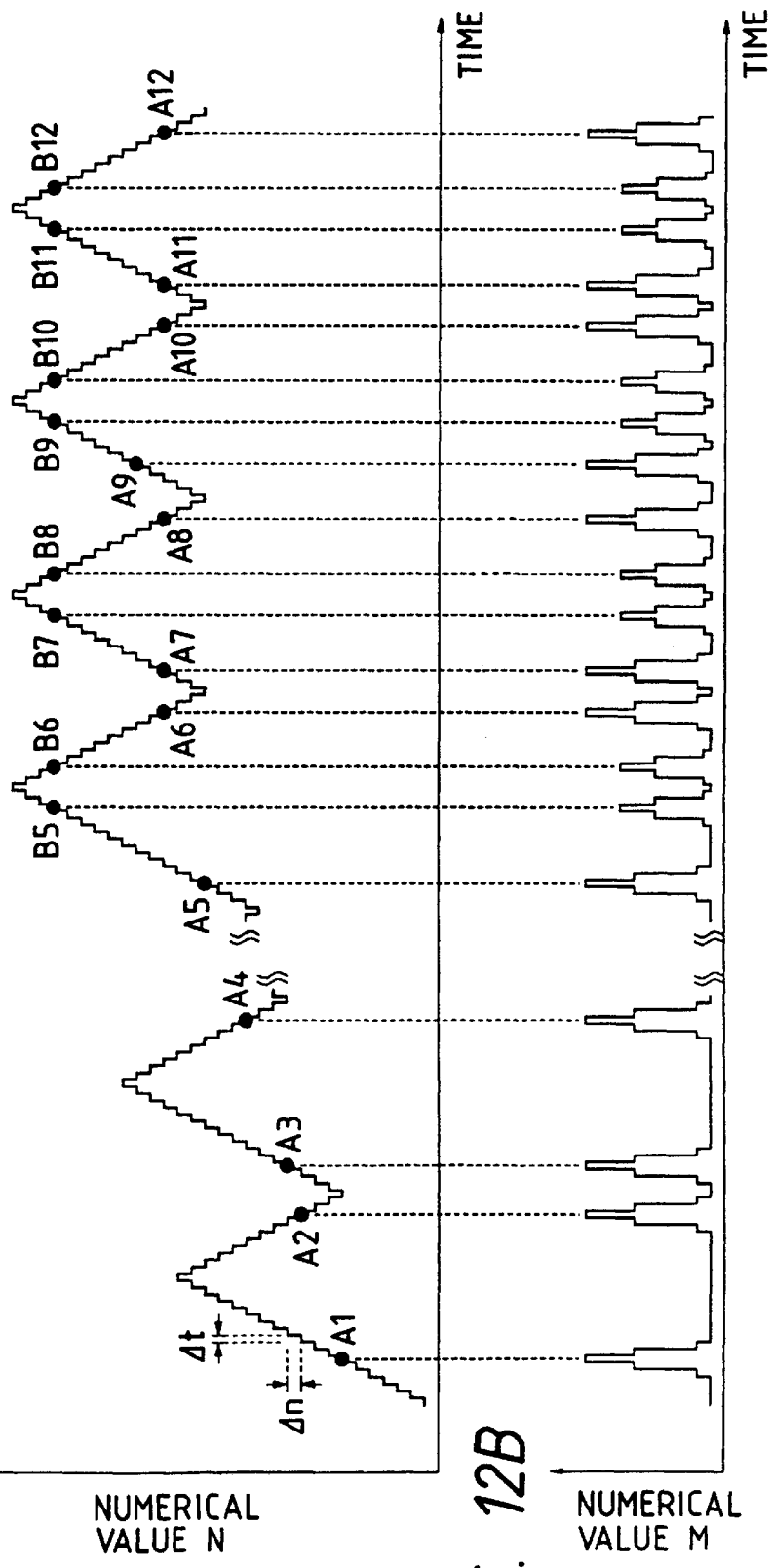
FIGS. 12A and 12B are drawings to illustrate the operation of control circuit 101 in Embodiment 3.

FIGS. 12A and 12B are drawings to illustrate the operation of the control circuit 101 in the present embodiment. FIG. 12A is a drawing to show a time change of the numerical data N output from the CPU 201 to the D/A converter 202-2. In other words, it shows a time change of the passing wavelength of the wavelength-variable filter 105. In the drawing, A1 to A12 represent points where the transmission wavelength of the self station is detected, and B5 to B12 points where the transmission wavelength of the other station is detected. Further, FIG. 12B is a drawing to show a time change of the numerical data M output from the A/D converter 203. The time scale of the abscissa corresponds to that of FIG. 12A.

The operation of the present embodiment having the above arrangement is next explained focusing on the difference from the first and second embodiments.

Upon sending signals, in order to avoid interference and to effectively use the wavelengths, the control circuit 101 repeats the following operation. The control circuit first sets the transmission wavelength $\lambda k$ and then sets the passing wavelength of the wavelength-variable filter 105 on the shorter wavelength side than $\lambda k$. The control circuit 101 sweeps the passing wavelength to the longer wavelength side as checking presence or absence of a transmission wavelength. Sweep is continued after detecting the transmission wavelength $\lambda k$ of the self station and turns back to the shorter wavelength side at a suitable wavelength. Then the control circuit continues sweeping to the shorter wavelength side as checking presence or absence of a transmission wavelength. Once it detects the transmission wavelength of the self station $\lambda k$, sweep again turns back to the longer wavelength side.

This is carried out for the purpose of checking the presence or absence of the transmission wavelength of the other station and a change thereof in the proximity wavelength region on the longer wavelength side than the transmission wavelength $\lambda k$ of the self station. The control circuit 101 controls the transmission wavelength of the self station $\lambda k$ in such a manner that, if it does not detect the transmission wavelength of the other station $\lambda k-1$, it changes the transmission wavelength of the self station $\lambda k$ to the longer wavelength side; if it detects $\lambda k-1$, it adjusts the wavelength spacing $\Delta\lambda c = \lambda k-1 - \lambda k$ between the two wavelengths so as to become equal to the predetermined value $\Delta\lambda c0$.

FIGS. 11A to 11D show the details of the control. The control circuit 101 starts sweeping from the wavelength $\lambda f1$ shifted by $\Delta\lambda a$ on the shorter wavelength side than $\lambda k$ and monitors the intensity of transmitted light as sweeping the passing wavelength of the filter to the longer wavelength side. A peak appears at the transmission wavelength of the self station $\lambda k$, and the control circuit 101 continues sweeping up to the wavelength $\lambda f2$ shifted by $\Delta\lambda e$ on the longer wavelength side from $\lambda k$. Then control circuit reverses the direction of sweep to the shorter wavelength side, and, detecting another peak of the transmission wavelength of the self station $\lambda k$, it continues sweeping up to the wavelength $\lambda f1'$ shifted by $\Delta\lambda a$ on the shorter wavelength side from $\lambda k$.

If the control circuit does not detect the transmission wavelength of the other station $\lambda k-1$ (FIG. 11A) or if it detects $\lambda k-1$ but a difference from the transmission wavelength of the self station $\lambda k$ is greater than $\Delta\lambda c0$, the control circuit 101 shifts the transmission wavelength of the self station $\lambda k$ by $\Delta\lambda d$ to the longer wavelength side. As a result (FIG. 11B), the transmission wavelength of the self station $\lambda k$, the sweep start wavelength $\lambda f1$, and the sweep turning wavelength $\lambda f2$ each increase by $\Delta\lambda d$.

If the control circuit detects the transmission wavelength of the other station $\lambda k-1$ and if the difference from the transmission wavelength of the self station $\lambda k''$ is equal to the predetermined value $\Delta\lambda c0$ (FIG. 11C), the control circuit 101 maintains the value of $\lambda k''$.

If the control circuit detects the transmission wavelength of the other station $\lambda k-1$ and if the difference $\Delta\lambda c''$ between the transmission wavelength of the self station $\lambda k'''$ and the transmission wavelength of the other station $\lambda k-1$ is smaller than the predetermined value $\Delta\lambda c0$, the control circuit 101 shifts the transmission wavelength of the self station by $\Delta\lambda d'$ to the shorter wavelength side.

Then the control circuit sweeps back the passing wavelength of the wavelength-variable filter 105 to the shorter wavelength side to detect $\lambda k-1$, $\lambda k$ in order, thereby obtaining the wavelength spacing $\Delta\lambda c$. Then the control circuit 101 again controls the transmission wavelength of the self station so that $\Delta\lambda c$ may become equal to $\Delta\lambda c0$.

After that, the control circuit repeats such operation as to obtain the wavelength spacing $\Delta\lambda c$ as alternately changing the sweep direction of the passing wavelength and then to control the transmission wavelength $\lambda k$ of the self station. As a result, the wavelength spacing $\Delta\lambda c$ comes to converge to $\Delta\lambda c0$.

The spacing $\Delta\lambda c$ can approach $\Delta\lambda c0$ most quickly by setting the value of $\Delta\lambda d$ to $\Delta\lambda e$ if the control circuit 101 does not detect the transmission wavelength of the other station $\lambda k-1$ or to $|\Delta\lambda c - \Delta\lambda c0|$ if the control circuit 101 detects the transmission wavelength of the other station $\lambda k-1$ and setting the value of $\Delta\lambda d'$ to $|\Delta\lambda c - \Delta\lambda c0|$. If it is not suitable in respect of the response speed, a possible arrangement may be determined in such a manner that a suitable fixed value $\Delta\lambda d0$ to which the system can properly respond is determined, the fixed value is compared with $|\Delta\lambda c-\Delta\lambda c0|$ (or with $\Delta\lambda b$ if $\lambda k-1$ is not detected for $\Delta\lambda d$), and the smaller one is used.

Next explained in detail using FIGS. 12A and 12B is the operation of the control circuit 101 in the present embodiment, performing the wavelength control as described above.

Similar to the first and second embodiments, the numerical data output from the CPU 201 to the D/A converter 202-1 corresponds to the transmission wavelength $\lambda k$ of the self station. Similarly, the numerical data N sent from the CPU 201 to the D/A converter 202-2 corresponds to the passing wavelength of the wavelength-variable filter 105, and sweep of the passing wavelength is carried out by increasing or decreasing the value by $\Delta n$ every very short period $\Delta t$. Also, the numerical value M output from the A/D converter 203 corresponds to the intensity of the light transmitted by the wavelength-variable filter 105.

As the CPU 201 increases or decreases the numerical data N sent to the D/A converter 202-2 (FIG. 12A), the numerical value M output from the A/D converter 203 comes to have peaks corresponding to the transmission wavelengths of the respective stations (FIG. 12B). The CPU 201 sweeps regions near the peaks (point A1 to point A12) corresponding to the transmission wavelength $\lambda k$ of the self station within a certain sweep width (corresponding to $\Delta\lambda a+\Delta\lambda e$ in FIGS. 11A to 11D) in order to find the peaks (point B5 to point B12) corresponding to the transmission wavelength $\lambda k-1$ of the other station.

Failing to find a peak corresponding to $\lambda k-1$ during one sweep step, that is, during sweep of from $\lambda f1$ to $\lambda f2$ or from $\lambda f2$ to $\lambda f1$, the CPU 201 shifts the transmission wavelength of the self station $\lambda k$ by $\Delta\lambda d$ to the longer wavelength side. Namely, the CPU increases the numerical data N sent to the D/A converter 202-1 by the value corresponding to $\Delta\lambda d$ (from A1 to A2, from A2 to A3, and from A3 to A4), and thus continues sweeping.

Once it finds a peak (point B5 to point B12) corresponding to $\lambda k-1$, the CPU 201 executes the following processing. For example, suppose that a peak corresponding to $\lambda k$ appears when the numerical value sent to the D/A converter 202-2 is NA and that a peak corresponding to $\lambda k-1$ appears when the numerical value is NB. Then the CPU 201 calculates $\Delta N=\Delta NB-\Delta NA$, which is a quantity corresponding to the wavelength spacing $\Delta\lambda c$, and compares it with $\Delta N0$, which is a quantity corresponding to the predetermined value $\Delta\lambda c0$.

If $\Delta N>\Delta N0$, the CPU 201 shifts $\lambda k$ by $\Delta\lambda d$ to the longer wavelength side. Namely, the CPU increases the numerical data sent to the D/A converter 202-1 by the value corresponding to $\Delta\lambda d$ (from A5 to A6), and then continues sweeping.

If $\Delta N=\Delta N0$, the CPU 201 maintains the same setting as upon previous sweep (from A6 to A7, from A7 to A8, from A8 to A9, from A10 to A11, and from A11 to A12), and again performs sweeping.

If $\Delta N<\Delta N0$, the CPU 201 shifts the transmission wavelength of the self station $\lambda k$ by $\Delta\lambda d'$ to the shorter wavelength side. Namely, the CPU decreases the numerical data sent to the D/A converter 202-1 by the value corresponding to $\Delta\lambda d'$ (from A9 to A10), and then continues sweeping.

The wavelength control as described above forms an array of the transmission wavelengths from the respective stations with the head on the longer wavelength side in order of communication start on the wavelength axis in the transmission line, similarly as in the first embodiment. Further, with transmission end of a certain terminal station, a gap appearing in the array of transmission wavelengths is automatically bridged, which is also the same. In addition, the setting method of the transmission wavelength $\lambda k$ upon transmission start, the control method when the transmission wavelength of the self station reaches the longest wavelength side of the wavelength range handled by itself, and the operation upon receiving signals are also based on those in the first embodiment.

Applying the optical receiving device 303 provided with the transmitter 402 and receiver 403 performing the above wavelength control to the optical communication system of FIG. 5, a transmitting station can continue transmission as avoiding interference and a receiving station can continue receiving without being out of tune. Since the transmission wavelengths of the respective stations are arranged at suitable intervals on the wavelength axis in the transmission line, the wavelength multiplicity can be increased. Further, it is not necessary to achieve precise stability of the transmission wavelength of each station.

(Embodiment 4)

The fourth embodiment of the present invention is next explained with reference to the drawings.

The present embodiment is arranged to detect only one wavelength in one sweep step before approach of the steady state, similar to Embodiment 3. The present embodiment is different from Embodiment 3 in that, in order to obtain the wavelength spacing $\Delta\lambda c$ between the transmission wavelength of the self station and the transmission wavelength of the other station, the passing wavelength of the wavelength-variable filter is repeatedly swept in a shorter-wavelength-side region in the proximity wavelength region to the transmission wavelength of the other station adjacent to the transmission wavelength of the self station on the longer wavelength side.

The schematic drawing of a system for achieving the wavelength-multiplexing optical communication method of the present embodiment is shown in FIG. 5, the schematic drawing of the optical transmitter-receiver portion of each station in FIG. 6, the setup of the transmitter in FIG. 3, and the setup of the control circuit in the transmitter in FIG. 4. Since the elements in the respective portions are the same as those in the first embodiment, the description thereof is omitted herein.

Figure 13A:
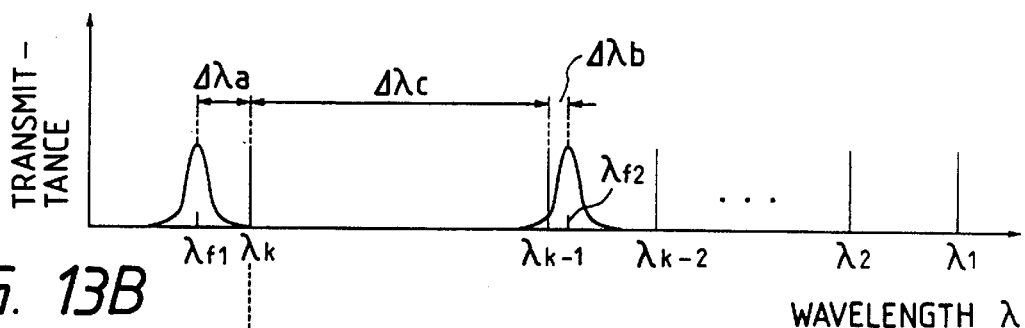
FIGS. 13A to 13D are drawings to illustrate the operation of control circuit 101 in Embodiment 4.
Figure 13B:
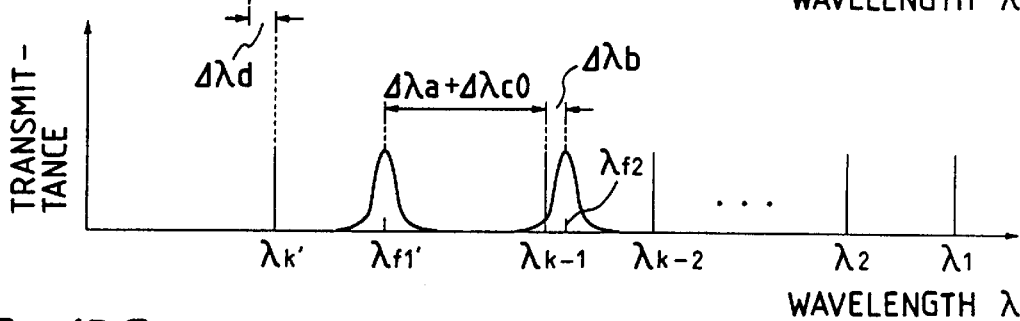
Figure 13C:
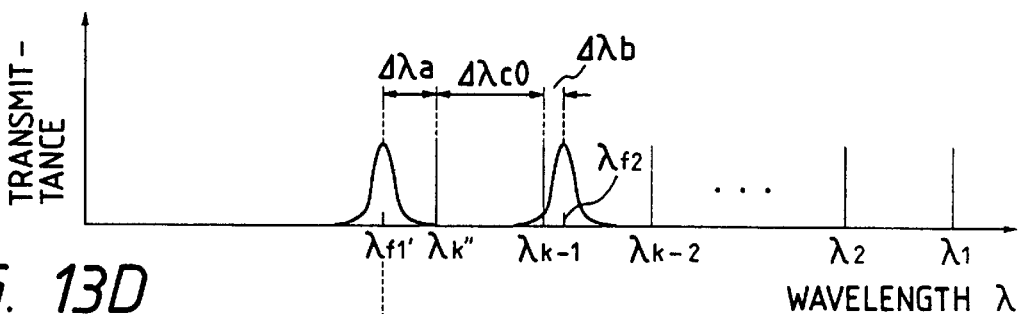
Figure 13D:
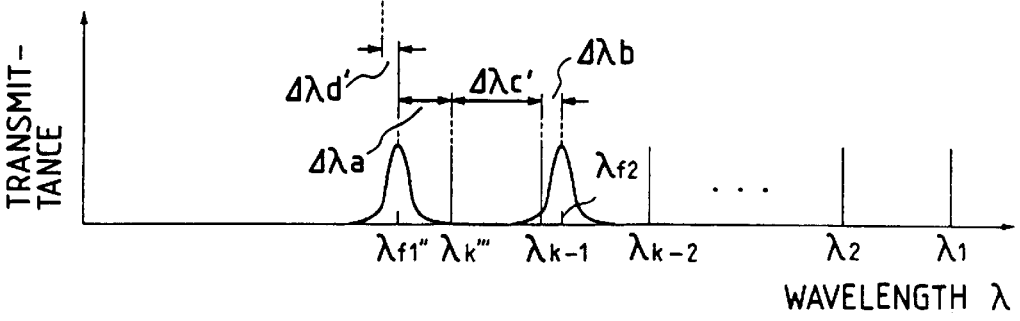

FIGS. 13A to 13D are drawings to show relations on the wavelength axis between the communicating wavelengths and the passing wavelength of the wavelength-variable filter where there are a plurality of terminal stations communicating by the present method. In the drawings, $\lambda 1$ to $\lambda k-1$ represent transmission wavelengths of other stations, $\lambda k$ the transmission wavelength of the self station, $\lambda f1$ the sweep start wavelength of the wavelength-variable filter 105 of the self station, $\lambda f2$ the sweep turning wavelength thereof, and $\Delta\lambda a$ a margin for surely detecting the transmission wavelength of the self station $\lambda k$ before the transmission wavelength $\lambda k$ of the self station comes to interfere with the transmission wavelength $\lambda k-1$ of the other station. Further, $\Delta\lambda b$ is a margin for surely detecting the transmission wavelength of the other station $\lambda k-1$. In addition, $\Delta\lambda c$ is the wavelength spacing between $\lambda k$ and $\lambda k-1$. In the drawings, $\Delta\lambda d$, $\Delta\lambda d'$ represent moving amounts of $\lambda k$, $\lambda f1$, and $\lambda f2$. FIGS. 13A and 13B show cases where $\Delta\lambda c$ is greater than the predetermined value, FIG. 13C a case where $\Delta\lambda c$ is equal to the predetermined value, and FIG. 13D a case where $\Delta\lambda c$ is smaller than the predetermined value.

FIGS. 14A and 14B are drawings to illustrate the operation of the control circuit 101 in the present embodiment. FIG. 14A is a drawing to show a time change of the numerical data N output from the CPU 201 to the D/A converter 202-2. In other words, FIG. 14A shows a time change of the passing wavelength of the wavelength-variable filter 105. In the drawing, A1, A3 to A10 represent points where the transmission wavelength of the self station is detected, and B1 to B10 points where the transmission wavelength of the other station is detected. FIG. 14B is a drawing to show a time change of the numerical data M output from the A/D converter 203. The time scale of the abscissa corresponds to that of FIG. 14A.

The operation of the present embodiment having the above arrangement is next explained particularly focusing on the difference from the first, second, and third embodiments.

Upon transmission, in order to avoid interference and to effectively use the wavelengths, the control circuit 101 repeats the following operation.

The control circuit first sets the transmission wavelength $\lambda k$ and then sets the passing wavelength of the wavelength-variable filter 105 on the shorter wavelength side than $\lambda k$. The control circuit 101 then sweeps the passing wavelength to the longer wavelength side as checking presence or absence of a transmission wavelength, thereby detecting the transmission wavelength of the self station $\lambda k$ and the transmission wavelength $\lambda k\text{-}1$ of the other station adjacent thereto on the longer wavelength side. The control circuit 101 calculates the wavelength spacing $\Delta\lambda c = \lambda k\text{-}1 - \lambda k$ between the two wavelengths, and controls the transmission wavelength $\lambda k$ of the self station so that $\Delta\lambda c$ may become equal to the predetermined value $\Delta\lambda c 0$. Namely, it increases $\lambda k$ by $\Delta\lambda d$ if $\Delta\lambda c > \Delta\lambda c 0$; it maintains the value of $\lambda k$ if $\Delta\lambda c = \Delta\lambda c 0$; it decreases $\lambda k$ by $\Delta\lambda d'$ if $\Delta\lambda c < \Delta\lambda c 0$.

Then the control circuit 101 turns the passing wavelength of the wavelength-variable filter 105 back to the shorter wavelength side, and then continues sweeping as checking presence or absence of a transmission wavelength. After detecting the transmission wavelength of the other station $\lambda k\text{-}1$, the control circuit continues sweeping and then turns sweep back to the longer wavelength side at an appropriate wavelength. Then it continues sweeping as checking presence or absence of a transmission wavelength, and, once detecting the transmission wavelength $\lambda k\text{-}1$ of the other station, it again turns sweep back to the longer wavelength side.

This is carried out for the purpose of checking presence or absence of the transmission wavelength of the self station and a change thereof in the proximity wavelength region on the shorter wavelength side of the transmission wavelength of the other station $\lambda k\text{-}1$. If the control circuit 101 does not detect the transmission wavelength of the self station $\lambda k$ it changes the transmission wavelength of the self station $\lambda k$ to the longer wavelength side; if it detects $\lambda k$ it controls the transmission wavelength of the self station $\lambda k$ so that the wavelength spacing $\Delta\lambda c = \lambda k\text{-}1 - \lambda k$ between the two wavelengths may become equal to the predetermined value $\Delta\lambda c 0$.

FIGS. 13A to 13D show the details of the control. The control circuit 101 starts sweeping from the wavelength $\lambda f1$ shifted by $\Delta\lambda a$ to the shorter wavelength side from $\lambda k$, and monitors the intensity of the transmitted light as sweeping the passing wavelength of the filter to the longer wavelength side. A peak appears at a transmission wavelength of each station. The control circuit 101 first detects the transmission wavelength $\lambda k$ of the self station and the transmission wavelength $\lambda k\text{-}1$ of the other station adjacent thereto on the longer wavelength side. After detecting $\lambda k\text{-}1$, the control circuit 101 continues sweeping from $\lambda k\text{-}1$ up to the wavelength $\lambda f2$ shifted by $\Delta\lambda b$ on the longer wavelength side.

The control circuit 101 calculates the wavelength spacing $\Delta\lambda c = \lambda k\text{-}1 - \lambda k$ between the transmission wavelength of the other station $\lambda k\text{-}1$ and the transmission wavelength of the self station $\lambda k$, and compares it with the predetermined value $\Delta\lambda c 0$. If $\Delta\lambda c > \Delta\lambda c 0$, the control circuit changes the transmission wavelength of the self station $\lambda k$ by $\Delta\lambda d$ to the longer wavelength side (FIG. 13A); if $\Delta\lambda c = \Delta\lambda c 0$ it maintains the value of $\lambda k$; if $\Delta\lambda c < \Delta\lambda c 0$ it changes $\lambda k$ by $\Delta\lambda d'$ to the shorter wavelength side.

Then the control circuit 101 reverses the direction of sweep to the shorter wavelength side, and, once detecting a peak of the transmission wavelength of the other station $\lambda k\text{-}1$, it continues sweeping from $\lambda k\text{-}1$ to the wavelength $\lambda f1'$ shifted by $\Delta\lambda a + \Delta\lambda c 0$ on the shorter wavelength side.

If the control circuit does not detect the transmission wavelength of the self station $\lambda k'$ (FIG. 13B) or if it detects $\lambda k'$ but a difference from the transmission wavelength of the other station $\lambda k\text{-}1$ is greater than the predetermined value $\Delta\lambda c 0$, the control circuit 101 shifts the transmission wavelength of the self station $\lambda k$ by $\Delta\lambda d$ to the longer wavelength side.

If the control circuit detects the transmission wavelength of the self station $\lambda k''$ and if the difference from $\lambda k\text{-}1$ is equal to $\Delta\lambda c 0$ (FIG. 13C), the control circuit 101 maintains the value of $\lambda k''$.

If the control circuit detects the transmission wavelength of the self station $\lambda k'''$ and if the difference $\Delta\lambda c'$ from $\lambda k\text{-}1$ is smaller than $\Delta\lambda c 0$ (FIG. 13D), the control circuit 101 shifts the transmission wavelength of the self station by $\Delta\lambda d'$ to the shorter wavelength side.

Then the passing wavelength of the wavelength-variable filter 105 is swept back to the longer wavelength side to detect $\lambda k$, $\lambda k\text{-}1$ in order, thereby obtaining the wavelength spacing $\Delta\lambda c$. The control circuit 101 again controls the transmission wavelength of the self station to that $\Delta\lambda c$ may become equal to $\Delta\lambda c 0$.

After that, the control circuit repeats such operation as to sweep the passing wavelength in the proximity wavelength region of $\lambda k\text{-}1$, obtain the wavelength spacing $\Delta\lambda c$, and then control the transmission wavelength $\lambda k$ of the self station, as alternately changing the direction of sweep. As a result, the wavelength spacing $\Delta\lambda c$ comes to converge to $\Delta\lambda c 0$.

If the values $\Delta\lambda d$ and $\Delta\lambda d'$ are set to $|\Delta\lambda c - \Delta\lambda c 0|$, $\Delta\lambda c$ can approach $\Delta\lambda c 0$ most quickly. If it is not suitable, a possible arrangement may be constructed in such a manner that a proper fixed value $\Delta\lambda d 0$ is selected and the transmission wavelength of the self station $\lambda k$ is changed by $$\Delta\lambda d 0, \text{ if } |\Delta\lambda c - \Delta\lambda c 0| \geq \Delta\lambda d 0,$$

or $$\Delta\lambda c - \Delta\lambda c 0, \text{ if } |\Delta\lambda c - \Delta\lambda c 0| < \Delta\lambda d 0.$$

These are also the same as in the previous embodiments.

Next explained in detail using FIGS. 14A and 14B is the operation of the control circuit 101 in the present embodiment, performing the wavelength control as described above.

Similar to the first to the third embodiments, the numerical data output from the CPU 201 to the D/A converter 202-1 corresponds to the transmission wavelength $\lambda k$ of the self station. Similarly, the numerical data N sent from the CPU 201 to the D/A converter 202-2 corresponds to the passing wavelength of the wavelength-variable filter 105, and sweep of the passing wavelength is carried out by increasing or decreasing the value by Δn every very short period Δt. The numerical value M output from the A/D converter 203 corresponds to the intensity of the light transmitted by the wavelength-variable filter 105.

As the CPU 201 increases or decreases the numerical data N sent to the D/A converter 202-2 (FIG. 14A), the numerical value M output from the A/D converter 203 comes to have a peak corresponding to the transmission wavelength of each station (FIG. 14B). The CPU 201 repeatedly sweeps the vicinity of a peak (point B1 to point B10) corresponding to the transmission wavelength of the other station λk-1 with a certain sweep width (corresponding to Δλa+Δλb+Δc0 in FIGS. 13A–13B) to look for a peak corresponding to the transmission wavelength of the self station λk.

If the CPU fails to find a peak corresponding to λk, the CPU 201 shifts the transmission wavelength of the self station λk by Δλd to the longer wavelength side. Namely, the CPU increases the numerical data N sent to the D/A converter 202-1 by the value corresponding to Δλd, and continues sweeping.

Finding a peak (point A3 to point A10) corresponding to λk, the CPU 201 executes the following processing. For example, suppose that a peak corresponding to λk appears when the numerical value sent to the D/A converter 202-2 is NA and a peak corresponding to λk-1 appears when the numerical value is NB. The CPU 201 calculates ΔN=ΔNB−ΔNA, which is a quantity corresponding to the wavelength spacing Δλc, and compares it with ΔN0, which is a quantity corresponding to the predetermined value Δλc0.

If ΔN>ΔN0, the CPU 201 shifts λk by Δλd to the longer wavelength side. Namely, it increases the numerical data N sent to the D/A converter 202-1 by the value corresponding to Δλd (from A3 to A4), and continues sweeping.

If ΔN=ΔN0, the CPU 201 maintains the same setting as upon the previous sweep (from A5 to A6, from A8 to A9, and from A9 to A10), and again performs sweeping.

If ΔN<ΔN0, the CPU 201 shifts the transmission wavelength of the self station λk by Δλd' to the shorter wavelength side. Namely, it decreases the numerical data N sent to the D/A converter 202-1 by the value corresponding to Δλd' (from A7 to A8), and continues sweeping.

The wavelength control as described above forms an array of the transmission wavelengths from the respective stations with the head on the longer wavelength side in order of communication starts on the wavelength axis in the transmission line, similarly as in the first embodiment. Further, with transmission end of a certain terminal station, a gap appearing in the array of transmission wavelengths is automatically bridged in the same manner as in the first embodiment. The setting method of the transmission wavelength λk upon transmission start, the control method when the transmission wavelength of the self station reaches the longest wavelength side of the wavelength range handled by itself, and the operation upon receiving, are based on those in the first embodiment.

Applying the optical receiving device 303 provided with the transmitter 402 and receiver 403 performing the above wavelength control to the optical communication system of FIG. 5, a transmitting station can continue sending signals as avoiding interference, and a receiving station can continue receiving signals without being out of tune. Since the transmission wavelengths of the respective stations are arranged at suitable intervals on the wavelength axis in the transmission line, the wavelength multiplicity can be increased. Further, it is not necessary to achieve precise stability of the transmission wavelength of each station.

Since the present embodiment, like Embodiment 3, is arranged to detect only either one of the transmission wavelength of the self station and the adjacent transmission wavelength before reaching the steady state, one sweep step is short. In the previous embodiment and the present embodiment, the transmission wavelength is moved properly for each sweep step.

On that occasion there are chances that a moving amount of the transmission wavelength at a time is limited because of a restriction of a follow-up speed of the receiving station to follow the wavelength. In such cases, the time for convergence to the steady state can be made shorter in Embodiments 3 and 4 because one sweep step in Embodiments 3 and 4 is short.

(Embodiment 5)

The fifth embodiment of the present invention is next explained with reference to the drawings.

The present embodiment is different from Embodiments 1 and 4 as described above in that each station has two wavelength-variable filters for wavelength control. The present embodiment employs an analog circuit as the control circuit, and performs feedback control by the wobbling method.

Figure 15:
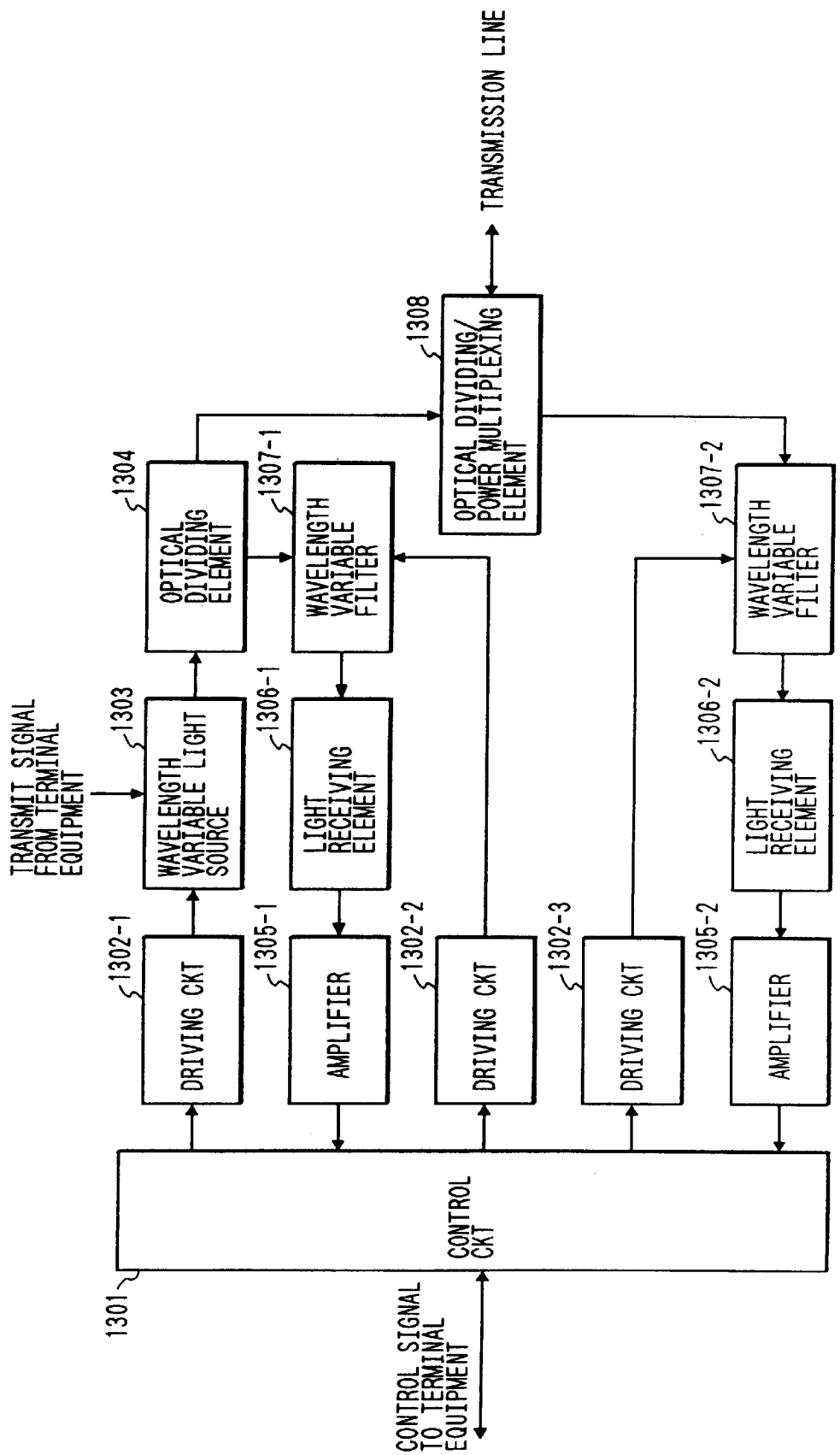
FIG. 15 is a structural drawing of the optical transmitter in the fifth embodiment of the present invention.

FIG. 15 is a structural drawing of a wavelength control system in the transmitter of the present embodiment. Reference numerical 1303 designates a control circuit, which controls an output wavelength of a wavelength-variable light source 1303 and passing wavelengths of wavelength-variable filters 1307-1 and 1307-2 in order to avoid interference with another terminal station. Numeral 1302-1 denotes a drive circuit, which drives the wavelength-variable light source 1303, based on a signal from the control circuit 1301. Numerical 1303 is the wavelength-variable light source, which outputs light to an optical dividing element 1304. This light source can change the wavelength of the output light therefrom by control from the outside, for example like a semiconductor laser. The light source can also modulate, for example, the intensity of the output light in accordance with a transmission signal from the outside. Numerical 1304 denotes the optical dividing element, which divides the output light from the wavelength-variable light source 1303 into two beams and outputs them to the wavelength-variable filter 1307-1 and to an optical dividing/power multiplexing element 1308. Numericals 1307-1 and 1307-2 denote the wavelength-variable filters, which are filters that can change their wavelength regions of the transmitted light by external control, for example such as fiber Fabry-Perot filters. Numeral 1306-1 is a light receiving element, which receives the light from the wavelength-variable light source 1303, having been transmitted by the wavelength-variable filter 1307-1. Numeral 1305-1 denotes an amplifier, which amplifies a signal from the light receiving element 1306-1 and outputs it to the control circuit 1301. Numeral 1302-2 is a drive circuit, which drives the wavelength-variable filter 1307-1, based on a signal from the control circuit 1301. Numeral 1308 is the optical dividing/power multiplexing element, which outputs the output light from the optical dividing element 1304 to the transmission line and outputs received light from the transmission line to the wavelength-variable filter 1307-2. Numeral 1306-2 represents a light receiving element, which receives the light from the transmission line, having been transmitted by the wavelength-variable filter 1307-2. Numeral 1305-2 is an amplifier, which amplifies a signal from the light receiving element 1306-2 and outputs it to the control circuit 1301. Numeral 1302-3 is a drive circuit, which drives the wavelength-variable filter 1307-2, based on a signal from the control circuit 1301.

In the above arrangement, each of the optical dividing element 1304 and the optical dividing/power multiplexing element 1308 is constructed for example of a half mirror or a beam splitter.

The wavelength-variable light source 1303 may be the one as used in Embodiments 1 to 4.

In the present embodiment the wavelength-variable light source 1303 is also composed of the wavelength adjusting section for changing the wavelength of the output light and the output light modulating section for modulating the output light. In the case of a wavelength-variable DBR semiconductor laser, the DBR portion corresponds to the wavelength adjusting section and the active region to the output light modulating section. In the present embodiment, the drive circuit 1302-1 is connected to the wavelength adjusting section. Further, a transmission signal from the terminal equipment is input into the output light modulating section.

The present embodiment may also employ, for example, the FFP (fiber-Fabry-Perot) type filters as the wavelength-variable filters 1307-1, 1307-2.

Let us suppose here that as an input voltage into the drive circuit 1302-1, -2, -3 increases, the wavelength of the wavelength-variable light source 1303 and the passing wavelengths of the wavelength-variable filters 1307-1, 1307-2 each change to the longer wavelength side. Further, when a same voltage is applied to the drive circuits 1302-2 and 1302-3, the passing wavelengths of the wavelength-variable filters 1307-1 and 1307-2 coincide with each other. Namely, the drive circuits 1302-2 and 1302-3 are arranged to absorb the difference in sweep characteristics of the passing wavelengths between the wavelength-variable filters 1307-1 and 1307-2.

Figure 16:
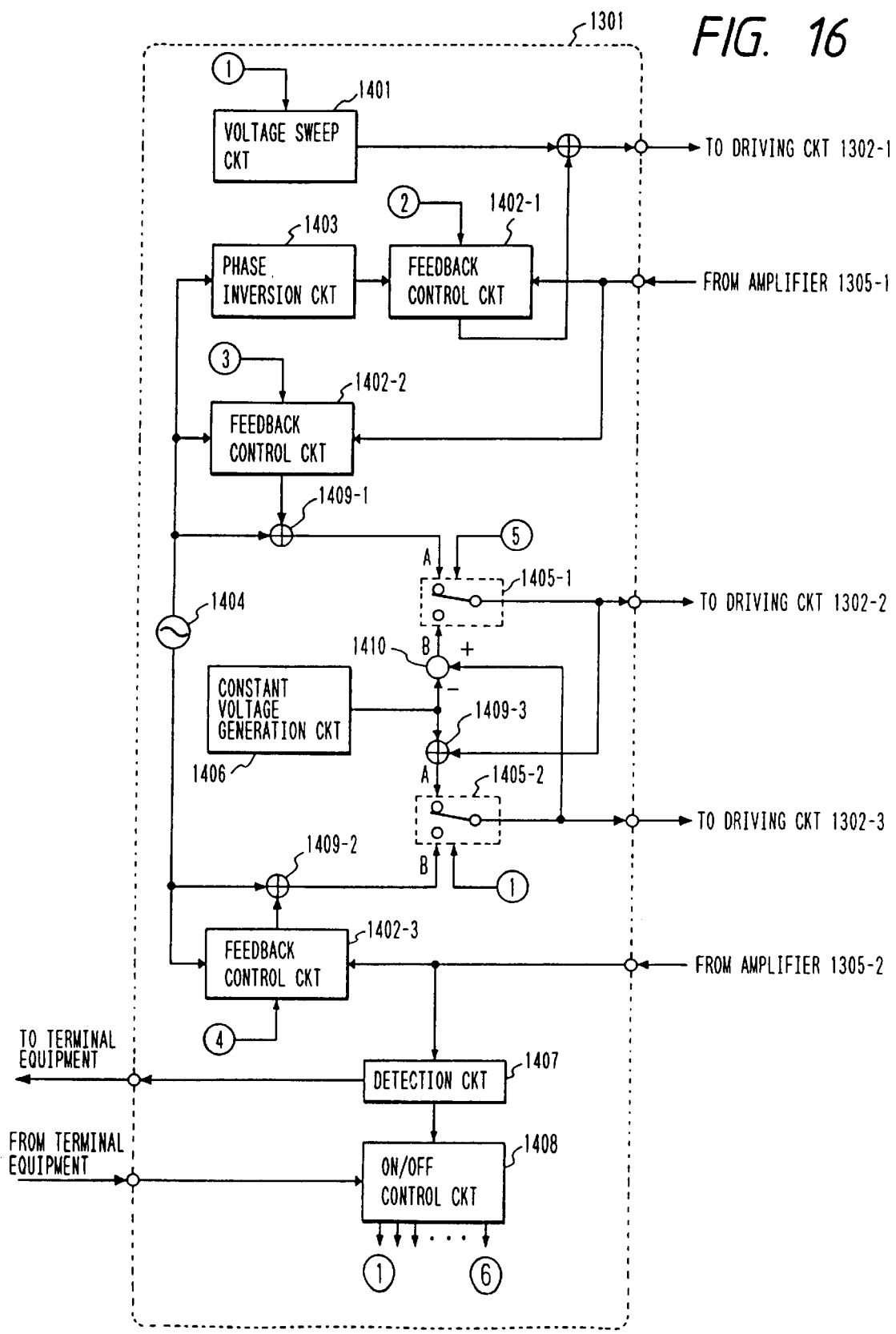
FIG. 16 is a structural drawing of control circuit 1301 in the fifth embodiment of the present invention.

FIG. 16 is a drawing to show the setup of the control circuit 1301 shown in FIG. 15. Numeral 1401 is a voltage sweep circuit, which outputs a control signal for determining the output wavelength of the wavelength-variable light source 1303 to the drive circuit 1302-1. Numeral 1402-1 is a feedback control circuit, which generates a control signal, based on a signal from the amplifier 1305-1 and a signal from the phase inversion circuit 1403, and outputs it to the drive circuit 1302-1. Numeral 1403 denotes a phase inversion circuit, which inverts the phase of the signal from the oscillator 1404 and outputs the inverted signal to feedback control circuit 1402-1. Numeral 1402-2 is a feedback control circuit, which generates a control signal, based on the signal from the amplifier 1305-1 and the signal from an oscillator 1404, and outputs it to a switch 1405-1. Numeral 1404 denotes the oscillator, which outputs a signal to the feedback control circuits 1402-2, 1402-3, phase inversion circuit 1403, and switches 1405-1, 1405-2. Numeral 1405-1 is a switch for switching two inputs, which outputs either one of a sum signal between the control signal from the feedback control circuit 1402-2 and the signal from the oscillator 1404 and a difference signal between the output signal from the switch 1405-2 and a signal from a constant voltage generation circuit 1406 to the drive circuit 1302-2 and to the switch 1405-2. Numeral 1406 is the constant voltage generation circuit, which generates a constant voltage and outputs it to the switches 1405-1 and 1405-2. Numeral 1405-2 is a switch for switching two inputs, which outputs either one of a sum signal between the control signal from the feedback control circuit 1402-3 and the signal from the oscillator 1404 and a sum signal between the output signal from the switch 1405-2 and the signal from the constant voltage generation circuit 1406 to the drive circuit 1302-3 and the switch 1405-1. Numeral 1402-3 denotes the feedback control circuit, which generates a control signal, based on the signal from the amplifier 1305-2 and the signal from the oscillator 1404, and outputs it to the switch 1405-2. Numeral 1407 designates a detection circuit, which determines upon transmission whether there exists a transmission wavelength of one other station in the proximity wavelength region of the transmission wavelength of the self station or not, and outputs a signal indicating a result thereof to an ON/OFF control circuit 1408. Upon receiving, the detection circuit 1407 detects a receiving signal based on the signal from the amplifier 1305-2 and outputs it to the terminal equipment. Numeral 1408 is the ON/OFF control circuit, which controls ON/OFF of sweep of the voltage sweep circuit 1401, ON/OFF of feedback of the feedback control circuits 1402-1 to -3, and switch of inputs of the switches 1405-1, 1405-2. Numeral 1409-1 is an adder, which adds the output from the feedback control circuit 1402-2 to the output from the oscillator 1404 and outputs a result to the switch 1405-1. Numeral 1409-2 is also the adder, which adds an output from the feedback control circuit 1402-3 to the output from the oscillator 1404 and outputs a result to the switch 1405-2. Numeral 1409-3 is an adder, which adds the output from the switch 1405-1 to the output from the constant voltage generation circuit 1406 and outputs a result to the switch 1405-2. Numeral 1410 is a subtracter, which subtracts the output from the constant voltage generation circuit 1406 from the output from the switch 1405-2 and outputs a result to the switch 1405-1.

A system for achieving the wavelength-multiplexing optical communication method of the present embodiment is the one shown in FIG. 5.

The setup of the optical transmitter-receiver portion of each terminal 302-1 to 302-n is the same as the one shown in FIG. 6.

Figure 17:
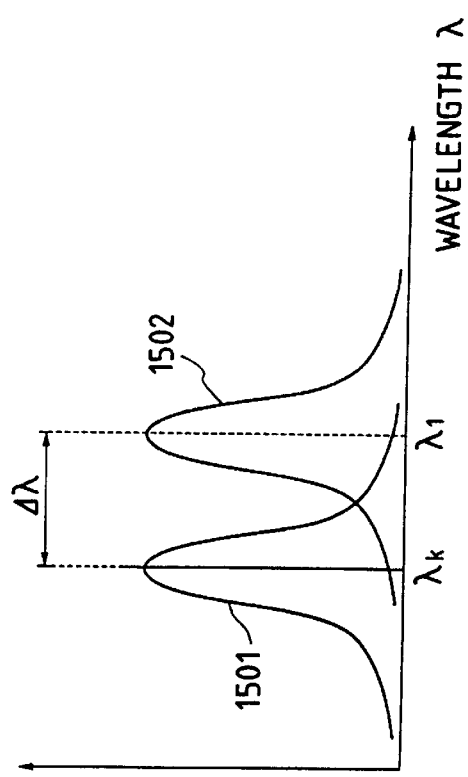
FIG. 17 is a drawing to show a relation between the passing wavelength of the wavelength-variable filter shown in FIGS. 13A to 13D and the wavelength of output light from the wavelength-variable light source.

FIG. 17 is a drawing to show a relative relation between the passing wavelengths of the wavelength-variable filters 1307-1, 1307-2 shown in FIG. 15 and the output wavelength of the wavelength-variable light source 1303. In the drawing, numeral 1501 indicates a wavelength transmission characteristic of the wavelength-variable filter 1307-1 and numeral 1502, a wavelength transmission characteristic of the wavelength-variable filter 1307-2. Further, $\lambda k$ represents the transmission wavelength of the wavelength-variable light source 1303 and the passing wavelength of the wavelength-variable filter 1307-1, and $\lambda 1$ the passing wavelength of the wavelength-variable filter 1307-2.

Figure 18A:
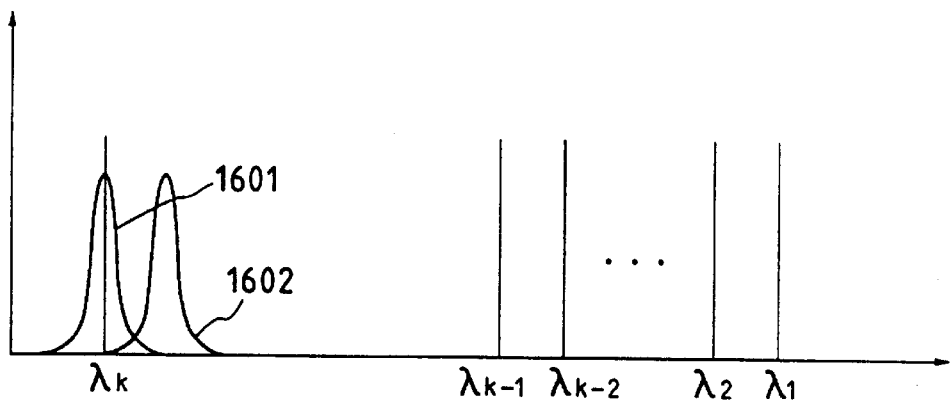
FIGS. 18A to 18C are drawings to illustrate the operation of the wavelength-variable light source and wavelength-variable filters in the transmitter of each terminal station in the fifth embodiment of the present invention.
Figure 18B:
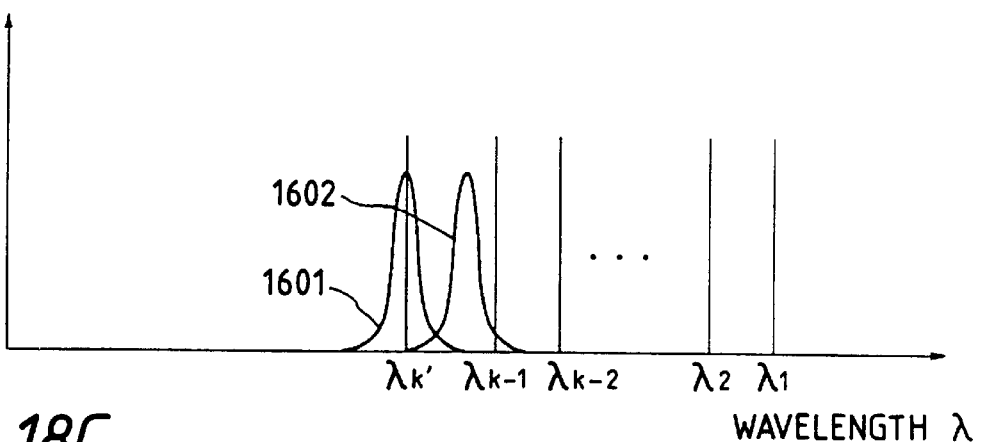
Figure 18C:
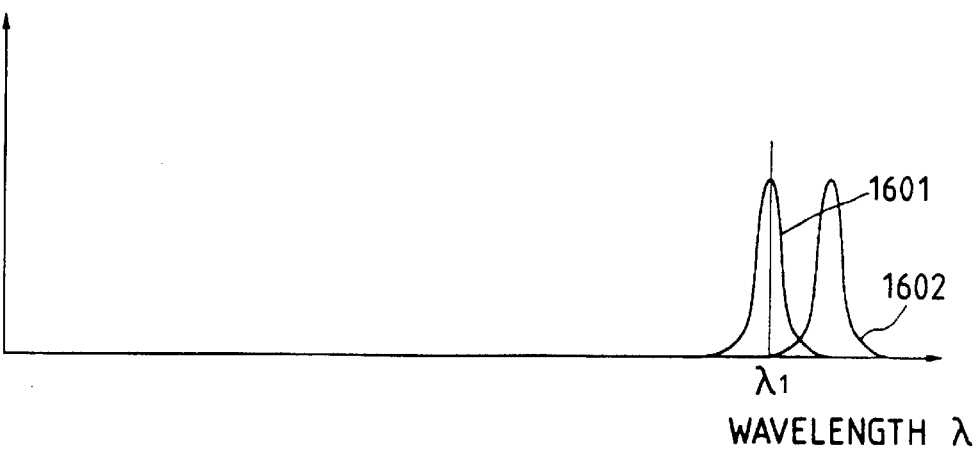

FIGS. 18A to 18C show relations on the wavelength axis between the communicating wavelengths and the passing wavelengths of the wavelength filters where there are a plurality of terminal stations communicating by the present method. Here $\lambda 1$ to $\lambda k-1$ represent transmission wavelengths of other terminals. Further, $\lambda k$ and $\lambda k'$ are transmission wavelengths of the self terminal (say a terminal 303-1). Numeral 1601 represents a transmitting spectrum of the wavelength-variable filter 1307-1 of the self terminal. Numeral 1602 indicates a transmitting spectrum of the wavelength-variable filter 1307-2 of the self terminal. FIG. 18A shows a case where the self terminal starts transmission, FIG. 18B a case where the self terminal detects a transmission wavelength of another terminal, and FIG. 18C a case where the transmission wavelength of the self terminal reaches the longest wavelength side of the wavelength range handled by itself.

Figure 19:
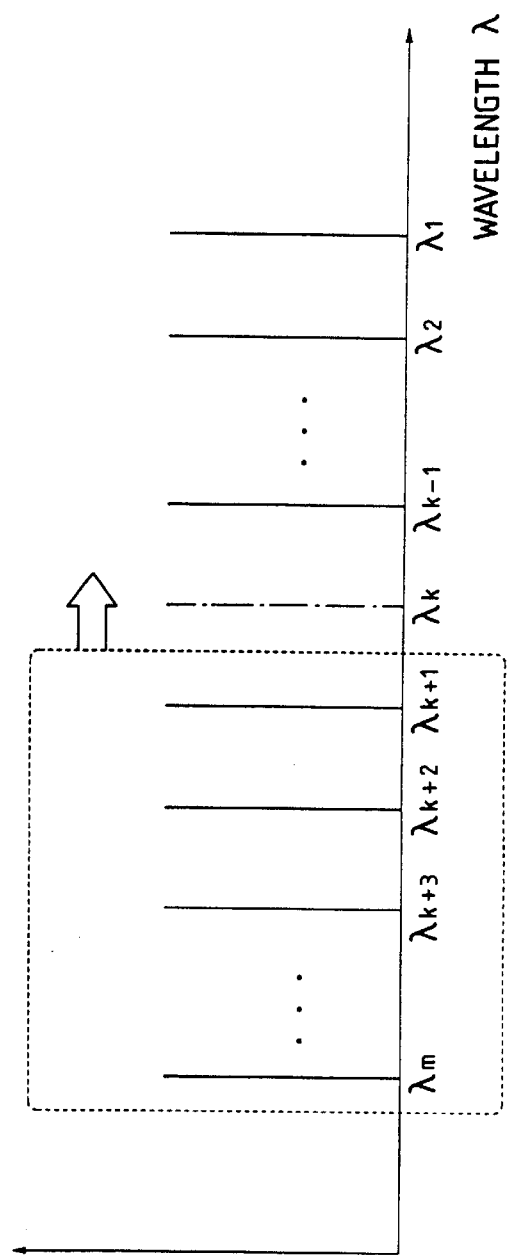
FIG. 19 is a drawing to illustrate control of transmission wavelength of each terminal in the fifth embodiment of the present invention.

FIG. 19 is a drawing to illustrate a state of the control of communication wavelengths where there are a plurality of terminals communicating by the present method. In the drawing, $\lambda 1$ to $\lambda m$ represent the transmission wavelengths of the respective terminals.

FIG. 22 is a drawing to illustrate the operation of the ON/OFF control circuit 1408 in the control circuit 1301 in the present embodiment.

Next explained is the operation upon transmission of the present embodiment having the above arrangement.

In the present embodiment, the transmitter 402 is connected through the optical dividing/power multiplexing element 401 to the transmission line. The setup of the wavelength control system enclosed in the transmitter 402 is shown in FIG. 15. In order to avoid interference and to effectively use the wavelengths, the control circuit 1301 controls the wavelength of the output light from the wavelength-variable light source 1303, i.e., the transmission wavelength, and the passing wavelengths of the wavelength-variable filters 1307-1, 1307-2 in the following manner.

For one terminal, FIG. 17 shows the relative relation among the transmission wavelength and the two passing wavelengths of the wavelength-variable filters. As shown in the drawing, the control circuit 1301 performs such control as to keep the passing wavelength of the wavelength-variable filter 1307-1 and the transmission wavelength $\lambda k$ always coincident with each other. Further, the control circuit controls the passing wavelengths of the wavelength-variable filters 1307-1 and 1307-2 so as to keep a difference between the passing wavelengths ($\Delta\lambda = \lambda1 - \lambda k$ in the drawing) always constant.

FIGS. 18A to 18C show relations on the wavelength axis between the transmission wavelengths and the passing wavelengths of the wavelength-variable filters for plural terminals in communication by the present method.

FIG. 18A shows a case where a transmission signal of another terminal is not detected or where the intensity of the transmitted light by the wavelength-variable filter 1307-2 dos not exceed a predetermined value. In this case, the control circuit 1301 controls the passing wavelength of the wavelength-variable filter 1307-1 so as to follow up the transmission wavelength. At the same time, the control circuit controls the passing wavelength of the wavelength-variable filter 1307-2 so that it can follow up the passing wavelength of the wavelength-variable filter 1307-1 while keeping the wavelength difference $\Delta\lambda$ constant. Further, the control circuit continuously changes the transmission wavelength $\Delta k$ of the self terminal to the longer wavelength side.

A method for starting transmission of the self terminal may be selected from those as described in Embodiment 1.

It is also conceivable that the transmission wavelength of the self terminal reaches the longest wavelength side of the wavelength range handled by itself without detecting a transmission signal of any other terminal (FIG. 18C). For example, such a case may occur when the self terminal starts communication in a state where no other terminal is in communication in the present communication system. In this case, the control circuit 1301 stops changing the transmission wavelength to the further longer wavelength side. Specifically, the control circuit holds the output from the drive circuit 1302-1 for driving the wavelength-variable light source 1303.

FIG. 18B shows a case where a transmission signal of another terminal is detected, that is, where the intensity of the transmitted light by the wavelength-variable filter 1307-2 exceeds the predetermined value. The control circuit 1301 controls the passing wavelength of the wavelength-variable filter 1307-2 so as to make it coincide with the transmission wavelength $\lambda k-1$ from another terminal. At the same time, the control circuit controls the passing wavelength of the wavelength-variable filter 1307-1 so as to make it follow up the passing wavelength of the wavelength-variable filter 1307-2 as keeping the wavelength difference $\Delta\lambda$ constant. Further, the control circuit controls the transmission wavelength $\lambda k'$ so as to make it coincide with the passing wavelength of the wavelength-variable filter 1307-1.

This control forms an array of the transmission wavelengths from the respective terminals with the head on the longer wavelength side on the wavelength axis in the transmission line. FIG. 19 shows a state of the control. Here, let us suppose that m terminals of 303-1 to 303-m are transmitting respective signals, using their own wavelengths of $\lambda 1$ to $\lambda m$.

Also in this embodiment, when a certain terminal ends its transmission, a gap appears in the array of transmission wavelengths. However, since the gap is bridged by moving an array of transmission wavelengths located on the shorter wavelength side than the gap to the longer wavelength side, the wavelength region can be effectively used.

Explained in further detail is the configuration and operation of the control circuit 1301 performing the wavelength control as described above.

This control circuit is arranged to switch the control methods of wavelengths in accordance with determination of the ON/OFF control circuit, based on a signal from the terminal equipment or a signal from the detection circuit 1407, as discriminating the following two cases from each other: (1) a case where a transmission signal of another terminal is not detected; (2) a case where a transmission signal of another terminal is detected. FIG. 22 shows the control performed by the ON/OFF control circuit for the respective cases. The operation in the respective cases is explained in order.

(1) The case where a transmission signal of another terminal is not detected

This corresponds to the case of FIG. 18A. The control circuit 1301 controls the wavelength-variable light source 1303 to output a signal from the terminal equipment as gradually increasing the transmission wavelength. For that, the voltage sweep circuit 1401 outputs to the drive circuit 1302-1 a signal to gradually increase the voltage as a wavelength control signal, thereby increasing the transmission wavelength of the wavelength-variable light source 1303. The feedback control circuit 1402-1 is not actuated.

Further, the control circuit 1301 controls the passing wavelength of the wavelength-variable filter 1307-1 so as to make it coincide with the transmission wavelength of the wavelength-variable light source 1303. For that, the feedback control circuit 1402-2 is actuated to generate a control signal for the wavelength-variable filter 1307-1, based on the signal from the amplifier 1305-1 (a light signal transmitted by the wavelength-variable filter 1307-1). The switch 1405-1 is on on the side A to output the control signal as described above to the drive circuit 1302-2, thereby controlling the passing wavelength of the wavelength-variable filter 1307-1.

In the present embodiment each feedback control circuit 1402-1 to 1402-3 is arranged to compare an input signal with a modulation signal from a modulator 204 for effecting fine modulation, and to output a control signal which is positive if the two signals have the same phase, or negative if the signals have the opposite phases, as a control signal. When the output from the modulator is used as a modulation signal and the intensity signal of the transmitted light by the wavelength-variable filter (which slightly modulates the passing wavelength by the modulation signal) is used as an input signal as in the present embodiment, a positive output is obtained when the passing wavelength is shifted to the shorter wavelength side than the transmission wavelength or a negative output is obtained when the passing wavelength is shifted to the longer wavelength side. This is because the passing wavelength of the wavelength-variable filter is also finely modulated. The passing wavelength can be made to coincide with the transmission wavelength by feeding the above output back to the passing wavelength of the wavelength-variable filter. The principle and constitution of such feedback control circuit and filter control system are explained in detail for example in Japanese Laid-Open Patent Application No. 1-177518.

Further, the wavelength control circuit 1301 controls the passing wavelength of the wavelength-variable filter 1307-2 to keep the difference Δλ of the center passing wavelength from the wavelength-variable filter 1307-1 always constant. For that, the feedback control circuit 1402-2 is actuated and the output therefrom is added to the output from the constant voltage generation circuit 1406 to generate a control signal for the wavelength-variable filter 1307-2. Here, a voltage generated by the constant voltage generation circuit corresponds to a wavelength of the difference between the passing wavelengths of the two wavelength-variable filters. The switch 1405-2 is on on the side A, and the control signal as described above is output to the drive circuit 1302-3, thereby controlling the passing wavelength of the wavelength-variable filter 1307-2. The feedback control circuit 1402-3 is not actuated.

The detection circuit 1407 is monitoring the signal from the amplifier 1305-2. When the signal exceeds a predetermined level, the detection circuit sends a control signal of "detected" to the ON/OFF control circuit 1408. This level is set lower than the level of the signal output from the amplifier 1305-2 when the transmission wavelength of the other terminal approaches the transmission wavelength of the self terminal up to immediately before causing interference.

A special case conceivable is a case where the transmission wavelength of the self terminal is located on the longest wavelength side among the transmission wavelengths on the transmission line. This corresponds to the case of FIG. 18C. The output voltage of the voltage sweep circuit 1401 is arranged to saturate at a certain value. This value is set as far on the longer wavelength side as possible in a common portion of the wavelength-variable ranges of the wavelength-variable light source and the two wavelength-variable filters.

(2) The case where the transmission signal of another terminal is detected.

This corresponds to the case of FIG. 18B. The control circuit 1301 controls the wavelength-variable light source 1303 to make the transmission wavelength coincide with the passing wavelength of the wavelength-variable filter 1307-1. For that, the control circuit keeps the output from the voltage sweep circuit at the same magnitude as that at the time of change from the state of the case (1). Further, the feedback control circuit 1402-1 is actuated to generate a control signal for the wavelength-variable light source 1303, based on the signal from the amplifier 1305-2.

The control circuit 1301 also controls the passing wavelength of the wavelength-variable filter 1307-1 to keep a wavelength difference from the passing wavelength of the wavelength-variable filter 1307-2 always constant. For that, the switches 1405-1 and 1405-2 are made on the side B. The feedback control circuit 1402-3 is actuated, an output from the constant voltage generation circuit 1406 is subtracted from the output from the feedback control circuit, and thereafter the result is output to the drive circuit 1302-2 to change the passing wavelength of the wavelength-variable filter 1307-1. The feedback control circuit 1402-2 is not actuated.

Further, the control circuit 1301 controls the passing wavelength of the wavelength-variable filter 1307-2 to make the passing wavelength coincide with a transmission wavelength of another terminal located on the longer wavelength side from, and closest to the transmission wavelength of the self terminal, out of the transmission wavelengths of the other terminals. This wavelength corresponds to λk-1 in FIG. 18B. For that, the feedback control circuit 1402-3 is actuated to generate a control signal for the wavelength-variable filter 1307-2, based on the signal from the amplifier 1305-2 (the light signal transmitted by the wavelength-variable filter 1307-2). The switch 1405-2 is made on on the side B, and the control signal as described above is output to the drive circuit 1302-3, thereby controlling the passing wavelength of the wavelength-variable filter 1307-2.

Similarly as in the case of (1), the detection circuit 1407 is monitoring the signal from the amplifier 1305-2, and sends a control signal of "not detected" to the ON/OFF control circuit 1408 when the signal becomes lower than the predetermined level.

The operation upon receiving is in the same as in Embodiments 1 to 4.

Applying the optical transmitter-receiver device 303 provided with the transmitter 402 and receiver 403 performing the above wavelength control to the optical communication system of FIG. 5, a transmitting terminal can continue transmitting signals as avoiding interference, and a receiving terminal can continue receiving signals without being out of tune. Since the transmission wavelengths of the respective stations are arranged at suitable intervals on the wavelength axis in the transmission line, the wavelength multiplicity can be increased. Further, it is not necessary to achieve precise stability of the transmission wavelength of each station.

(Embodiment 6)

The sixth embodiment of the present invention is next explained with reference to the drawings.

The basic constitution and operation of the present embodiment are the same as those of Embodiment 5. However, the present embodiment realizes the control of the wavelength-variable light source and wavelength-variable filters in the transmitter by using a control circuit having a construction different from that in Embodiment 5. Specifically, a digital circuit is used as the control circuit, and thus, feedback control is carried out by digital control.

The schematic drawing of a system for achieving the wavelength-multiplexing optical communication method of the present embodiment is shown in FIG. 5, and the schematic drawing of the optical transmitter-receiver portion of each terminal in FIG. 15. The operation of each portion is the same as in Embodiment 5, and thus, the description is omitted herein.

Figure 20:
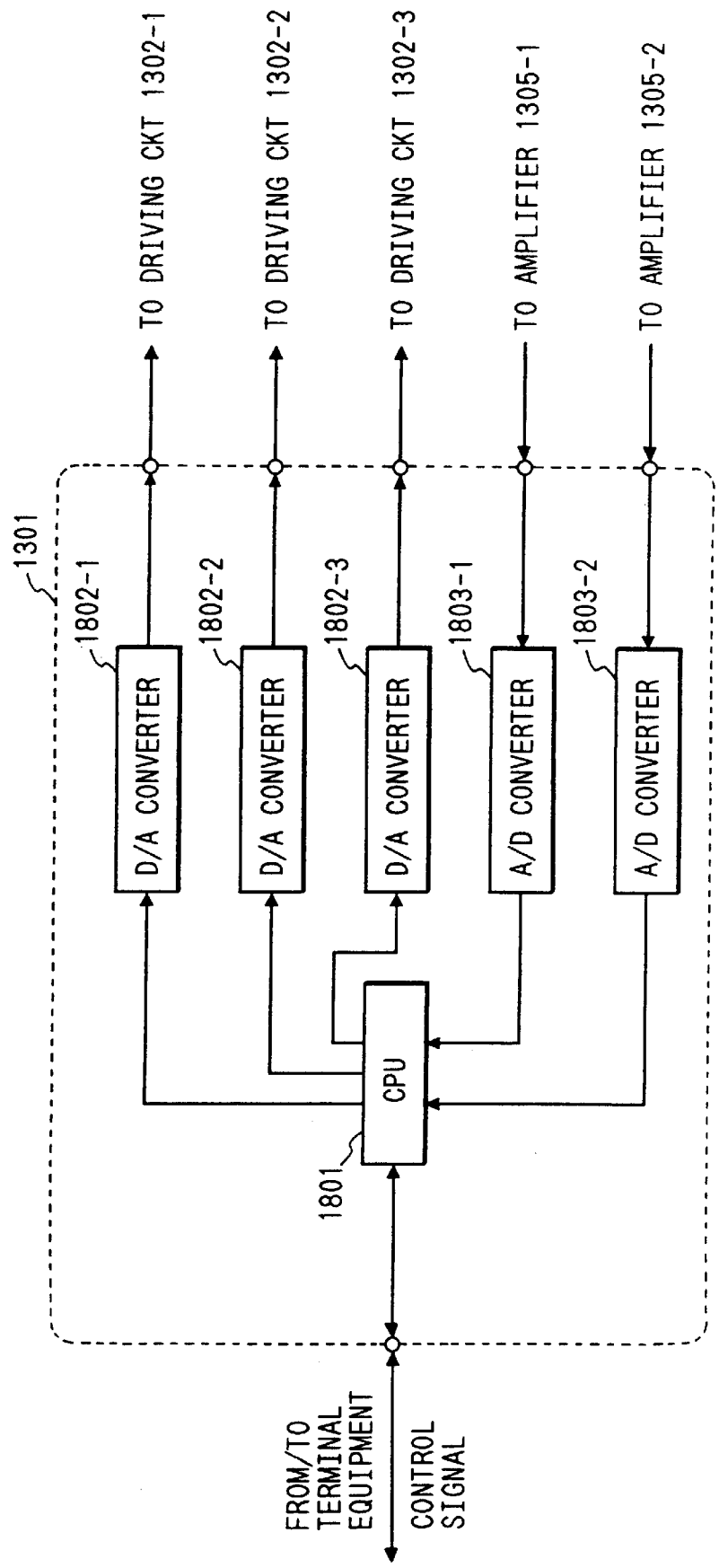
FIG. 20 is a structural drawing of control circuit 1301 in the sixth embodiment of the present invention.

FIG. 20 is a drawing to show the setup in the present embodiment, of the control circuit 1301 shown in FIG. 15.

Numeral 1801 designates a CPU, which receives a control signal from terminal equipment, receives data from A/D converters 1803-1 and 1803-2, and sends data to D/A converters 1802-1 to 1802-3 after completion of necessary calculations. Numeral 1802-1 is a converter, which outputs a control signal for determining the transmission wavelength of the wavelength-variable light source 1303 to the drive circuit 1302-1, based on the data from the CPU 1801. Numeral 1802-2 is a D/A converter, which outputs a control signal for determining the passing wavelength of the wavelength-variable filter 1307-1 to the drive circuit 1302-2, based on the data from the CPU 1801. Numeral 1802-3 is a D/A converter, which outputs a control signal for determining the passing wavelength of the wavelength-variable filter 1307-2 to the drive circuit 1302-3, based on the data from the CPU 1801. Numeral 1803-1 is an A/D converter, which converts the signal obtained from the amplifier 1305-1 into a digital signal and outputs it to the CPU 1801. Numeral 1803-2 is an A/D converter, which converts the signal obtained from the amplifier 1305-2 into a digital signal and outputs it to the CPU 1801.

Figure 21A:
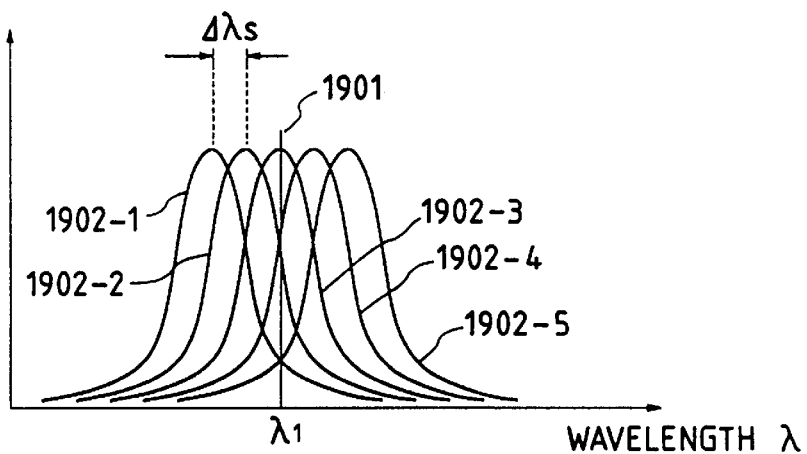
FIGS. 21A to 21C are drawings to illustrate the operation of control circuit 1301 in the sixth embodiment of the present invention.
Figure 21B:
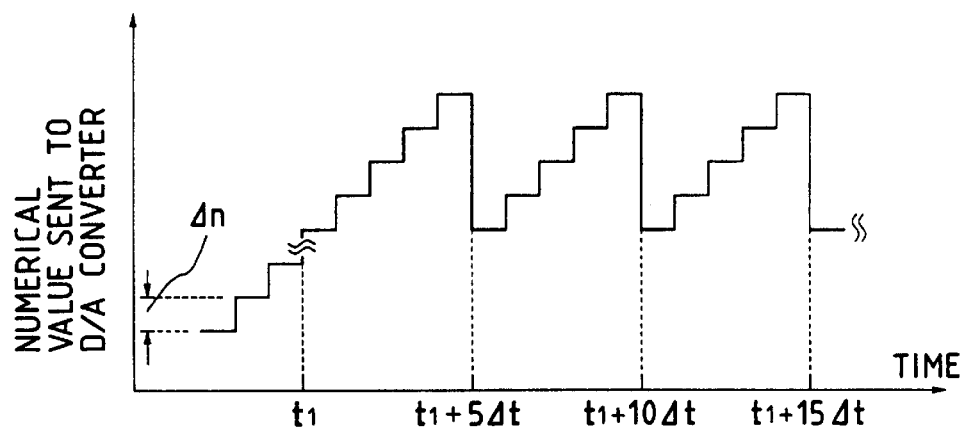
Figure 21C:
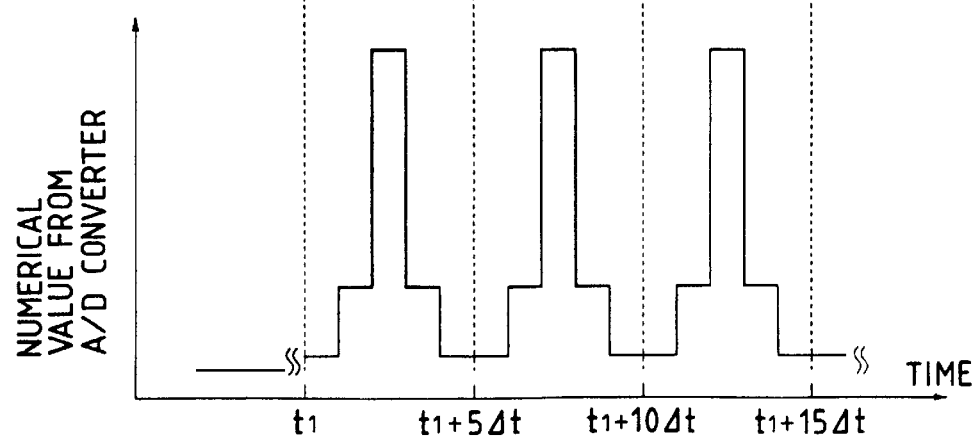

FIGS. 21A to 21C are drawings to illustrate the operation of the control circuit 1301 in the present embodiment. FIG. 21A shows a time change of transmission spectrum of the wavelength-variable filter, FIG. 21B a time change of a numerical value sent from the control circuit to the D/A converter, and FIG. 21C a time change of a numerical value received by the control circuit from the A/D converter.

Next explained in detail is the operation of the control circuit 1301 in the present embodiment, having the above arrangement. Also in this control circuit, the operation is different for the following two cases: (1) the case where a transmission signal of another terminal is not detected; (2) the case where a transmission signal of another terminal is detected. The operation states are switched by the CPU 1801, judging either based on the signal from the terminal equipment and the signal from the A/D converter 1803-2. The two cases will be explained in order.

(1) The case where a transmission signal of another terminal is not detected

This corresponds to the case of FIG. 18A. The control circuit 1301 controls the wavelength-variable light source 1303 to output the signal from the terminal equipment to the transmission line while gradually increasing the transmission wavelength. For that, the CPU 1801 controls the D/A converter 1802-1 to gradually increase the output therefrom. The output from the D/A converter 1802-1 is sent to the drive circuit 1302-1 to increase the wavelength of the output light from the wavelength-variable light source 1303.

Further, the control circuit 1301 controls the passing wavelength of the wavelength-variable filter 1307-1 to make it coincide with the transmission wavelength of the wavelength-variable light source 1303. FIGS. 21A to 21C are drawings to illustrate it. In FIG. 21A, numeral 1901 represents the transmission wavelength, and 1902-1 to 1902-5 transmission spectra of the filter. As shown in FIG. 21A, the passing wavelength of the wavelength-variable filter 1307-1 is swept in a certain range and the sweep start wavelength is controlled so as to keep the transmission wavelength of the wavelength-variable light source 1303 within the range.

This can be realized for example by the following control of CPU 1801. The CPU 1801 sends numerical data to the D/A converter 1802-2 to increase the value by $\Delta n$ every very short period $\Delta t$. Here, the numerical value sent to the D/A converter 1802-2 corresponds to an output voltage thereof and the passing wavelength of the wavelength-variable filter 1307-1, and $\Delta n$ to the minimum change $\Delta\lambda s$ of the passing wavelength of the wavelength-variable filter 1307-1. At the same time, the CPU 1801 monitors the numerical value output from the A/D converter 1803-1. Here, the numerical value from the A/D converter 1803-1 corresponds to the intensity of the light transmitted by the wavelength-variable filter 1307-1.

As the CPU 1801 increases the numerical value sent to the D/A converter 1802-2, the numerical value obtained from the A/D converter 1803-1 comes to have a peak when the passing wavelength of the wavelength-variable filter 1307-1 comes to coincide with the transmission wavelength of the wavelength-variable light source 1303. Once a peak is found, the numerical value sent to the D/A converter 1802-2 is swept within a proper range, and then the sweep start value is controlled always to find a peak. FIG. 21B shows an example of the time change of the numerical value sent from the CPU 1801 to the D/A converter 1802-2 when the above control is performed. FIG. 21C shows a time change of the numerical data obtained from the A/D converter 1803-1 by the CPU 1801 on that occasion.

The minimum unit $\Delta n$ of the change of the numerical value sent to the D/A converter is preliminarily set to a value suitable for the CPU finding a peak, taking the filter finesse and range of sweep into consideration.

Further, the control circuit 1301 controls the passing wavelength of the wavelength-variable filter 1307-2 to keep the difference $\Delta\lambda$ of the passing wavelength from the wavelength-variable filter 1307-1 always constant. The CPU 1801 realizes the above control by sending a numerical value $N+\Delta N$ obtained by adding a constant $\Delta N$ to the numerical data N sent to the D/A converter 1802-2, to the D/A converter 1802-3. Here, the constant $\Delta N$ corresponds to the wavelength of the difference between the two passing wavelengths of the wavelength-variable filters. The value is preliminarily set to a magnitude not causing interference upon receiving signals.

Further, a determination as to whether a transmission signal from another terminal is detected upon transmission near the transmission wavelength of the self terminal is carried out as follows. The CPU 1801 always monitors the numerical data of the output from the A/D converter 1803-2, and transfers the control into the state of (2) as described below when it exceeds a predetermined value. This value is set to a lower value than the numerical value output from the A/D converter 1803-2 when the transmission wavelength of the other terminal approaches the transmission wavelength of the self terminal until just before causing interference.

The upper limit is set for the numerical data sent from the CPU 1801 to the D/A converter 1802-1 for the case where the transmission wavelength of the self terminal is located at the longest wavelength side of the transmission wavelengths on the transmission line, that is, for the case corresponding to FIG. 18C. This value is set as far on the longer wavelength side as possible in a common portion of the wavelength-variable ranges of the wavelength-variable light source and two wavelength-variable filters.

(2) The case where a transmission signal of another terminal is detected

This corresponds to the case of FIG. 18B. The control circuit 1301 controls the transmission wavelength of the wavelength-variable light source 1303 to make it coincide with the passing wavelength of the wavelength-variable filter 1307-1. More precisely, sweeping the transmission wavelength of the wavelength-variable light source 1303 within a certain range, the transmission wavelength of the wavelength-variable light source is controlled so as to keep the passing wavelength of the wavelength-variable filter 1307-1 within the range. This can be realized by the CPU 1801 performing the control similar to the case of (1). Namely, sweeping the numerical data sent to the D/A converter 1802-2, the numerical value from the A/D converter 1803-1 is monitored. Once a peak corresponding to the transmission wavelength is found, the numerical data sent to the D/A converter 1802-2 is swept in an appropriate range to control the transmission wavelength, in other words, the numerical data sent to the D/A converter 1802-1, so as to always find a peak within the range.

Further, the control circuit 1301 controls the passing wavelength of the wavelength-variable filter 1307-1 to keep the difference $\Delta\lambda$ of the passing wavelength from the wavelength-variable filter 1307-2 always constant. The CPU 1801 realizes the above control by sending a numerical value N–ΔN obtained by subtracting a constant ΔN preliminarily set from the numerical data N sent to the D/A converter 1802-3, to the D/A converter 1802-2. Here, the constant ΔN corresponds to a wavelength of the difference between the passing wavelengths of the two wavelength-variable filters, which is equal to the constant ΔN used in the case of (1).

Further, the control circuit 1301 controls the passing wavelength of the wavelength-variable filter 1307-2 to make it coincide with a transmission wavelength of another terminal on the longer wavelength side from, and closest to the transmission wavelength of the self terminal, out of the transmission wavelengths of the other terminals. This wavelength corresponds to λk-1 in FIG. 18B. This can be realized by the CPU 1801 performing control very similar to that in the case of (1). Namely, sweeping the numerical data sent to the D/A converter 1802-3, the numerical value from the A/D converter is monitored. Once a peak is found corresponding to the transmission wavelength from the other terminal, the numerical value sent to the D/A converter 1802-3 is swept within a suitable range and the sweep start value is controlled so as to always find a peak within the range.

The CPU 1801 always monitors the numerical data as being the output from the A/D converter 1803-2, similarly as in the case of (1), and control is transferred to the state of (1) as discussed previously when the numerical data becomes lower than the predetermined value.

Applying the optical transmitter-receiver unit 303 provided with the transmitter 402 and receiver 403 performing the above wavelength control to the optical communication system of FIG. 5, a transmitting terminal can continue transmission as avoiding interference, and a receiving terminal can continue receiving signals without being out of tune. Since the transmission wavelengths of the respective stations are arranged at suitable intervals on the wavelength axis in the transmission line, the wavelength multiplicity can be increased. Further, it is not necessary to achieve precise stability of the transmission wavelength of each station.

Since Embodiments 5 and 6 detect the transmission wavelength of the self station and the adjacent wavelength independently of each other, repetition of sweep steps becomes unnecessary, and high-speed control becomes possible. This permits the system to quickly transfer to the steady state and increases the response speed to a change of the wavelength.

(Embodiment 7)

In this embodiment, the following light source is used as the wavelength variable or tunable light source. This light source includes an optical amplifier portion, an optical wavelength selecting portion for causing light at a predetermined wavelength out of light emitted from the optical amplifier portion to re-enter the optical amplifier portion, and a control unit for controlling the wavelength of the re-entering light by controlling the positional relationship between at least a part of the optical wavelength selecting portion and the optical amplifier portion. Since this light source controls the wavelength of its output light by controlling the above positional relationship, its wavelength changeable or tunable range is wider than that of a light source, such as wavelength tunable DFB and DBR lasers which control the wavelength of output light by controlling the refractive index in those devices. Such a light source is known as a so-called external cavity laser diode (LD).

Figure 23:
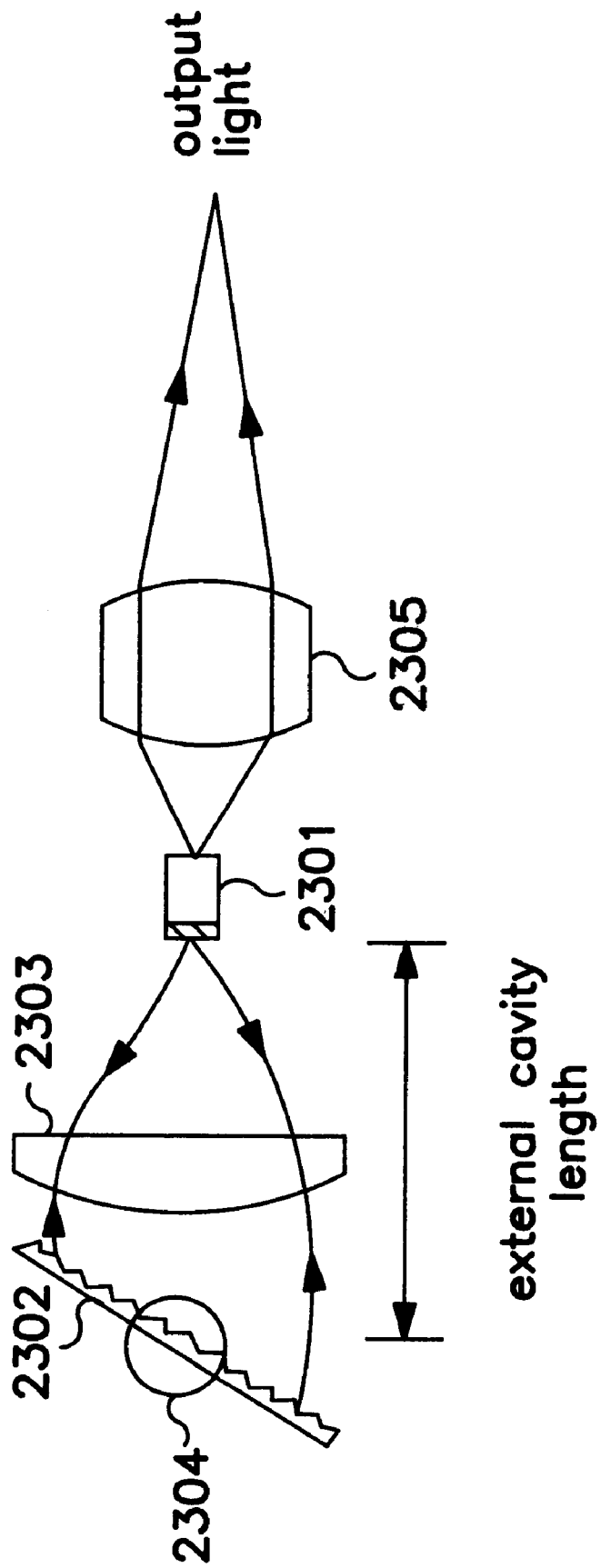
FIG. 23 is a view illustrating the schematic structure of an external cavity laser diode (LD)

FIG. 23 illustrates an external cavity LD used as the light outputting means in this embodiment. This device includes an LD chip 2301 serving as the optical amplifier portion, a diffraction grating 2302 serving as the wavelength selecting portion, a collimator lens 2303 serving as an optical system for coupling the optical amplifier portion to the wavelength selecting portion, a rotary actuator 2304 serving as the control unit, and a coupling lens 2305. An antireflection coating is provided on a facet of the LD chip 2301 on the side of the collimator lens 2303. Light emerging from the facet provided with the antireflection coating is changed to parallel light by the collimator lens 2303 and input onto the diffraction grating 2302. The light input onto the diffraction grating 2302 is dispersed into components of respective wavelengths, and only the light component at the predetermined wavelength is returned to the LD chip 2301 through the collimator lens 2303. The set angle of the diffraction grating 2302 can be varied by the rotary actuator 2304, thereby changing the wavelength of the light component returned to the LD chip 2301. As the rotary actuator 2304, a rotary stage using a step motor, or the like, can be used. The light from the LD chip 2301 is output through the coupling lens 2305.

The oscillation wavelength of that external cavity LD can be changed over a wide range of several tens of millimeters with its single-mode oscillation being maintained.

Such an external cavity LD is substantially the same as that disclosed at pages 44–46 of H. Asakusa, "Optical Devices for Densely Spaced Wavelength Division Multiplexing Transmission Systems," National Technical Report, Vol. 39, No. 4, pp 43–48 (August 1993). The wavelength of the diffracted light component to be returned to the optical amplifier portion can also be changed by varying the distance between the diffraction grating and the LD chip.

Further, a wavelength filter, such as a Fabry-Perot etalon including a pair of resonance faces, can also be used as the wavelength selecting portion to construct the same light source as the above-discussed one. In this case, such a means as controls the resonance length between the resonance faces by controlling the position of at least one of the pair of the resonance faces, can be used as the control unit. Specifically, a structure, in which the resonance length is controlled by a piezoelectric element, can be employed.

Furthermore, as a conventional structure known as an external cavity LD, a device using the following wavelength filter as the wavelength selecting portion exists. For example, a wavelength tunable external cavity LD using a TE-TM converter as the wavelength filter is disclosed in F. Heismann et al., "Narrow-Linewidth, Electro-optically Tunable InGaAsP-Ti:LiNbO$_3$ Extended Cavity Laser," Appl. Phys. Lett. 51(3), pp 164–166 (July 1987). In this construction, only light at a predetermined wavelength is transmitted through the TE-TM converter, reflected by a reflective mirror and re-enters the optical amplifier portion through the TE-TM converter. Thus, the structure functions as the external cavity LD. In this structure, though the positional relationship between the optical amplifier portion and at least part of the wavelength selecting portion is not controlled, a relatively wide wavelength changeable range can be obtained since the wavelength filter can be made of material that has totally different characteristics from the optical amplifier portion.

In this embodiment, the same control as those of the above-discussed first to sixth embodiments can be performed except that the above external cavity LD is used as the light outputting means. For example, in the construction illustrated in FIG. 3, when the above external cavity LD is used as the wavelength variable or tunable light source, the wavelength control signal from the driving circuit is input into the rotary actuator, the means for controlling the distance between the LD chip and the diffraction grating, or the TE-TM converter. Thus, the wavelength of the light component returned to the optical amplifier portion (the LD chip) thereby is changed and the output wavelength is controlled.

(Embodiment 8)

Figure 24:
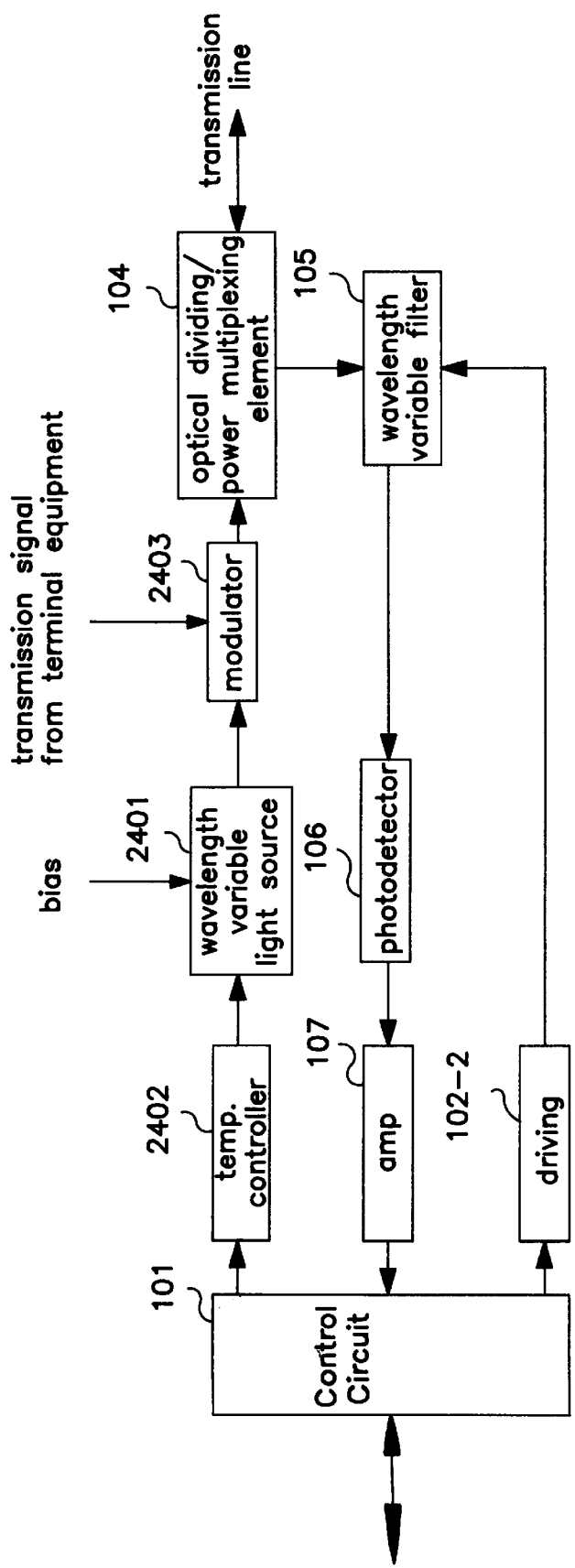
FIG. 24 is a block diagram illustrating the structure of an optical transmitter of the eighth embodiment.

In this embodiment, a light source 2401, which controls the wavelength of its output light by controlling its temperature, is used as the wavelength tunable light source. FIG. 24 illustrates the structure of an optical transmitter of this embodiment. This construction is fundamentally the same as that of FIG. 3, but the driving circuit is changed to a temperature controller 2402 since the temperature of the wavelength tunable light source is controlled.

In general, though not limited to this embodiment, the wavelength of output light is likely to spread due to its modulation when a laser used as a light source is directly modulated. In this embodiment, an external modulator 2403 is provided to solve that problem, and thus the wavelength spread due to the modulation is reduced or eliminated by modulating the output light from the light source 2401 using the external modulator 2403.

In this embodiment, a special device need not be used as the light source whose wavelength is changed by the temperature control, and an ordinary laser (for example, DFB semiconductor laser (DFB-LD)) module can be used. In the module, there are arranged, in addition to the DFB-LD, a temperature sensor, such as a thermistor, and a temperature control element, such as a Peltier element. Since the oscillation wavelength of a laser is generally changed due to a change in temperature, the oscillation wavelength is changed when the temperature is varied by the Peltier element.

Figure 25:
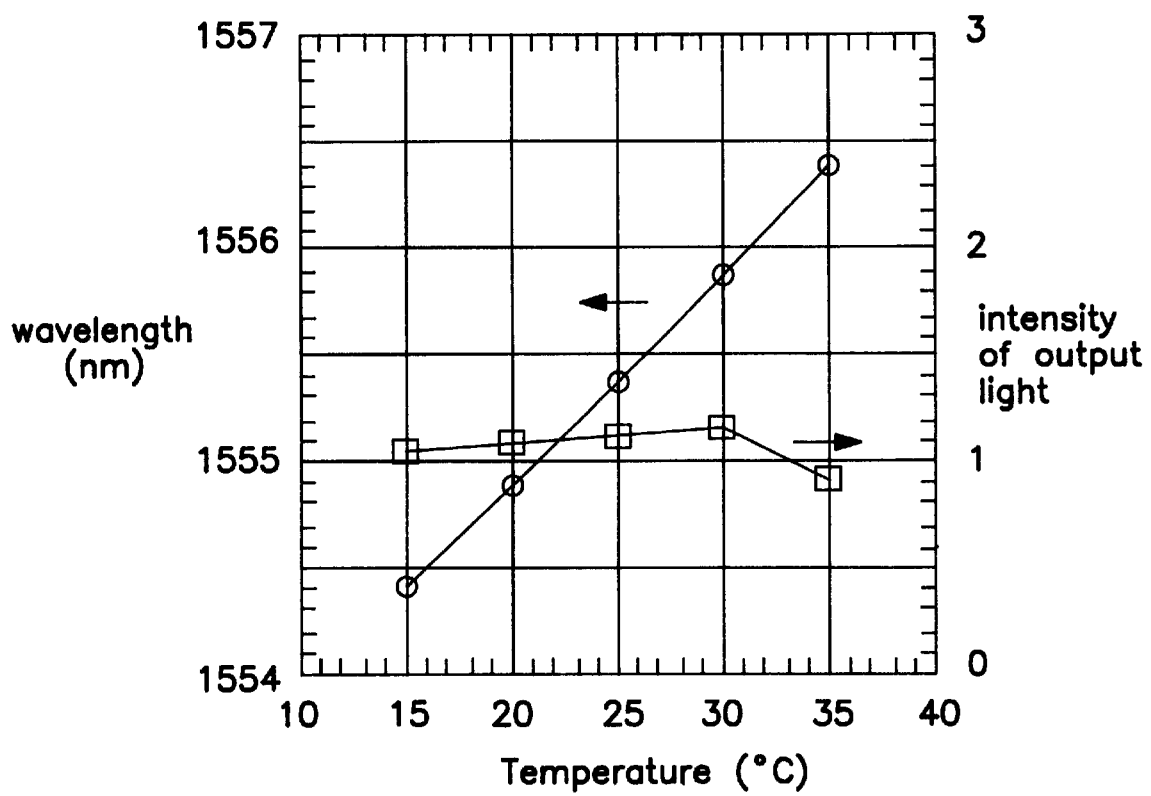
FIG. 25 is a graph representing a temperature-wavelength characteristic and a temperature-power characteristic of a light source used in the eighth embodiment.

The wavelength change of that wavelength tunable light source is caused due to the temperature control since the temperature change exclusively causes a change in the refractive index of the device. In the case of DFB-LD, the refractive index of a region with the diffraction grating is changed due to the temperature change, and hence the effective pitch of the diffraction grating is varied. Since the oscillation wavelength of DFB-LD is mainly determined by the effective pitch of the diffraction grating, the oscillation wavelength can be controlled by the temperature control. FIG. 25 illustrates an example of the measured relationship between the oscillation wavelength of DFB-LD and the temperature thereof. In FIG. 25, blank circles and a line connecting these circles exhibit the relationship between the oscillation wavelength and the temperature. In this example, the wavelength changes from 1554.4 nm to 1556.3 nm when the temperature is changed from 15 degrees centigrade to 35 degrees centigrade. Here, a most notable fact is that the output intensity of the laser (indicated by blank squares and a line connecting these squares) remains almost unchanged even when the oscillation wavelength is changed. In DFB-LDs and the like, although it is known that the oscillation wavelength can be controlled by controlling carriers injected thereinto, the intensity of output light is also likely to change when the injected carriers are varied. In contrast therewith, there is an advantage in this embodiment that the intensity of output light is hardly changed when the temperature is controlled.

Further, a DBR semiconductor laser (DBR-LD) and a Fabry-Perot semiconductor laser (FP-LD) also axist as a light source whose oscillation wavelength can be controlled by the temperature control. In the case of DBR-LD, the oscillation wavelength can be controlled by controlling the temperature of a DBR portion or a phase adjusting portion. In the case of FP-LD, the refractive index of a cavity portion between its facets is controlled by controlling the temperature thereof. In the case of FP-LD, however, since a plurality of longitudinal modes appear, there is a need to select the longitudinal mode such that the FP-LD can be used in the present invention. In the case of FP-LD of a short cavity type, since intervals between the longitudinal modes are wide, this type is suitable for use in the present invention. Furthermore, a surface emission type laser can also be used.

As the temperature control means, the Peltier element, which is usually used, for example, to maintain the temperature of the laser chip at a constant value, can be used. Further, a resistance film for the temperature control can be provided in the semiconductor laser itself. Here, temperature of at least a portion of a waveguide only needs to be controlled. In the case of DFB-LD, the resistance film only needs to be formed in its DFB region as is disclosed in Technology Report of Japan Electronics Information Communication Academy, OQE 91–105, pp 13–18. In the case of DBR-LD, the resistance film only needs to be formed in its DBR region as is disclosed in "Autumnal Conference of Japan Electronics Information Communications Academy", Lecture No. C-149, 4-171 (1992).

This embodiment is the same as the above first to sixth embodiments except that the temperature is controlled to change the wavelength of output light.

It should be particularly noted that no strict temperature control is needed also in this embodiment. That is, also in this embodiment, there is no need to maintain the temperature of the laser at a constant value in order to maintain the wavelength of its output light at a constant value. For example, when it is confirmed by the scanning of the wavelength tunable filter that the wavelength of output light has been changed and the interval the wavelength of the output light and its adjacent wavelength has been widened, control for raising the temperature only needs to be performed to shift the wavelength of the output light toward a longer wavelength side. Since the relationship between the wavelength of the output light and the temperature is determined for each device, the direction of the temperature control and the like only need to be set corresponding to characteristics of a device to be used.

(Other embodiments)

The essence of the present invention was explained using the above eight embodiments, but applications of the present invention are not limited to these embodiments.

The above embodiments were explained as examples of the communication system using the star coupler as shown in FIG. 5. The present invention can, however, be applied to communication systems of any type including the bus type, the star type, the loop type, and the other types, as long as the wavelength-multiplexing optical communication is carried out.

Although the above embodiments used the optical fibers as transmission media, the present invention can be applied to the cases performing the wavelength-multiplexing optical communication for example through space.

The above embodiments used the DBR type semiconductor laser as a wavelength-variable light source, but any light source can be applied as the light source of the present invention as long as the wavelength thereof can be changed and the intensity modulation or the frequency modulation is possibly applied thereto.

The above embodiments used the FFP type filter as the wavelength-variable filter, but any filter that can similarly change the passing wavelength can be applied as the filter in each embodiment.

Further, the above embodiments were explained as defining the longer wavelength side as the head wavelength side and the shorter wavelength side as the tail wavelength side. Namely, when each station does not detect a transmission wavelength of another station, such control is effected that the transmission wavelength of the self station is gradually changed to the longer wavelength side. In this case, the longer wavelength side is the head of the array formed of the transmission wavelengths of the respective stations on the wavelength axis. In contrast, another possible arrangement is such that the shorter wavelength side is defined as the head wavelength side and the longer wavelength side as the tail wavelength side. It is a matter of course in such a case that detection of the transmission wavelength of another station is carried out on the shorter wavelength side of the transmission wavelength of the self station. In this case, the shorter wavelength side is the head of the array formed of the transmission wavelengths of the respective stations on the wavelength axis.

For determining whether the longer wavelength side or the shorter wavelength side should be defined as the head, characteristics of the light source can be taken into consideration. For example, when the DFB type semiconductor laser (DFB-LD) is used as the light source, currents injected contribute to both the quantity of light and wavelength because a diffraction grating and an active layer exist in all regions in the DFB-LD. Among others, single-electrode DFB-LDs or multi-electrode DFB-LDs with great contribution of thermal effect exhibit coincidence between directions of increase or decrease of light quantity and wavelength against current. Namely, oscillation starts with an increase of current, and the oscillation wavelength gradually shifts to the longer wavelength side as oscillation becomes stabilized. The control of oscillation from the shorter wavelength side of the wavelength range and shifting the wavelength to the longer wavelength side corresponds to an increase of current in the cases of the above devices. When the other wavelengths already existing in the network are aligned from the longer wavelength side at this time, emission of light can be started without interference with the wavelengths by simply increasing the current.

In the case of a light source whose oscillation shifts to the shorter wavelength side as oscillation becomes stabilized, contrary to the above example, the head is preferably located on the shorter wavelength side.

In the above embodiments, each station transfers a signal, using intensity modulation. However, the signals can be transmitted using the FSK (Frequency Shift Keying) modulation. When transmission is carried out based on the FSK modulation, two wavelengths are transmitted, a mark wavelength and a space wavelength. The CPU 201 sweeps the passing wavelength of the wavelength-variable filter to detect two peaks corresponding to the mark and space wavelengths, and can perform the same control as in Embodiment 2, by giving a focus on either one.

In Embodiment 3, the control circuit 101 repeated the sweep of the passing wavelength of the wavelength-variable filter as alternating the directions thereof it the proximity wavelength region of $\lambda k$ in order to obtain the wavelength difference $\Delta \lambda c$ between the transmission wavelength of the self station $\lambda k$ and the transmission wavelength of the other station $\lambda k$-1.

It is, however, possible to employ such a control method that the sweep of the passing wavelength in the proximity wavelength region of $\lambda k$, for obtaining $\Delta \lambda c$ is repetitively carried out only in one direction. An example of the control method is such sequential operation that the passing wavelength is set on the shorter wavelength side of $\lambda k$, the passing wavelength is swept to the longer wavelength side to detect $\lambda k$, $\lambda k$-1, then $\Delta \lambda c = \lambda k$-1$-\lambda k$ is calculated, $\lambda k$ is controlled so that $\Delta \lambda c$ may become equal to the predetermined value $\Delta \lambda c0$, and the passing wavelength is again set on the shorter wavelength side of $\lambda k$.

In Embodiment 4, the control circuit 101 repeated the sweep of the passing wavelength of the wavelength-variable filter in the proximity wavelength region of $\lambda k$-1 as alternating the directions of the sweep in order to obtain the wavelength difference $\Delta \lambda c$ between the transmission wavelength of the self station $\lambda k$ and the transmission wavelength of the other station $\lambda k$-1.

It is, however, possible to employ such a control method that the sweep of the passing wavelength in the proximity wavelength region of $\lambda k$-1, for obtaining $\Delta \lambda c$, is repetitively carried out only in one direction. An example of the control method is such sequential operation that the passing wavelength is set on the shorter wavelength side of $\lambda k$, the passing wavelength is swept to the longer wavelength side to detect $\lambda k$, then $\lambda k$-1, $\Delta \lambda c = \lambda k$-1$-\lambda k$ is calculated, $\lambda k$ is controlled so that $\Delta \lambda c$ may become equal to the predetermined value $\Delta \lambda c0$, and the passing wavelength is again set on the shorter wavelength side of $\lambda k$.

The present invention as explained above can provide the wavelength-multiplexing optical communication method having the simple configuration and very high wavelength multiplicity without a need to perform precise temperature control or control of emission wavelength for light emitting unit in the wavelength-multiplexing optical communication method.

What is claimed is:

1. A wavelength control method for controlling a wavelength of output light from an optical transmitter used in an optical communication system for performing wavelength-multiplexing, said method comprising the steps of:

causing light-output means of the optical transmitter to output light;

guiding the output light of the light-output means and light used in the optical communication system to a wavelength tunable filter;

sweeping a selective wavelength of the wavelength tunable filter;

detecting, based on said sweeping, if a wavelength spacing between a wavelength of the output light, which is output from the light-output means, and a wavelength of the light used in the optical communication system, which is adjacent to the wavelength of the output light on a wavelength axis on one of a longer wavelength side and a shorter wavelength side, is one of wider and narrower than a predetermined wavelength spacing; and performing control in which the wavelength of the output light is caused to approach the adjacent wavelength when the wavelength spacing is detected to be wider than the predetermined wavelength in said detecting step and the wavelength of the output light is caused to be away from the adjacent wavelength when the wavelength spacing is detected to be narrower than the predetermined wavelength.

2. The method according to claim 1, in a steady state in which the wavelength spacing is controlled at the predetermined wavelength, both the output light and the adjacent light thereto being detected in a single sweep step of the wavelength tunable filter in said sweeping step.

3. The method according to claim 1, wherein, during a period of approaching a steady state in which the wavelength spacing is controlled at the predetermined wavelength, both the output light and the adjacent light thereto are detected in a single sweep step of the wavelength tunable filter in said sweeping step.

4. The method according to claim 1, wherein, during a period of approaching a steady state in which the wavelength spacing is controlled at the predetermined wavelength, one of the output light and the adjacent light thereto is detected in a single sweep step of the wavelength tunable filter in said sweeping step.

5. The method according to claim 1, wherein, when at least one of the output light and the adjacent light thereto is detected using the wavelength tunable filter, one of a sweep step of gradually increasing the selective wavelength of the wavelength tunable filter and a sweep step of gradually decreasing the selective wavelength of the wavelength tunable filter is repeated in said sweeping step.

6. The method according to claim 1, wherein when at least one of the output light and the adjacent light thereto is detected using the wavelength tunable filter, a sweep step of gradually increasing the selective wavelength of the wavelength tunable filter and a sweep step of gradually decreasing the selective wavelength of the wavelength tunable filter are alternately repeated in said sweeping step.

7. The method according to claim 1, in said light outputting step, a light output start region being set at an end portion on an opposite side to the one of the longer wavelength side and the shorter wavelength side, in a wavelength region in which the light-output means can output the light, and the light being output from the light-output means with its wavelength being in the light output start region when the light is started to be output from the light-output means.

8. The method according to claim 7, the output of the light being interrupted when the wavelength spacing between the wavelength of the output light and the wavelength of the adjacent light thereto becomes the predetermined wavelength spacing in the light output start region.

9. The method according to claim 1, further comprising a step of confirming that there is no other light within a region of the predetermined wavelength spacing at the end portion on the opposite side to one of the longer wavelength side and the shorter wavelength side, in a wavelength region in which the light-output means can output the light, before outputting the light from the light-output means.

10. The method according to claim 1, the light-output means including an optical amplifier portion and an optical wavelength selecting portion for causing light at a predetermined wavelength out of light emitted from the optical amplifier portion to re-enter the optical amplifier portion, and control of a wavelength of the output light being performed by controlling a positional relationship between at least a part of the optical wavelength selecting portion and the optical amplifier portion.

11. The method according to claim 1, the light-output means including temperature control means for controlling temperature, and control of a wavelength of the output light being performed by controlling the temperature by the temperature control means.

12. A wavelength control method for controlling a wavelength of output light from an optical transmitter used in an optical communication system for performing wavelength-multiplexing, said method comprising the steps of:

causing light-output means of the optical transmitter to output light;

setting selective wavelengths of two wavelength tunable filters, which are spaced by a predetermined wavelength spacing, such that one of the two wavelength tunable filters selects one of the output light from the light-output means and light used in the optical communication system, whose wavelength is adjacent to a wavelength of the output light on a wavelength axis on one of a longer wavelength side and a shorter wavelength side;

performing one of control of the wavelength of the output light and control of the wavelength of the output light and the selective wavelengths of the two wavelength tunable filters, such that the two wavelength tunable filters respectively select the output light and the adjacent light thereto; and maintaining a state in which the two wavelength tunable filters respectively select the output light and the adjacent light thereto.

13. The method according to claim 12, the wavelength tunable filter being controlled by analog control to maintain a state in which the wavelength tunable filter selects one of the output light and the adjacent light.

14. The method according to claim 12, the wavelength tunable filter being subjected to feedback control by a wobbling method to maintain a state in which the wavelength tunable filter selects one of the output light and the adjacent light.

15. The method according to claim 12, the wavelength tunable filter being controlled by digital control to maintain a state in which the wavelength tunable filter selects one of the output light and the adjacent light.

16. The method according to claim 12, the wavelength tunable filter being subjected to feedback control by digital control to maintain a state in which the wavelength tunable filter selects one of the output light and the adjacent light.

17. The method according to claim 12, the light-output means including an optical amplifier portion and an optical wavelength selecting portion for causing light at a predetermined wavelength out of light emitted from the optical amplifier portion to re-enter the optical amplifier portion, and control of a wavelength of the output light being performed by controlling a positional relationship between at least a part of the optical wavelength selecting portion and the optical amplifier portion.

18. The method according to claim 12, the light-output means including temperature control means for controlling temperature, and control of a wavelength of the output light being performed by controlling the temperature by the temperature control means.

19. A communication method performed in an optical communication system for performing wavelength-multiplexing, in which a wavelength control method is performed in an optical transmitter in the optical communication system, said wavelength control method comprising the steps of:

causing light-output means of the optical transmitter to output light;

guiding the output light of the light-output means and light used in the optical communication system to a wavelength tunable filter;

sweeping a selective wavelength of the wavelength tunable filter;

detecting, based on said sweeping, if a wavelength spacing between a wavelength of the output light, which is output from the light-output means, and a wavelength of the light used in the optical communication system, which is adjacent to the wavelength of the output light on a wavelength axis on one of a longer wavelength side and a shorter wavelength side, and is one of wider and narrower than a predetermined wavelength spacing; and performing control in which the wavelength of the output light is caused to approach the adjacent wavelength when the wavelength spacing is detected to be wider than the predetermined wavelength in said detecting step and the wavelength of the output light is caused to be away from the adjacent wavelength when the wavelength spacing is detected to be narrower than the predetermined wavelength.

20. The method according to claim 19, in a steady state in which the wavelength spacing is controlled at the predetermined wavelength, both the output light and the adjacent light thereto being detected in a single sweep step of the wavelength tunable filter in said sweeping step.

21. The method according to claim 19, wherein during a period of approaching a steady state in which the wavelength spacing is controlled at the predetermined wavelength, both the output light and the adjacent light thereto are detected in a single sweep step of the wavelength tunable filter in said sweeping step.

22. The method according to claim 19, wherein during a period of approaching a steady state in which the wavelength spacing is controlled at the predetermined wavelength, one of the output light and the adjacent light thereto is detected in a single sweep step of the wavelength tunable filter in said sweeping step.

23. The method according to claim 19, wherein when at least one of the output light and the adjacent light thereto is detected using the wavelength tunable filter, one of a sweep step of gradually increasing the selective wavelength of the wavelength tunable filter and a sweep step of gradually decreasing the selective wavelength of the wavelength tunable filter is repeated in said sweeping step.

24. The method according to claim 19, wherein when at least one of the output light and the adjacent light thereto is detected using the wavelength tunable filter, a sweep step of gradually increasing the selective wavelength of the wavelength tunable filter and a sweep step of gradually decreasing the selective wavelength of the wavelength tunable filter are alternately repeated in said sweeping step.

25. The method according to claim 19, in said light outputting step, a light output start region being set at an end portion on an opposite side to the one of the longer wavelength side and the shorter wavelength side, in a wavelength region in which the light-output means can output the light, and the light being output from the light-output means with its wavelength being in the light output start region when the light is started to be output from the light-output means.

26. The method according to claim 25, the output of the light being interrupted when the wavelength spacing between the wavelength of the output light and the wavelength of the adjacent light thereto becomes the predetermined wavelength spacing in the light output start region.

27. The method according to claim 19, further comprising a step of confirming that there is no other light within a region of the predetermined wavelength spacing at the end portion on the opposite side to the one of the longer wavelength side and the shorter wavelength side, in a wavelength region in which the light-output means can output the light, before outputting the light from the light-output means.

28. The method according to claim 19, the light-output means including an optical amplifier portion and an optical wavelength selecting portion for causing light at a predetermined wavelength out of light emitted from the optical amplifier portion to re-enter the optical amplifier portion, and control of a wavelength of the output light being performed by controlling a positional relationship between at least a part of the optical wavelength selecting portion and the optical amplifier portion.

29. The method according to claim 19, the light-output means including temperature control means for controlling temperature, and control of a wavelength of the output light being performed by controlling the temperature by the temperature control means.

30. A communication method performed in an optical communication system for performing wavelength-multiplexing, in which a wavelength control method is performed in an optical transmitter in the optical communication system, said wavelength control method comprising the steps of:

causing light-output means of the optical transmitter to output light;

setting selective wavelengths of two wavelength tunable filters, which are spaced by a predetermined wavelength spacing, such that one of the two wavelength tunable filters selects either the output light from the light-output means, or light used in the optical communication system, whose wavelength is adjacent to a wavelength of the output light on a wavelength axis on one of a longer wavelength side and a shorter wavelength side;

performing one of control of the wavelength of the output light and control of the wavelength of the output light and the selective wavelengths of the two wavelength tunable filters, such that the two wavelength tunable filters respectively select the output light and the adjacent light thereto; and maintaining a state in which the two wavelength tunable filters respectively select the output light and the adjacent light thereto.

31. The method according to claim 30, the wavelength tunable filter being controlled by analog control to maintain a state in which the wavelength tunable filter selects one of the output light and the adjacent light.

32. The method according to claim 30, the wavelength tunable filter being subjected to feedback control by a wobbling method to maintain a state in which the wavelength tunable filter selects one of the output light and the adjacent light.

33. The method according to claim 30, the wavelength tunable filter being controlled by digital control to maintain a state in which the wavelength tunable filter selects one of the output light and the adjacent light.

34. The method according to claim 30, the wavelength tunable filter being subjected to feedback control by digital control to maintain a state in which the wavelength tunable filter selects one of the output light and the adjacent light.

35. The method according to claim 30, the light-output means including an optical amplifier portion and an optical wavelength selecting portion for causing light at a predetermined wavelength out of light emitted from the optical amplifier portion to re-enter the optical amplifier portion, and control of a wavelength of the output light being performed by controlling a positional relationship between at least a part of the optical wavelength selecting portion and the optical amplifier portion.

36. The method according to claim 30, the light-output means including a temperature control means for controlling temperature, and control of a wavelength of the output light being performed by controlling the temperature by the temperature control means.

37. An optical communication system for performing wavelength-multiplexing, said system comprising:

light-output means capable of changing a wavelength of its output light;

a wavelength tunable filter capable of changing its selective wavelength;

guiding means for guiding the output light of said light-output means and light used in the optical communication system to said wavelength tunable filter;

filter controlling means for controlling the selective wavelength of said wavelength tunable filter; and output-light controlling means for controlling the wavelength of the output light of said light output means;

said output-light controlling means controlling the wavelength of the output light based on detecting, by sweeping the selective wavelength of said wavelength tunable filter by said filter controlling means, whether a wavelength spacing between the wavelength of the output light and a wavelength of the light used in the optical communication system adjacent to the wavelength of the output light on a wavelength axis on one of a longer wavelength side and a shorter wavelength side, is one of wider and narrower than a predetermined wavelength spacing, and based on a detected result, causing the wavelength of the output light to approach the adjacent wavelength when the wavelength spacing is detected to be wider than the predetermined wavelength, and the wavelength of the output light is caused to be away from the adjacent wavelength when the wavelength spacing is detected to be narrower than the predetermined wavelength.

38. The system according to claim 37, said light-output means comprising a laser.

39. The system according to claim 37, said light-output means comprising an optical amplifier portion and an optical wavelength selecting portion for causing light at a predetermined wavelength out of light emitted from said optical amplifier portion to re-enter said optical amplifier portion, and control of the wavelength of the output light being performed by controlling a positional relationship between at least a part of said optical wavelength selecting portion and said optical amplifier portion.

40. The system according to claim 37, said light-output means comprising temperature control means for controlling temperature, and control of the wavelength of the output light being performed by controlling the temperature by said temperature control means.

41. The system according to claim 37, said light-output means, said wavelength tunable filter, said guiding means, said filter controlling means, and said output-light controlling means being arranged in an optical transmitter.

42. The system according to claim 37, said light-output means, said wavelength tunable filter, said guiding means, said filter controlling means, and said output-light controlling means being arranged in an optical transceiver, and said optical transceiver further comprising receiving means for receiving an optical signal to be received by said transceiver while following up a change in a wavelength of the optical signal.

43. An optical communication system for performing wavelength-multiplexing, said system comprising:

light-output means capable of changing a wavelength of its output light;

two wavelength tunable filters capable of setting a mutual relationship between selective wavelengths of said two wavelength tunable filters such that said two wavelength tunable filters can select light of two wavelengths, which are spaced by a predetermined wavelength spacing, respectively, and capable of changing the selective wavelengths with the mutual relationship being maintained, respectively;

guiding means for guiding at least the output light of said light-output means to one of said two wavelength tunable filters and guiding at least light used in said optical communication system to the other of said two wavelength tunable filters;

filter controlling means for controlling the selective wavelengths of said two wavelength tunable filters; and output-light controlling means for controlling the wavelength of the output light of said light-output means;

said filter controlling means establishing a state in which one of said two wavelength tunable filters selects one of the output light from said light-output means and the light used in said optical communication system, whose wavelength is adjacent to the wavelength of the output light on a wavelength axis on one of a longer wavelength side and a shorter wavelength side, and one of said output-light controlling means and a combination of said output-light controlling means and said filter controlling means performing one of control of the wavelength of the output light and control of both the wavelength of the output light and the selective wavelengths of said two wavelength tunable filters, such that said two wavelength tunable filters respectively select the output light and the adjacent light thereto.

44. The system according to claim 43, said light-output means comprising a laser.

45. The system according to claim 43, said light-output means comprising an optical amplifier portion, and an optical wavelength selecting portion for causing light at a predetermined wavelength out of light emitted from said optical amplifier portion to re-enter said optical amplifier portion, and control of the wavelength of the output light being performed by controlling a positional relationship between at least a part of said optical wavelength selecting portion and said optical amplifier portion.

46. The system according to claim 43, said light-output means comprising temperature control means for controlling temperature, and control of the wavelength of the output light being performed by controlling the temperature by said temperature control means.

47. The system according to claim 43, said light-output means, said wavelength tunable filter, said guiding means, said filter controlling means, and said output-light controlling means being arranged in an optical transmitter.

48. The system according to claim 43, said light-output means, said wavelength tunable filter, said guiding means, said filter controlling means, and said output-light controlling means being arranged in an optical transceiver, and said optical transceiver further comprising receiving means for receiving an optical signal to be received by said transceiver while following up a change in a wavelength of the optical signal.

49. An optical transmitter used in an optical communication system for performing wavelength-multiplexing, said transmitter comprising:

light-output means capable of changing a wavelength of its output light;

a wavelength tunable filter capable of changing its selective wavelength;

guiding means for guiding the output light of said light-output means and light used in the optical communication system to said wavelength tunable filter;

filter controlling means for controlling the selective wavelengths of said wavelength tunable filter; and output-light controlling means for controlling the wavelength of the output light of said light-output means;

said output-light controlling means controlling the wavelength of the output light based on detecting, by sweeping the selective wavelength of said wavelength tunable filter by said filter controlling means, whether a wavelength spacing between the wavelength of the output light and a wavelength of the light used in the optical communication system adjacent to the wavelength of the output light on a wavelength axis on one of a longer wavelength side and a shorter wavelength side, is one of wider and narrower than a predetermined wavelength spacing, and based on a detected result, causing the wavelength of the output light to approach the adjacent wavelength when the wavelength spacing is detected to be wider than the predetermined wavelength, and the wavelength of the output light is caused to be away from the adjacent wavelength when the wavelength spacing is detected to be narrower than the predetermined wavelength.

50. The transmitter according to claim 49, said light-output means comprising a laser.

51. The transmitter according to claim 49, said light-output means comprising an optical amplifier portion and an optical wavelength selecting portion for causing light at a predetermined wavelength out of light emitted from said optical amplifier portion to re-enter said optical amplifier portion, and control of the wavelength of the output light being performed by controlling a positional relationship between at least a part of said optical wavelength selecting portion and said optical amplifier portion.

52. The transmitter according to claim 49, said light-output means comprising temperature control means for controlling temperature, and control of the wavelength of the output light being performed by controlling the temperature by said temperature control means.

53. An optical transmitter used in an optical communication system for performing wavelength-multiplexing, said transmitter comprising:

light-output means capable of changing a wavelength of its output light;

two wavelength tunable filters capable of setting a mutual relationship between selective wavelengths of said two wavelength tunable filters such that said two wavelength tunable filters can select light of two wavelengths, which are spaced by a predetermined wavelength spacing, respectively, and capable of changing the selective wavelengths with the mutual relationship being maintained, respectively;

guiding means for guiding at least the output light of said light-output means to one of said two wavelength tunable filters and guiding at least light used in said optical communication system to the other of said two wavelength tunable filters;

filter controlling means for controlling the selective wavelengths of said two wavelength tunable filters; and output-light controlling means for controlling the wavelength of the output light of said light-output means;

said filter controlling means establishing a state in which one of said two wavelength tunable filters selects one of the output light from said light-output means and the light used in said optical communication system, whose wavelength is adjacent to the wavelength of the output light on a wavelength axis on one of a longer wavelength side and a shorter wavelength side, and one of said output-light controlling means and a combination of said output-light controlling means and said filter controlling means, performing one of control of the wavelength of the output light and control of both the wavelength of the output light and the selective wavelengths of said two wavelength tunable filters, such that said two wavelength tunable filters respectively select the output light and the adjacent light thereto.

54. The transmitter according to claim 53, said light-output means comprising a laser.

55. The transmitter according to claim 53, said light-output means comprising an optical amplifier portion, and an optical wavelength selecting portion for causing light at a predetermined wavelength out of light emitted from said optical amplifier portion to re-enter said optical amplifier portion, and control of the wavelength of the output light being performed by controlling a positional relationship between at least a part of said optical wavelength selecting portion and said optical amplifier portion.

56. The transmitter according to claim 53, said light-output means comprising temperature control means for controlling temperature, and control of the wavelength of the output light being performed by controlling the temperature by said temperature control means.

* * * * *

UNITED STATES PATENT AND TRADEMARK OFFICE
CERTIFICATE OF CORRECTION

PATENT NO. : 5,949,562

DATED : September 7, 1999

INVENTOR(S): OICHI KUBOTA, ET AL.

Page 1 of 4

It is certified that error appears in the above-identified patent and that said Letters Patent is hereby corrected as shown below:

On the title page: Item

References Cited [56]

FOREIGN PATENT DOCUMENTS

```
--0 281 306   9/1988 European Patent Off.
  0 438 153   7/1991 European Patent Off.
  0 496 675   7/1992 European Patent Off.-- should be
```
inserted.

UNITED STATES PATENT AND TRADEMARK OFFICE
CERTIFICATE OF CORRECTION

PATENT NO. : 5,949,562

DATED : September 7, 1999

INVENTOR(S): OICHI KUBOTA, ET AL.

It is certified that error appears in the above-identified patent and that said Letters Patent is hereby corrected as shown below:

COLUMN 12

Line 45, "sweep" should read --sweeps--.
Line 54, "An" should read --$\Delta$n--.

COLUMN 13

Line 15, "$\Delta N<\Delta\lambda 0$, should read --$\Delta N<\Delta N0$--.
Line 47, "transmission" should read --transmit--.

COLUMN 17

Line 34, "11a" should read --IIA--.

COLUMN 22

Line 38, "to" should read --so--.

COLUMN 23

Line 2, "An" should read --$\Delta$n--.

UNITED STATES PATENT AND TRADEMARK OFFICE
CERTIFICATE OF CORRECTION

PATENT NO. : 5,949,562

DATED : September 7, 1999

INVENTOR(S): OICHI KUBOTA, ET AL.

Page 3 of 4

It is certified that error appears in the above-identified patent and that said Letters Patent is hereby corrected as shown below:

COLUMN 24

Line 32, "Numerical" should read --Numeral--.
Line 39, "Numerical" should read --Numeral--.
Line 44, "Numericals" should read --Numerals--.

COLUMN 31

Line 50, "An" should read --$\Delta$n--.
Line 51, "At" should read --$\Delta$t--.

COLUMN 32

Line 8, "An" should read --$\Delta$n--.

UNITED STATES PATENT AND TRADEMARK OFFICE
CERTIFICATE OF CORRECTION

PATENT NO. : 5,949,562

DATED : September 7, 1999

INVENTOR(S): OICHI KUBOTA, ET AL.

It is certified that error appears in the above-identified patent and that said Letters Patent is hereby corrected as shown below:

<u>COLUMN 35</u>

Line 64, "axist as a" should read --exist as--.
Line 65, "source" should read --sources--.

Signed and Sealed this

Nineteenth Day of December, 2000

Attest:

Q. TODD DICKINSON

*Attesting Officer*       *Commissioner of Patents and Trademarks*

UNITED STATES PATENT AND TRADEMARK OFFICE
CERTIFICATE OF CORRECTION

PATENT NO.    : 5,949,562
DATED         : September 7, 1999
INVENTOR(S)   : Oichi Kubota, et al.

It is certified that error appears in the above-identified patent and that said Letters Patent is hereby corrected as shown below:

References Cited [56]

OTHER PUBLICATIONS

"F. Heismann et al., "Narrow-Linewidth, Electro-Optically Tunable InGaAsP-Ti:LiNbO3 Extended Cavity Laser," Appl. Phys, Lett. 51(3), pp. 164-166 (July. 1987)." should be deleted.

Column 1
Line 10, "Nov. 12, 1995" should read --Nov. 29, 1995--.

Signed and Sealed this

Twenty-first Day of August 2001

*Attest:*

*Attesting Officer*

NICHOLAS P. GODICI
*Acting Director of the United States Patent and Trademark Office*